(12) United States Patent
Bosteels

(10) Patent No.: US 7,723,257 B2
(45) Date of Patent: May 25, 2010

(54) PROCESS FOR THE CATALYTIC CONTROL OF RADIAL REACTION

(76) Inventor: Dominique Bosteels, Carrigmore5, Carrigaline, County Cork (IE)

( * ) Notice: Subject to any disclaimer, the term of this patent is extended or adjusted under 35 U.S.C. 154(b) by 0 days.

(21) Appl. No.: 11/648,054

(22) Filed: Dec. 29, 2006

(65) Prior Publication Data

US 2007/0220873 A1 Sep. 27, 2007

Related U.S. Application Data

(63) Continuation-in-part of application No. 10/919,721, filed on Aug. 17, 2004, which is a continuation-in-part of application No. 10/268,629, filed on Oct. 10, 2002, now Pat. No. 7,188,470, and a continuation-in-part of application No. PCT/BE03/00170, filed on Oct. 9, 2003.

(60) Provisional application No. 60/328,352, filed on Oct. 10, 2001.

(30) Foreign Application Priority Data

Oct. 10, 2002 (WO) .................... PCT/BE02/00156

(51) Int. Cl.
 *B01J 21/18* (2006.01)
 *C07C 27/06* (2006.01)
(52) U.S. Cl. .................. 502/180; 502/302; 502/304; 423/213.2; 423/239.1; 423/239.2; 431/5; 431/7; 431/170; 431/326; 431/328; 123/670; 51/307; 51/308; 51/309
(58) Field of Classification Search ......... 502/302–304, 502/180, 182; 60/299–302; 423/213.2, 239.1, 423/239.2; 431/2, 5, 7, 170, 326, 328; 123/670; 51/307–309; 110/211

See application file for complete search history.

(56) References Cited

U.S. PATENT DOCUMENTS

| | | | |
|---|---|---|---|
| 2,978,360 A | 4/1961 | Bradstreet | |
| 4,596,277 A | 6/1986 | Djordjevic | |
| 4,670,020 A | 6/1987 | Rao | |
| 4,884,533 A | 12/1989 | Risitano et al. | |
| 4,991,395 A | 2/1991 | Markou | |
| 5,056,497 A | 10/1991 | Akagi et al. | |
| 5,314,851 A * | 5/1994 | Huba | 502/22 |
| 5,322,042 A * | 6/1994 | di Priolo et al. | 123/263 |
| 5,758,496 A | 6/1998 | Rao et al. | |
| 5,813,223 A | 9/1998 | Barthe et al. | |
| 2005/0217751 A1 | 10/2005 | Valentine et al. | |
| 2005/0250863 A1* | 11/2005 | Green et al. | 518/703 |

FOREIGN PATENT DOCUMENTS

| | | |
|---|---|---|
| DE | 10025754 | 11/2001 |
| DE | 101 48 129 A1 | 4/2003 |
| EP | 1 728 552 A1 | 6/2006 |
| GB | 828791 | 12/1954 |

OTHER PUBLICATIONS

Von Berg et al. "Measurement of the Cylinder Pressure in Combustion Engines with a Piezoresistive beta-SiC-on-SOI Pressure Sensor" IEEE, Published 1998.*
Kalra, et. al, Transient Gliding Arc for Fuel Ignition and Combustion Control, Drexel Plasma Institute, http://plasma.mem.drexel.edu/, Drexel University Philadelphia, PA (04).

* cited by examiner

*Primary Examiner*—Jessica L. Ward
*Assistant Examiner*—Erin B Saad

(57) ABSTRACT

Hydrocarbon transformations through radical reaction are carried out in presence of:
  a carbon nano/meso precursor,
  an aluminium containing support, and
  a lanthanide catalyst deposited on said aluminium containing support.

7 Claims, 24 Drawing Sheets

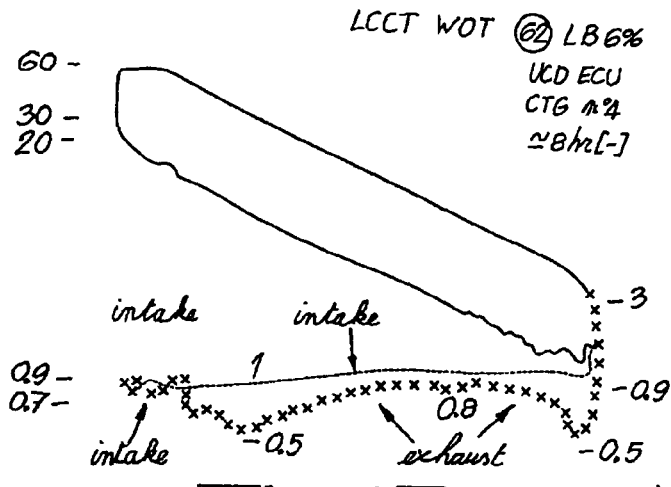
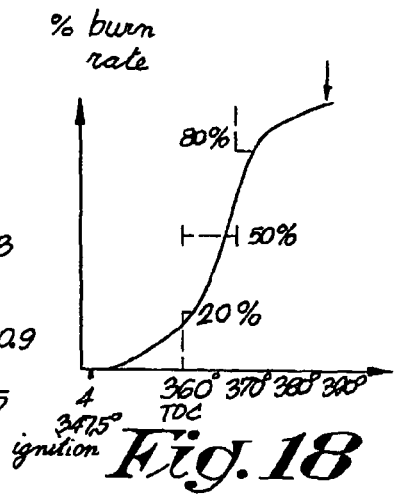
Fig.17  Fig.18
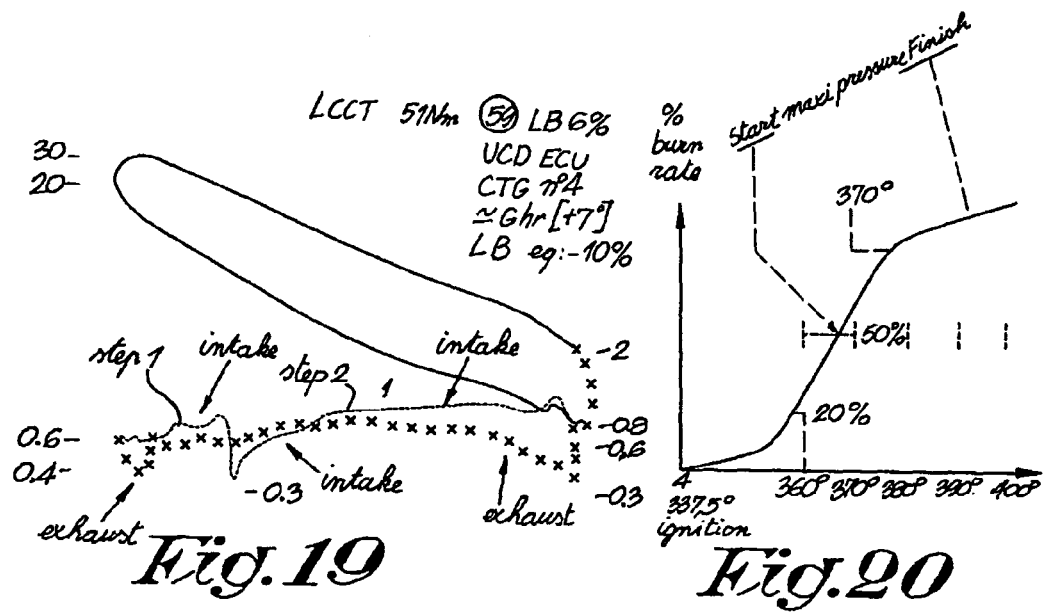
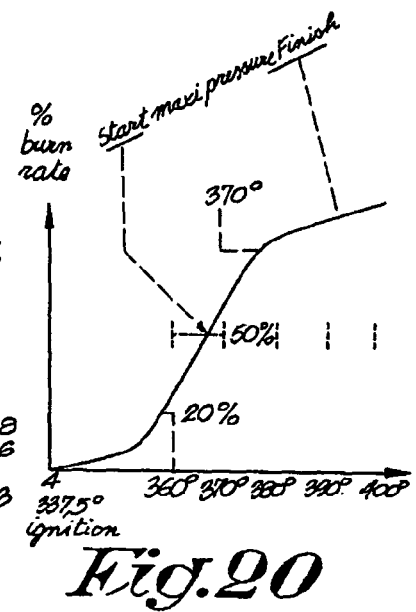
Fig.19  Fig.20

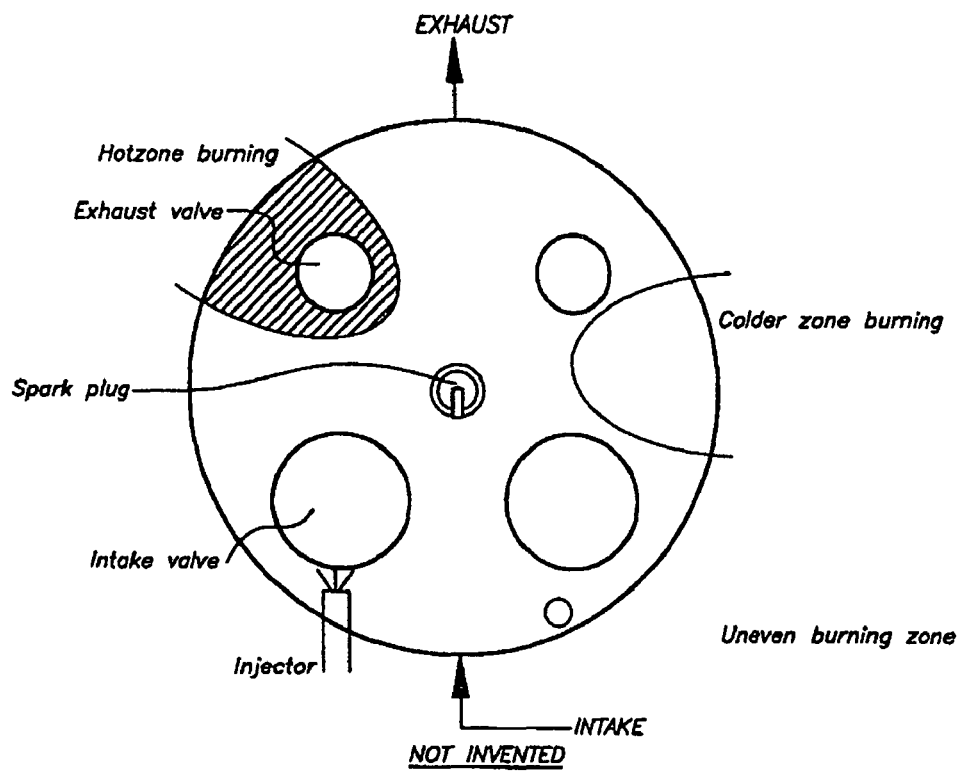
NOT INVENTED
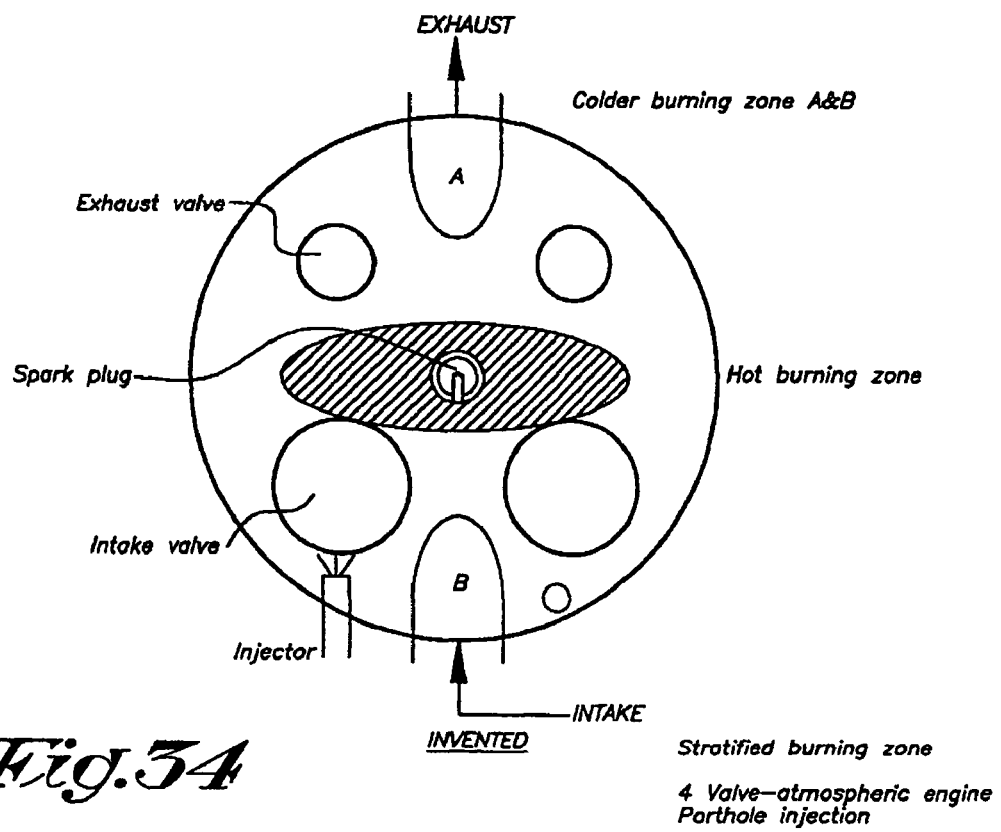
Fig.34
INVENTED
Stratified burning zone
4 Valve-atmospheric engine
Porthole injection

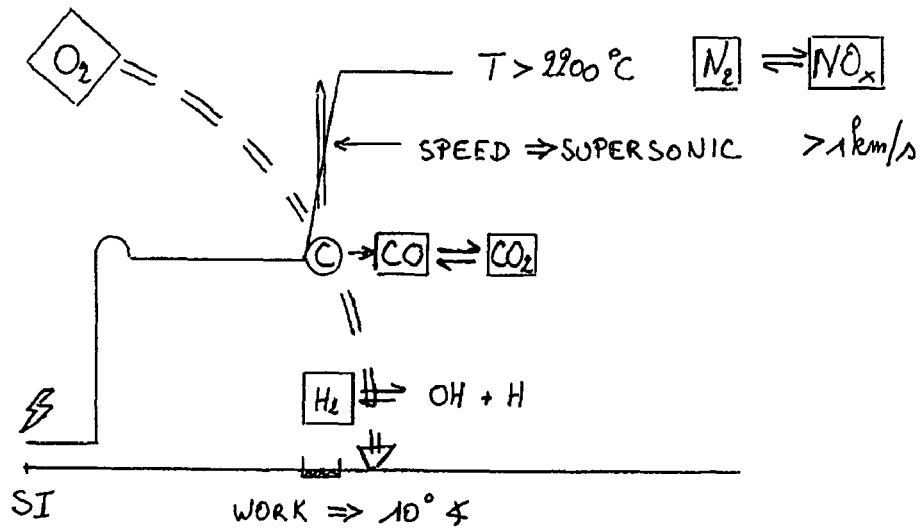
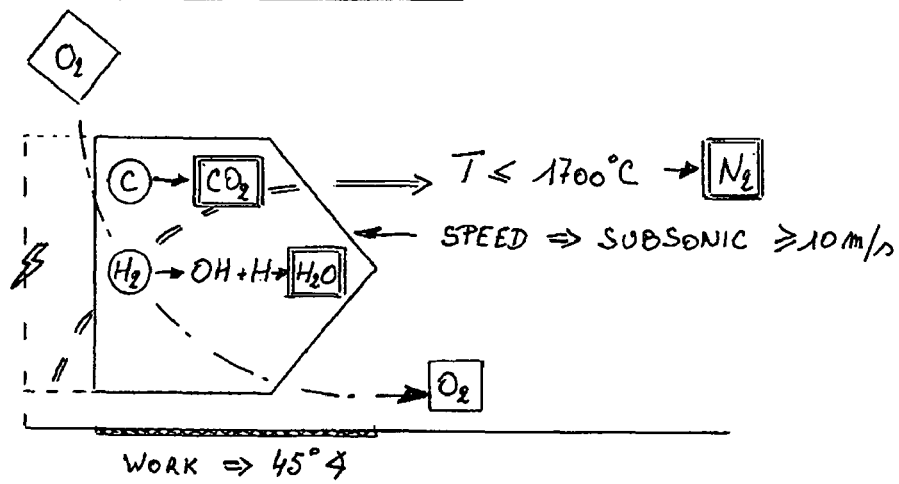
Fig. 36

PROCESS FOR THE CATALYTIC CONTROL OF RADIAL REACTION

The present application is a Continuation in Part (CIP) of U.S. Ser. No. 10/919,721 filed on Aug. 17, 2004, which is a Continuation in Part (CIP) of U.S. Ser. No. 10/268,629 filed on Oct. 10, 2002 now U.S. Pat. No. 7,188,470 and claiming the priority of provisional application U.S. Ser. No. 60/328,352 filed on Oct. 10, 2001, as well as a continuation in part of PCT/BE03/00170 filed on Oct. 9, 2003 and claiming the priority of PCT/BE02/00156 filed on Oct. 10, 2002. The content of all said applications are incorporated in the present specification by reference.

DESCRIPTION OF THE INVENTION

The invention relates to a catalytic reaction, especially radical reaction, carried out
- in presence of a lanthanide catalyst comprising at least one element selected from the group consisting of $Ln(OH)_3$, $Ln(HCO_3)$, $Ln(CO_3)_4$ and mixtures thereof, in which Ln is selected from the lanthanide group consisting of La, Ce, Pr, Nd, Pm, Sm, Eu and mixtures thereof,
- in presence of a precursor comprising carbon nano and/or meso structure(s), such as carbon nano/mesoparticles and/or carbon nano/mesotubes and/or carbon nano/meso films and/or combinations thereof
- in presence of an aluminium containing support, in which said transformation is operated at least at a temperature higher than 250° C.

THE PRIOR ART

It has already been proposed to use specific catalytic system or converter for treating exhaust combustion gases for reducing the $NO_x$ and/or CO and/or UHC (unburned hydrocarbon) and/or soot content of said exhaust combustion gases. Such system requires different specific catalysts or catalytic systems for each purpose.

For example, the three-way catalysts used in the exhaust system of cars comprise platinum and rhodium in different layers.

A structural catalyst system using only Pd was developed, said system comprising a base layer of palladium on cerium dioxide, said base layer being covered with an upper layer containing palladium on alumina. This catalyst had however the drawback to require the use of a still costly noble metal, e.g. palladium.

So as to reduce the amount of palladium, some of the palladium was substituted with low levels of platinum and rhodium.

Such converter, during its use, is coated with a coating formed by condensed liquid hydrocarbon particles, in which thick solid carbon particles (10-80 μm) are dispersed. Due to said deposit, the efficiency of the converter is reduced. The converter needs then to be regenerated, said regeneration being ensured by burning the hydrocarbon deposit.

Such a regeneration is a loss of energy, as said energy is wasted for the working of the motor.

In such converter, no use is made of an aluminium containing support provided with a cerium containing deposit contacting at least one aluminium atom, and carbon particles having bonds between the cerium deposit and the aluminium containing support.

PCT/BE03/00170 and PCT/BE02/00156, the content of which is incorporated by reference, disclose a combustion chamber provided with a $NO_x$ reducing catalytical coating.

US 2003/176268 discloses a catalyst for methane combustion. As stated in said document, problems of combustion catalyst are their stability and their lack of activity at very high temperature, and a severe deactivation thereof at high temperature for long periods of time.

Said document suggests the use of a catalyst consisting of a metal exchanged hexaaluminate prepared by metal exchange of an alumoxane precursor. This catalyst is a compound comprising in its molecular structure aluminium and one or more atoms, such as La, Ce, Nd, Sn, Eu, Gd, Er, Yb, Y, Mg, Ca, Sr, Ba, Mn, Fe, Co, Ni, Cu, Ag, Au, Rh, Ru, Pd, Pt, Ir, although the catalyst of the example of said document is free of cerium.

Such a catalyst does not have a cerium containing deposit on support, nor carbon particles having bonds with the deposit and the support.

US 2002/0044901 discloses a method for the desulfuration of gases in which microdomains of cerium oxide on a substrate are contacted with the combustion gases. The microdomains are mixed $CeO_2$—$Al_2O_3$ composite.

The composite material can be considered as a material in which the $CeO_2$ is within the structure of the $Al_2O_3$, the cerium compound being impregnated into the Al compound. The size of the $CeO_2$ microdomains is about 2 μm. Any soot deposit in a combustion chamber will cover said microdomains, causing the microdomains to become inactive.

Such a catalyst is thus not suitable for combustion purposes.

No reference at all is made in said document to the importance of a carbon deposit comprising carbon nano particles.

DE 10148129 discloses an internal combustion engine, the combustion chamber of which is provided with a catalytic component for reducing the activation energy. The catalytic component is in the form of nanoparticles with a size of less than 10 nm and is attached to the surface of the combustion chamber by means of soot particles or $SiO_2$. When using such nanoparticles of catalyst, said catalyst will quickly be covered by soot or other unburned hydrocarbons, whereby reducing the possible activity of the catalyst on the fuel mixture.

This document does not teach, nor suggest a direct deposit of the catalyst on the aluminium containing support, nor the use of large deposit containing Ce, Nd, Pr and La, nor the presence of bonded carbon particles.

It has also been proposed in U.S. Pat. No. 3,684,743 to provide a combustion chamber with an oxidizing catalytic coating consisting of an adhesion molybdenum layer applied to the surface and an aluminosilicate layer. This catalytic layer is stated to solve the problem the low temperature gumming created by catalytic oxidizing coatings comprising cerium oxide, described as intended to improve the completeness of combustion and to control the formation of carbon deposit. No reference is made to the use of carbon nanoparticles, nor to a deposit of cerium particles on an aluminium containing support.

In U.S. Pat. No. 2,978,360, combustion catalysts coat the combustion chamber, the coating comprising cerium oxide, neodymium oxide and praseodymium. According to said document, the combustion catalyst increases the probability of contact between fuel and oxygen, while decreasing the temperature threshold of combustion and increasing the combustion rate. According to said document, the carbon deposit is little affected by the presence of the coating. No reference is made to the use of nanoparticles of active carbon, nor to the combined use of Ce, Pr, Nd and La with nanoparticles of active carbon.

Activated carbon supported on cobalt based catalyst have already been proposed USSN 2003/0134912 and USSN 2003/0121826 for converting directly synthesis gas to hydrocarbons with high diesel distillates content through Fischer-Tropsch process. No reference at all is made in said documents to carbon nanoparticles having bonds between cerium containing deposits on a support. According to said documents, a component selected from cerium component, zirconium component, ruthenium component and potassium component is dispersed in a porous carbon deposit. Cobalt is thereafter deposited thereon. The possible cerium component is not in contact with aluminium or Fe and has a size which is well below the size of the active carbon particles. There is no distinct Ce containing deposit on a support, nor deposits connected therebetween by nano carbon particles.

US 2004/0079323 discloses a method of operating an internal combustion engine, in which residual gases are recirculated during the intake period through at least one catalyst disposed in the exhaust duct in proximity of the engine. The catalyst is used in said document so as to achieve a sufficiently high enough charge temperature in the combustion chamber. Said engine is intended to use for operation an HCCI combustion strategy.

US2004/0250790 discloses a high compression ratio, homogeneous charge compression ignition engine with a dual mode, namely a high load level comprising the step of admission of hydrogen or hydrogen/carbon monoxide mixture, and a low to mid load level operating on a high cetane fuel.

EP 1491741 discloses an acetylene-based addition for homogeneous-charge compression ignition (HCCI) engine, said acetylene-hydrogen mixture being added for inducing auto-ignition.

U.S. Pat. No. 6,960,327 discloses a method for selectively removing organic compound from a nano-composite material by irradiating the nano composite material with electromagnetic radiation with wavelength shorter than the wavelength of the visible light.

U.S. Pat. No. 6,886,548 disclose an internal combustion engine, in which a surface of at least one component of the combustion chamber and an adjoining space in contact with a air-fuel mixture to be combusted or with motor oil is provided with a catalytic coating for oxidizing carbonization residue consisting of ternary vanadium oxide, and at least one component selected from the group consisting of cerium oxide, oxide of another rare-earth metal, an oxide of lanthanum and an oxide of a transition metal. No reference is made in said document to the aluminium containing support, nor to carbon nanostructure precursor.

U.S. Pat. No. 6,852,298 discloses a NOx reduction composition for fluid catalytic processes. In said process, the hydrocarbon feedstock is contacted with a cracking catalyst in presence of a NOx reducing composition comprising an acidic support, cerium oxide, at least one oxide of the lanthanide series other than ceria, and an oxide of a transition metal. No reference is made in said document to the presence of a carbon nanostructure precursor or promoter.

U.S. Pat. No. 6,797,155 discloses a catalytic cracking process using a modified mesoporous aluminophosphate. Said catalyst is modified by at least one element selected from Zr, Ce, La, Mn, Co, Zn and V. No reference is made in said document to the presence of a carbon nanostructure precursor or promoter.

It has now been discovered that radical reaction could be controlled by using a catalytic system comprising lanthanide compound(s) and carbon nanoparticles or nanotubes or carbon nano structure, the reaction being preferably operated in gazeous phase or at least partial gazeous phase.

In this specification, radical reaction refers to reaction operated in presence of one or more radicals, by exchange of electrons, by covalence and/or by ionization.

Nano/meso carbon structure refers to structure having a size comprised between 0.1 and 800 nm. Said structures can possibly be agglomerated with a binder. Preferred size ranges for said nano/meso structures are given in the specification and claims.

BRIEF DESCRIPTION OF THE INVENTION

The invention relates to a process for the catalytic control of the transformation of hydrocarbon containing compounds into other compounds through radical reaction in presence of a precursor comprising at least one carbon nano/meso structure with a size comprised between 0.1 nm and 800 nm, in presence of an aluminium containing support, in presence of a lanthanide catalyst deposited on said aluminium containing support, said lanthanide catalyst comprising at least one element selected from the group consisting of La, Ce, Pr, Nd, Sm, Eu, Gd, Tb, Dy, Ho, Er, Tm, Yt, Lu and mixtures thereof, whereby said element is in a form selected from the group consisting of metallic forms, hydroxide forms, oxide forms, carbonate forms, bicarbonate forms and mixtures thereof, in which said transformation is operated at least partially in a carbon containing medium at least at a temperature higher than 250° C.

When the process of the invention is not used for burning purposes, but converting some hydrocarbons into other species to be used for chemical purposes, such preparing liquid fuels, monomers, solvents, etc., the process is advantageously carried out in an atmosphere with a low amount of oxygen, preferably in an atmosphere substantially free of oxygen. This low content in oxygen is preferred so as to limit as much as possible the formation of CO and $CO_2$. In such a case, the oxygen content of the reacting medium is advantageously less than 1% by weight, preferably less than 0.5% by weight.

The gas phase is thus advantageously free of oxygen $O_2$.

The coating has advantageously a low content in Vanadium and is preferably substantially free of vanadium. For example the vanadium content of the catalytic coating is such that the atomic ratio Vanadium/the sum of the atoms selected from the group consisting of La, Ce, Pr, Nd, Sm, Eu, Gd, Tb, Dy, Ho, Er, Tm, Yt, Lu is less than 1, preferably less than 0.5, most preferably less than 0.1, such as less than 0.05, less than 0.01, etc. According to a specific embodiment, the atomic ratio Vanadium/cerium is less than 1, preferably less than 0.5, most preferably less than 0.1, such as less than 0.05, less than 0.01, etc.

Advantageously, the carbon nano/meso structure is selected from the group consisting of nano/meso particles with a weight average diameter comprised between 0.1 nm and 800 nm, carbon nanotubes with a weight average diameter comprised between 0.1 and 800 nm and a length of less than 200 μm, nano/meso films with a weight average thickness comprised between 0.1 and 800 nm, and mixtures thereof.

Preferably, the carbon containing medium comprises at least partially a gaseous phase.

For example, the catalyst is contacted at least with a carbon containing gaseous phase and with a carbon containing liquid phase.

Most preferably, the reaction is thus at least partly a solid-gas reaction, as the catalyst and the precursor are in solid forms.

Preferably, at least 50% by weight of the hydrocarbon to be converted, for example to be cracked, is in gaseous form.

For achieving sufficient gaseous phase of the hydrocarbon, the temperature can be adapted so as to convert a liquid hydrocarbon at least partly in gaseous phase. The temperature of reaction is adapted in function of its nature. In case, the reaction is a cracking reaction for converting large molecules into smaller one, the reaction temperature will advantageously be lower than 800° C., preferably lower than 600° C., for example comprised between 300° C. and 500° C.

When the reaction is a substantially complete burning reaction, the temperature is advantageously lower than 1800° C., such as comprised between 800° C. and 1500° C.

Other possible reactions are reactions for grafting one or more groups or atoms on one or more hydrocarbon containing compounds, burning reactions, $NO_x$ reduction, oxidation, reduction, partial oxidation, gas reforming, cracking, steam reforming, hydrogen production, fuel cells, production of methane and/or ethane and/or methanol and/or ethanol and/or hydrogen from $CO_2$ and vapour, water vapour, hydrogenation of ketones and aldehydes into alcohols, hydrogenation of olefins into alkyls, dehydrogenation of alcohols, dehydrogenation of butanes, formation of poly-esters, hydrogenation, cracking, ring opening carbon containing ring molecules, such as molecules with one or more rings with 4, 5, 6, 7, 10, 12 carbon atoms, said rings having possibly one or more common carbon atoms and having possibly one or more heteroatoms, such as N, O, etc. Said reactions can be partial, substantially complete or complete or can be a combination of several of said reactions.

When dealing with hydrocarbon conversion, the process of the invention is advantageously selected from the group consisting of cracking, hydrocracking, aromatic alkylation, isoparaffin alkylation, isomerization, polymerization, reforming, dewaxing, hydrogenation, dehydrogenation, transalkylation, dealkylation, hydration, dehydration, hydrotreating, hydrodenitrogenation, hydrodesulfurization, methanation, ring opening, and syngas shift.

When the hydrocarbon containing compound to be reacted has a very high boiling point, the reaction can be operated in presence of a gaseous phase comprising a hydrocarbon compound, such as a compound having a lower boiling point. Said other hydrocarbon can then be used for making the bridge for radicals towards the still liquid or solid hydrocarbon to be reacted. Instead of containing carbon compound having a low boiling point, the gaseous phase can also comprises carbon containing compounds which are in gas form at 20° C. under a pressure of 1 $10^5$ Pa, such as methane, CO, $CO_2$, etc.

Advantageously, the reaction is carried out at least partly under a pressure of at least 5 $10^5$ Pa, preferably at least partly under a pressure of at least 10 $10^5$ Pa, such as at least partly under a pressure comprised between 20 $10^5$ Pa and 100 $10^5$ Pa.

It seems that when carrying out reaction at high pressure, a better control of the reaction speed can be achieved.

In an embodiment, the speed of reaction is controlled by controlling the number of radicals captured by an element selected from the group consisting of the catalyst, the carbon precursor and combinations thereof. It seems that the number of radicals participating to the reaction can be controlled, by capturing radicals by the catalyst and/or the carbon precursor when said radicals are in excess and by releasing captured radicals from the catalyst and/or the carbon precursor when said radicals are scare. The catalyst and/or carbon precursor act thus in the form of a radical buffer, whereby enabling at the end of an reaction to have still sufficient radical for reacting the still to be reacted hydrocarbon(s).

Advantageously, the catalyst comprises at least one metallic element selected from the group consisting of La, Ce, Pr, Nd, Sm, Eu, Gd, Tb, Dy, Ho, Er, Tm, Yt, Lu and mixtures thereof.

The hydrocarbon compound can comprise some oxygen and/or nitrogen, as well as other atoms.

However, advantageously, at least 90% by weight, preferably at least 95% by weight, most preferably at least 99% by weight of the hydrocarbon compound consists of atoms selected from the group consisting of carbon, hydrogen and oxygen. The Hydrocarbon compounds can be organic compounds of the following formulas $C_nH_{2n+2}$, $C_nH_{2n}$, $C_xH_y$, alcohols, such as ethanol, methanol, aldehydes, etc. and mixtures thereof.

Preferably, the hydrocarbon containing compound is reacted in a reaction chamber, at least one face of which is provided with lanthanide catalyst (catalyst comprising at least one element selected from the group consisting of La, Ce, Pr, Nd, Sm, Eu, Gd, Tb, Dy, Ho, Er, Tm, Yt, Lu and mixtures thereof. advantageously at least partly in metallic form), carbon precursor and aluminium containing support.

According to a preferred embodiment, the catalytic efficiency of the catalyst is determined, whereby when said efficiency is below a minimal determined threshold value, the catalyst is submitted to a rejuvenation step.

Preferably, the rejuvenation step is stopped when the catalytic efficiency is above an upper threshold value.

For example, the efficiency of the catalyst can be determined by determining one or more of the following parameters, advantageously several of said parameters:

temperature, for example maximum reaction temperature, such as maximum reaction temperature lower than about 1600° C.; minimum cool burning reaction; cool burning temperature maintained within a specific range of temperature, for example between 250° C. and 500° C.;

pressure, for example pressure below 60 $10^5$ Pa, maximum pressure maintained substantially constant for within a pressure range, for example between 30 $10^5$ Pa and 50 $10^5$ Pa, minimum pressure for a cool burning, minimum pressure for a cool burning within a pressure range;

speed of reaction;

light and/or electromagnetic emission, such wave length of the rays, chemical composition, such as depletion of one component, formation of one component;

temperature and/or pressure of the auto ignition of the reaction;

. . .

For example, the reaction is at least partly controlled by a radiation selected from the group comprising visible light rays, non visible light rays and combinations thereof. According to a specific embodiment, the efficiency of the catalyst is determined by estimating a radiation selected from the group comprising visible light rays, non visible light rays and combinations thereof.

According to a detail of an embodiment of the process of the invention, the reaction is carried out at least in presence of $OH^-$ radicals.

Advantageously, the catalyst comprises at least two atoms, preferably at least three atoms, most preferably at least four atoms, especially more than five atoms selected from the group consisting of La, Ce, Pr, Nd, Sm, Eu, Gd, Tb, Dy, Ho, Er, Tm, Yt and Lu. The presence of La, Ce and Pr in the catalyst is advantageous.

The invention relates also to a process for the catalytic control of the transformation of hydrocarbon containing compounds into other compounds through radical reaction in presence of a precursor comprising at least one carbon nano/meso structure with a size comprised between 0.1 nm and 800 nm, in presence of an aluminium containing support, in presence of a lanthanide catalyst deposited on said aluminium containing support, said lanthanide catalyst comprising at least one element selected from the group consisting of La, Ce, Pr, Nd, Sm, Eu, Gd, Tb, Dy, Ho, Er, Tm, Yt, Lu and mixtures thereof, whereby said element is in a form selected from the group consisting of metallic forms, hydroxide forms, oxide forms, carbonate forms, bicarbonate forms and mixtures thereof, in which at least a portion of the reaction is controlled by a light emission.

When the process of the invention is not used for burning purposes, but converting some hydrocarbons into other species to be used for chemical purposes, such preparing liquid fuels, monomers, solvents, etc., the process is advantageously carried out in an atmosphere with a low amount of oxygen, preferably in an atmosphere substantially free of oxygen. This low content in oxygen is preferred so as to limit as much as possible the formation of CO and $CO_2$. In such a case, the oxygen content of the reacting medium is advantageously less than 1% by weight, preferably less than 0.5% by weight.

The gas phase is thus advantageously free of oxygen $O_2$.

A further object of the invention is a process for the catalytic control of the transformation of hydrocarbon containing compounds into other compounds through radical reaction, in which said transformation is operated at least partially in a carbon containing medium in presence of a precursor comprising at least one carbon nano/meso structure with a size comprised between 0.1 nm and 800 nm, in presence of an aluminium containing support, in presence of a lanthanide catalyst deposited on said aluminium containing support, said lanthanide catalyst comprising at least one element selected from the group consisting of La, Ce, Pr, Nd, Sm, Eu, Gd, Tb, Dy, Ho, Er, Tm, Yt, Lu and mixtures thereof, whereby said element is in a form selected from the group consisting of metallic forms, hydroxide forms, oxide forms, carbonate forms, bicarbonate forms and mixtures thereof, in which the reaction is controlled in function of at least one parameter selected from the group consisting of temperature, pressure, illumination, pH, gas composition, so as to achieve a selectivity in one or more of said other compounds.

Advantageously, the catalyst is deposited on at least one support in contact with the reacting gaseous phase, whereby the reaction is at least controlled by controlling the contact time of the reacting gaseous phase with the catalyst.

When the process of the invention is not used for burning purposes, but converting some hydrocarbons into other species to be used for chemical purposes, such preparing liquid fuels, monomers, solvents, etc., the process is advantageously carried out in an atmosphere with a low amount of oxygen, preferably in an atmosphere substantially free of oxygen. This low content in oxygen is preferred so as to limit as much as possible the formation of CO and $CO_2$. In such a case, the oxygen content of the reacting medium is advantageously less than 1% by weight, preferably less than 0.5% by weight.

The gas phase is thus advantageously free of oxygen $O_2$.

A still further subject matter of the invention is a process for the catalytic control of the transformation of hydrocarbon containing compounds into other compounds through radical reaction, in which said transformation is operated at least partially in a carbon containing medium in presence of a precursor comprising at least one carbon nano/meso structure with a size comprised between 0.1 nm and 800 nm, in presence of an aluminium containing support, in presence of a lanthanide catalyst deposited on said aluminium containing support, said lanthanide catalyst comprising at least one element selected from the group consisting of La, Ce, Pr, Nd, Sm, Eu, Gd, Tb, Dy, Ho, Er, Tm, Yt, Lu and mixtures thereof, whereby said element is in a form selected from the group consisting of metallic forms, hydroxide forms, oxide forms, carbonate forms, bicarbonate forms and mixtures thereof, in which the reaction is controlled at least by the formation of methane radical selected from the group consisting of $CH_3\cdot$, $CH2\cdot$; $CH\cdot\cdot\cdot$ and mixtures thereof, as well as their lifetime.

When the process of the invention is not used for burning purposes, but converting some hydrocarbons into other species to be used for chemical purposes, such preparing liquid fuels, monomers, solvents, etc., the process is advantageously carried out in an atmosphere with a low amount of oxygen, preferably in an atmosphere substantially free of oxygen. This low content in oxygen is preferred so as to limit as much as possible the formation of CO and $CO_2$. In such a case, the oxygen content of the reacting medium is advantageously less than 1% by weight, preferably less than 0.5% by weight.

The gas phase is thus advantageously free of oxygen $O_2$.

Another subject matter of the invention is a process for the catalytic control of the transformation of hydrocarbon containing compounds into other compounds through radical reaction in a carbon containing gaseous phase in presence of a precursor comprising at least one carbon nano/meso structure with a size comprised between 0.1 nm and 800 nm, in presence of an aluminium containing support, in presence of a lanthanide catalyst deposited on said aluminium containing support, said lanthanide catalyst comprising at least one element selected from the group consisting of La, Ce, Pr, Nd, Sm, Eu, Gd, Tb, Dy, Ho, Er, Tm, Yt, Lu and mixtures thereof, whereby said element is in a form selected from the group consisting of metallic forms, hydroxide forms, oxide forms, carbonate forms, bicarbonate forms and mixtures thereof, whereby the catalyst is suitable at least partly for switching from an electron receptor status into an electron donor status, and inversely, in which the reaction is controlled in function of at least one parameter selected from the group consisting of temperature, pressure, illumination, reaction time, speed, pH, etc. so as to control the speed of switching of the catalyst from an electron receptor status into a electron donor status, and inversely.

When the process of the invention is not used for burning purposes, but converting some hydrocarbons into other species to be used for chemical purposes, such preparing liquid fuels, monomers, solvents, etc., the process is advantageously carried out in an atmosphere with a low amount of oxygen, preferably in an atmosphere substantially free of oxygen. This low content in oxygen is preferred so as to limit as much as possible the formation of CO and $CO_2$. In such a case, the oxygen content of the reacting medium is advantageously less than 1% by weight, preferably less than 0.5% by weight.

The gas phase is thus advantageously free of oxygen $O_2$.

Advantageously, a rejunevation step of the catalyst is carried out when the speed of switching of the catalyst from an electron receptor status into a electron donor status, and inversely is lower than a predetermined value.

A further object of the invention is a process for the catalytic control of the transformation of hydrocarbon containing compounds into other compounds through radical reaction in a carbon containing gaseous phase in presence of a precursor comprising at least one carbon nano/meso structure with a size comprised between 0.1 nm and 800 nm, in presence of an aluminium containing support, in presence of a lanthanide catalyst deposited on said aluminium containing support, said lanthanide catalyst comprising at least one element selected from the group consisting of La, Ce, Pr, Nd, Sm, Eu, Gd, Tb, Dy, Ho, Er, Tm, Yt, Lu and mixtures thereof, whereby said element is in a form selected from the group consisting of metallic forms, hydroxide forms, oxide forms, carbonate forms, bicarbonate forms and mixtures thereof, in which the reaction is controlled in function of at least one parameter selected from the group consisting of temperature, pressure, illumination, gas composition, pH, etc. so as to achieve a selectivity in one or more of said other compounds.

When the process of the invention is not used for burning purposes, but converting some hydrocarbons into other species to be used for chemical purposes, such preparing liquid fuels, monomers, solvents, etc., the process is advantageously carried out in an atmosphere with a low amount of oxygen, preferably in an atmosphere substantially free of oxygen. This low content in oxygen is preferred so as to limit as much as possible the formation of CO and $CO_2$. In such a case, the oxygen content of the reacting medium is advantageously less than 1% by weight, preferably less than 0.5% by weight.

The gas phase is thus advantageously free of oxygen $O_2$.

Another further subject matter of the invention is a process of burning (such as for heat generation and/or for expansion of gases and/or for work output) of at least one fuel in a chamber of an engine, comprising at least the step of admission of fuel and oxygen containing gas into said chamber, the step of compression of the fuel-oxygen containing gas in said chamber, the step of burning at least partly the fuel in said chamber, and the step of ejecting burning gases out of said chamber, whereby at least the compression step is carried out in said chamber in presence of a precursor comprising at least one carbon nano/meso structure with a size comprised between 0.1 nm and 800 nm, in presence of an aluminium containing support, in presence of a lanthanide catalyst deposited on said aluminium containing support, said lanthanide catalyst comprising at least one element selected from the group consisting of La, Ce, Pr, Nd, Sm, Eu, Gd, Tb, Dy, Ho, Er, Tm, Yt, Lu and mixtures thereof, whereby said element is in a form selected from the group consisting of metallic forms, hydroxide forms, oxide forms, carbonate forms, bicarbonate forms and mixtures thereof, and whereby the burning step is controlled so that at least 50% by weight of the fuel is burned in a deflagration mode.

Advantageously, the efficiency of the catalyst is controlled so that at least 50% by weight of the fuel is burned in a deflagration mode.

Preferably, the efficiency of the catalyst is controlled so that at least 75% by weight of the fuel is burned in a deflagration mode.

According to an embodiment, the fuel is burned at least partly in a deflagration mode under a pressure of at least $5\ 10^5$ Pa, advantageously of at least $10\ 10^5$ Pa According to a detail, the deflagration speed is controlled by controlling the number of radicals captured by an element selected from the group consisting of the catalyst, the carbon precursor and combinations thereof.

For example, the catalyst comprises at least one metallic element selected from the group consisting La, Ce, Pr, Nd, Sm, Eu, Gd, Tb, Dy, Ho, Er, Tm, Yt, Lu and mixtures thereof, whereby said element is advantageously in a form selected from the group consisting of metallic forms, hydroxide forms, oxide forms, carbonate forms, bicarbonate forms and mixtures thereof.

In said process, the hydrocarbon containing compound comprises advantageously oxygen and/or nitrogen. Preferably, at least 90% by weight of the hydrocarbon compound consists of atoms selected from the group consisting of carbon, hydrogen and oxygen.

According to another detail, the hydrocarbon is reacted in a reaction chamber, at least one face of which is provided with the catalyst, carbon precursor and aluminium.

According to still another detail, the catalytic efficiency of the catalyst is determined, whereby when said efficiency is below a minimum determined threshold value corresponding to a minimum deflagration status, the catalyst is submitted to a rejuvenation step. Preferably, the rejuvenation step is stopped when the catalytic efficiency is above an upper minimal threshold value corresponding to an admissible deflagration status.

According to a characteristic of an embodiment, the burning is carried out at least in presence of $OH^-$ radicals.

According to a possible embodiment, the fuel is burned first according to a deflagration mode and then according to an explosion mode.

Preferably, the burning step is carried out at least partly in a closed variable chamber.

According to amore preferred embodiment, the fuel is submitted to a cool burning during a compression phase at pressure above $3\ 10^5$ Pa and at temperature above 250° C.

A further subject matter of the invention is a process of catalytic control of burning of at least one fuel in a burning chamber of an engine, comprising at least the step of admission of a compressed medium comprising at least fuel and an oxygen containing gas into the burning chamber, the step of burning at least partly the fuel and the step of ejecting burning gases out of the burning chamber, whereby at least the burning step is carried out in presence of a precursor comprising at least one carbon nano/meso structure with a size comprised between 0.1 nm and 800 nm, in presence of an aluminium containing support, in presence of a lanthanide catalyst deposited on said aluminium containing support, said lanthanide catalyst comprising at least one element selected from the group consisting of La, Ce, Pr, Nd, Sm, Eu, Gd, Tb, Dy, Ho, Er, Tm, Yt, Lu and mixtures thereof, whereby said element is in a form selected from the group consisting of metallic forms, hydroxide forms, oxide forms, carbonate forms, bicarbonate forms and mixtures thereof, and whereby the burning step is controlled so that at least 50% by weight of the fuel is burned in a deflagration mode.

Advantageously, the efficiency of the catalyst is controlled so that at least 50% by weight of the fuel, preferably at least 75% by weight of the fuel is burned in a deflagration mode.

For example, the fuel is burned at least partly in a deflagration mode under a pressure of at least $5\ 10^5$ Pa, preferably under a pressure of at least $10\ 10^5$ Pa.

Another subject matter of the invention is a process for the catalytic control of burning at least one fuel according to a at least partial deflagration pattern, in which the fuel is ignited
- in presence of a precursor comprising at least one carbon nano/meso structure with a size comprised between 0.1 nm and 800 nm,
- in presence of an aluminium containing support,
- in presence of a lanthanide catalyst deposited on said aluminium containing support, said lanthanide catalyst comprising at least one element selected from the group consisting of La, Ce, Pr, Nd, Sm, Eu, Gd, Tb, Dy, Ho, Er, Tm, Yt, Lu and mixtures thereof, whereby said element is in a form selected from the group consisting of metallic forms, hydroxide forms, oxide forms, carbonate forms, bicarbonate forms and mixtures thereof, and
- in presence of at least one promoter, said promoter comprising at least one atom selected from the group consisting of K, P, Cu, Fe, Zn, Ni, Mn, Ca, Mg, Ba, Si and mixtures thereof, whereby said fuel is ignited at a temperature of at least 250° C.

Advantageously, the fuel is ignited at a pressure of at least $10\ 10^5$ Pa for the at least partial deflagration pattern.

A still further subject matter of the invention is a process for the burning at one fuel according to an HC (homogeneous charge) pattern (with spark plug ignition SI and/or compression ignition CI), in which the fuel is ignited
- in presence of a precursor comprising at least one carbon nano/meso structure with a size comprised between 0.1 nm and 800 nm,
- in presence of an aluminium containing support,
- in presence of a lanthanide catalyst deposited on said aluminium containing support, said lanthanide catalyst comprising at least one element selected from the group consisting of La, Ce, Pr, Nd, Sm, Eu, Gd, Tb, Dy, Ho, Er, Tm, Yt, Lu and mixtures thereof, whereby said element is in a form selected from the group consisting of metallic forms, hydroxide forms, oxide forms, carbonate forms, bicarbonate forms and mixtures thereof, and
- in presence of at least one promoter, said promoter comprising at least one atom selected from the group consisting of K, P, Cu, Fe, Zn, Ni, Mn, Ca, Mg, Ba, Si and mixtures thereof, whereby said fuel is ignited at a temperature of at least 250° C.

The pattern can thus be a HCCI, HCCI or a combination thereof.

Preferably, the fuel is ignited at a pressure of at least $10\ 10^5$ Pa.

The invention still further relates to a process for the catalytic control of burning at least one fuel according to a at least partial deflagration pattern, in which the fuel is ignited
- in presence of a precursor comprising at least one carbon nano/meso structure with a size comprised between 0.1 nm and 800 nm,
- in presence of an aluminium containing support, and
- in presence of a lanthanide catalyst deposited on said aluminium containing support, said lanthanide catalyst comprising at least one element selected from the group consisting of La, Ce, Pr, Nd, Sm, Eu, Gd, Tb, Dy, Ho, Er, Tm, Yt, Lu and mixtures thereof, whereby said element is in a form selected from the group consisting of metallic forms, hydroxide forms, oxide forms, carbonate forms, bicarbonate forms and mixtures thereof, whereby said fuel is ignited at least partly by a laser ray.

The lanthanide catalyst used in the various processes of the invention disclosed here above comprises advantageously more than one atom of the group consisting of La, Ce, Pr, Nd, Sm, Eu, Gd, Tb, Dy, Ho, Er, Tm, Yt, Lu. For example, said catalyst will comprise one or more first atoms of said groups having at least a valence +4, and one or more second atoms of said group having at least a valence +3, while not having a valence +4. Atoms having two different valences are preferred, such as Ce, Tu, Tb, Sm and Yb. According to a preferred embodiment, the catalyst comprises at least three rare earth (RE) compounds, a first RE compound comprising a valence of 3 and 4, a second compound having a valence of 2 and 3, and a third having a valence of 2, 3 and 4, said third compound making a kind of link between the first and the second compounds.

Advantageously, the catalyst suitable in all the processes of the invention has advantageously a low content in Vanadium and is preferably substantially free of vanadium. For example the vanadium content of the catalyst is such that the atomic ratio Vanadium/the sum of the atoms selected from the group consisting of La, Ce, Pr, Nd, Sm, Eu, Gd, Tb, Dy, Ho, Er, Tm, Yt, Lu is less than 1, preferably less than 0.5, most preferably less than 0.1, such as less than 0.05, less than 0.01, etc. According to a specific embodiment, the atomic ratio Vanadium/cerium is less than 1, preferably less than 0.5, most preferably less than 0.1, such as less than 0.05, less than 0.01, etc.

The catalytic system of the invention comprises advantageously at least:
- a support containing at least one atom selected from the group consisting of aluminium and iron,
- at least one deposit contacting said support, said deposit containing advantageously at least Ce, Pr, Nd and La, whereby said deposit comprising a series of adjacent grains with a size greater than 1 µm, whereby said grains of said series have a first face in direct contact with the support and a second face not contacting the support, whereby said deposit covers a first portion of the support, while not covering a second portion of the support so as to define zones extending between adjacent grains,
- a first group of carbon nano/meso film contacting only a portion of the second face of one deposit, whereby leaving at least partly said second face of said deposit free of carbon deposit,
- a second group of carbon nano/meso film contacting only partly the second portion of the support, and
- a carbon containing structure extending between at least one carbon nano/meso film of the first group and at least one carbon nano/meso film of the second group.

The catalyst of the invention is advantageous for controlling a hetero homogeneous reaction, i.e. a reaction in surface and homogeneous in volume, a stratified homogeneous reaction.

In the present invention, the carbon nano/meso film can be monolayered or multilayered.

Most preferably, the catalytic system of the invention or used in any one of the process of the invention is free or substantially free of lead. For example, the maximum allowed lead content in the catalytic system is 10 ppm, preferably 5 ppm, most preferably 1 ppm. It means that the lead content in the catalytic system is preferably lower than said maximum allowed lead content.

Advantageously, the carbon containing structure extending between at least one carbon nano/meso film of the first group and at least one carbon nano/meso film of the second group comprises agglomerated carbon nano/meso particles or meso or microtubules. Such structure is for example the structure of fullerene and/or buck minster. The carbon structure can be spheroids, flat, etc.

According to a preferred embodiment of the catalytic system of the invention or used in any one of the processes of the invention, the carbon containing structure comprises a condensed liquid hydrocarbon phase, advantageously comprising condensed liquid hydrocarbons with a condensation temperature below 300° C. at atmospheric pressure. Active carbon nanoparticles or microtubules are advantageously dispersed in said condensed liquid hydrocarbon phase. Advantageously, the carbon nanoparticles content in the hydrocarbon phase is of at least 20% by weight, preferably at least 40% by weight. According to a preferred embodiment, the carbon nano/meso structure is suitable for absorbing and releasing condensing product, preferably for releasing reaction product or radicals issued from absorbed condensed products.

The active carbon nanoparticles and/or microtubules have advantageously an elementary size of less than 10 nm, such as from 1 to 5 nm.

According to embodiments, the deposit comprises at least one further atom selected from the group consisting of Eu, Sc, Yb, Fe, Zn, Ni, Mn, Ca, Mg, Ba, Si, Cu, P, N, S, C, Fl, Cl and mixtures thereof.

Advantageously, the grains of the deposit have a lamellar structure, while the deposit comprises cerium oxide.

The carbon nano/meso particles are advantageously activated carbon particles.

According to a specific embodiment, the weight ratio Ce+Pr+La+Nd/C in the catalytic system of the invention or used in any one of the processes of the invention, after removal of the condensed liquid hydrocarbon having a condensation temperature of less than 300° C. at atmospheric pressure is comprised between 0.05 and 10, preferably between 0.1 and 1.

According to another detail of a preferred embodiment, the catalytic system of the invention or used in any one of the processes of the invention has a BET surface of at least 2 m$^2$/g after being treated at 300° C. for 8 hours at atmospheric pressure. Advantageously the cerium containing deposit is porous and has such a porosity. Preferably, the deposit, the carbon nanoparticles of the first group, the carbon nanoparticles of the second group, and the carbon containing structure has a BET surface of at least 2 m$^2$/g, especially greater than 5 m$^2$/g (such as from 5 to 20 m$^2$/g) after being treated at 300° C. for 8 hours.

The catalytic system of the invention or used in any one of the processes of the invention is advantageously free of Pt, Ir, Pd, Rh, Au and Ag, while comprising at least one doping atom selected from the group consisting of Fe, Zn, Ni, Mn, Ca, Mg, Ba, Si, Cu, P, N, S, C, Fl, Cl and mixtures thereof.

According to a detail of an advantageous embodiment, the carbon containing structure comprises a condensed liquid hydrocarbon phase comprising from 3 to 30% by weight Oxygen, preferably from 5 to 20% by weight. Oxygen.

Advantageously, the deposit has a maximum thickness of 100 μm, preferably a maximum thickness of 50 μm, most preferably a maximum thickness of 10 μm.

According to specific embodiments, more than 90% by weight (preferably more than 95% by weight, most preferably more than 99% by weight) of the deposit and the carbon containing structure is constituted from atoms selected from the group consisting of C, Ce, Pr, Eu, Sc, Yb, Nd, La, 0, H, N, S, P, Ca.

Advantageously, the deposit containing Ce/Pr/Nd/La comprises some grains with a size greater than 100 nm, advantageously comprised between 250 nm and 200 μm, preferably with a size comprised between 1 μm and 20 μm. For example the cerium containing deposit comprises cerium containing particles or flakes with a size greater than 1μ, advantageously from 1 to 20 μm, and some cerium containing particles with a size of less than 1 μm. For example the weight ratio fraction of cerium containing deposit on the support with a size greater than 1 μm/fraction of cerium containing deposit on the support with a size less than 1 μm is greater than 0.2, preferably greater than 1, most preferably greater than 5, for example greater than 10, greater than 50, greater than 100, or even more. According to a specific embodiment, more than 99% by weight of the cerium containing deposit in contact with the support has a size of more than 1 μm.

The deposit Ce/Pr/Nd/La (which is distinct from the carbon particles forming bounds between the cerium deposit and the support) has advantageously a Ce/Pr/Nd/La content of at least 25% by weight, preferably of at least 35% by weight, most preferably of more than 50% by weight.

Preferably, the cerium deposit of the catalytic system of the invention or used in any one of the processes of the invention comprises at least 0.5% by weight La, in particular between 1 and 5% by weight. The presence of La seems to stabilize the deposit and its efficiency on the support, especially on the aluminium containing support.

The catalytic system of the invention or used in any one of the processes of the invention comprises also advantageously, for example at the interface with a hydrocarbon phase such as a condensed liquid hydrocarbon phase, complexes of carbon with one or more elements selected from the group consisting of cerium, europium, ytterbium, praseodymium, lanthanum and neodymium.

Such complexes have for example the general formula $RE_q@C_p$, with q an integer from 1 to 5, p a number from 10 to 200, advantageously from 20 to 100, and with RE selected from the group consisting of lanthanum, cerium, europium, ytterbium, praseodymium, terbium, samarium and neodymium.

Specific complexes of the peroxene type are La@C 60, Ce@C27, etc., $CeO_3C_{9-110}$. Such complexes can also be asphaltenes.

The catalyst coating present in the chamber is at its surface in contact with the burning zone, as well as in its core, i.e. outer activity and inner activity. The inner activity of the catalyst is for example due to the absorption or release of electron from the cerium, europium, etc., as well as for the capture or release of radicals.

The cerium containing deposit has advantageously a porosity suitable for receiving hydrocarbon compounds which are liquid or gaseous at a temperature of less than 300° C.

The invention relates also to a combustion process in which a carbon containing material is burned at least partly at a temperature higher than 700° C. and at a pressure higher than 10 10$^5$ Pa, said process being catalysed by at least a catalytic system of the invention as disclosed here before.

Such a process is for example the combustion process of an internal motor, such as a two or four strokes combustion.

Advantageously, the burning when using the catalytic system of the invention or when carried out according to any one of the processes of the invention is at least made partly in an atmosphere with a water vapour concentration of at least 10% by volume, advantageously of at least 15% by volume, preferably at least 20% by volume.

Preferably, the catalytic system of the invention or used in any one of the processes of the invention is at least intermittently contacted with a Cerium containing gaseous combustible mixture comprising less than 10 ppm Ce, preferably less than 5 ppm, most preferably less than 1 ppm Ce. The burning of such a cerium containing combustible mixture enables a regeneration or a rejuvenation of the catalytic system.

The regeneration or rejuvenation step is advantageously intermittent with period of more than 10 minutes, advantageously more than 30 minutes, preferably more than 60 minutes between two successive regeneration or rejuvenation step. A regeneration or rejuvenation step is a step suitable for improving the catalytic burning efficiency of the catalytic system, for example for restoring at least 80%, preferably at least 90%) of the maximum initial burning efficiency of the catalytic system. The efficiency of the catalytic system is for example determined by determining one or preferably more by-products present in the exhaust burning flue gases, such as $NO_x$, soot, CO, particulate materials, and/or the burning efficiency of combustible material, such as diesel fuel.

It has been observed that when having an efficient catalyst coating on at least 10% of the combustion chamber, advantageously at least 25% of the combustion chamber or the zone thereof in contact with gas temperature higher than 800° C., a better suction of the burning gases outside thereof was achieved.

The suction was still improved when providing the exhaust system (system outside the burning room, such as exhaust manifold, pipes, tail pipes, silencer, converter, etc.) with a Ce/Pr/La/Nd catalytic system, especially a catalytic system of the invention.

Therefore, preferably the admission of the combustible material is preferably carried out after the closing of the exhaust valve(s) (direct injection in the burning chamber) and/or about at the end of the (fresh) air intake prior to inlet valve closing through port injection. Most preferably, the admission of the fuel is carried out after the closing of the exhaust and inlet valves, such as by means of a direct injection system, such as an electronically controlled direct injection system.

According to a preferred embodiment of the process of the invention, at least 95% by weight of the carbon containing combustible is burnt in presence of an amount of catalytic system such that the weight ratio carbon containing combustible/catalytic system is lower than 0.1, advantageously lower than 0.05, preferably comprised between 0.02 and 0.0001.

According to a further detail of a preferred embodiment, the catalytic system of the invention or used in any one of the processes of the invention develops a surface area of at least 100 cm$^2$ per cm$^3$ of the burning chamber, advantageously of more than 250 cm$^2$ per cm$^3$ of the burning chamber, preferably of more than 1000 cm$^2$ per cm$^3$ of the burning chamber, such as from 1000 to 5000 cm$^2$/cm$^3$.

According to another detail of a preferred embodiment, the catalytic system of the invention or used in any one of the processes of the invention has a BET surface of at least 2 m$^2$/g after being treated at 300° C. for 8 hours.

Preferably, the deposit, the carbon nano/meso particles of the first group, the carbon nano/meso particles of the second group, and the carbon containing has a BET surface of at least 2 m$^2$/g, especially greater than 5 m$^2$/g (such as from 5 to 20 m$^2$/g) after being treated at 300° C. for 8 hours.

For 100 cm$^3$ of a burning chamber, it is preferable to use an amount of catalyst corresponding to at least 0.5 g, for example comprised between 0.7 and 5 g. The amount of catalyst is advantageously greater than the amount of burning fuel in contact with the catalyst. The amount of catalyst in the burning chamber, such as of an internal combustion engine will thus be function of the volume of the burning chamber, but also of the air/fuel weight ratio. Advantageously, the sum (amount of deposit contacting the support+amount of carbon nanoparticles+amount of carbon containing structure of the catalyst system) is at least 0.5 g (preferably between 0.7 and 5 g) per 100 cm$^3$ of maximal volume of the burning chamber.

The catalytic system of the invention or used in any one of the processes of the invention can be deposited by using a coating composition for providing a catalytic system or a precursor thereof on at least one wall of a burning chamber (i.e. a surface in direct contact with a burning flame (hot flame and/or cool flame) as well as surface in indirect contact with a burning flame, i.e. in contact with very hot gases able to burn without formation of visible flame) and/or an exhaust system of said burning chamber, preferably on a wall of the burning chamber and on a wall of the exhaust system. Most preferably, a wall of the exhaust system adjacent to the outlet of the burning chamber is provided with the catalytic system or a precursor thereof, preferably a catalytic system of the invention or a precursor thereof.

The coating composition comprises at least:
solid particles comprising advantageously at least Ce, Pr, Nd and La, said particles having a size of more than 1 μm, advantageously comprised between 2 and 20 μm, such as flakes, lamellar structured particles, substantially mono lamellar particles; and
carbon nanoparticles or nano/meso tubules, especially activated carbon nanoparticles, said particles having advantageously a weight average particle size lower than 500 nm, preferably lower than 250 nm, especially lower than 100 nm, such as lower than 50 nm.

In the present invention, the carbon nanoparticles or micro tubules can form together chain or particles, such as from crystallite to nodules and from agglomerates to aggregates.

The composition further comprises advantageously an adhering agent, said adhering agent being advantageously an adhering agent liquid at a temperature of 50° C. at atmospheric pressure. Preferably, the adhering agent is able to be vaporized at a temperature of less than 250° C. at atmospheric pressure. Said adhering agent is for example a solvent being advantageously evaporated at a temperature greater than 20° C. at atmospheric pressure. The adhering agent is advantageously a carbon containing compound, especially an oily compound or a wax.

Preferably, the adhering agent is an agent able to be vaporized at a temperature of less than 250° C. at atmospheric pressure, such as less than 120° C., preferably less than 80° C.

The adhering agent is for example an agent having a sufficient adhesion property for less than 5 minutes, such as for less than 3 minutes, but more than 10 seconds, preferably more than 30 seconds.

In the present invention, the carbon nanoparticles or microtubules can form together chain or particles or films, such as from crystallite to nodules and from agglomerates to aggregates.

The catalytic system of the invention or used in any one of the processes of the invention is advantageously applied by spraying and/or pulverising and/or blasting and/or blowing and/or coating a wall of the reactor and/or burning chamber and/or exhaust system.

It is possible to applying the adhering agent with the Ce/Pr/Nd/La/etc. containing compound. However preferably, the adhering agent is firstly applied on the surface to be coated of the combustion chamber, while thereafter a dry or substantially dry Ce/Pr/La/Nd/etc. containing particles or powder is sprayed and/or blown on the surface of the burning chamber or exhaust system thereof.

It can be suitable to apply an aluminium containing coating or layer or primer, such a sleeve, prior to the application of the Ce/Pr/La/Nd/etc. containing catalytic system or precursor thereof.

Possibly some heat intermediate treatment(s) can be operated after the application of one or more layers of catalytic system or precursor thereof, such as after the deposit of an aluminium containing support, after the deposit of a Ce/Pr/La/Nd/etc. containing coating.

Such a heat treatment, for example a drying step, a curing step, etc. is for example carried out at a temperature below 250° C., but can also be a calcination step (for example at a temperature higher than 450° C., such as above 600° C., preferably from 600 to 1200° C. The calcination step is advantageously carried out at a temperature and for a period not sufficient for melting the support. most preferably, the drying or calcinations is a flash drying or calcination, such as drying step or a calcination in less than 15 seconds, for example in less than 10 seconds, such as during about 5 seconds.

The heat treatment is carried out in an oxygen containing atmosphere, such as air, oxygen, oxygen enriched air, inert gas atmosphere, etc.

It has also been observed that when using a catalyst suitable for steam reforming, the efficiency of the catalyst can be increased by adding some active carbon, especially active carbon nanoparticles, nanotubules or nano/meso films.

When referring to a burning reaction, said burning reaction is for example a burning carried out in an internal combustion engine using petrol as fuel, i.e. an Otto internal combustion engine, in which the air/fuel weight ratio for an effective ignition by one or more spark plugs is comprised between 10:1 and 20:1 (preferably between 14:1 and 20:1), and to an internal combustion engine using diesel as fuel in which the air/diesel weight ratio for an effective ignition by compression is comprised between 10:1 and 18:1. As the working range of the engine is increased, it is possible to adapt the volumetric compression ratio during the working of the engine, for example by admitting a larger amount of air. The catalyst of the invention enables thus a correct working of an internal engine using petrol with an increased air/fuel weight ratio with respect to a conventional petrol engine motor.

For diesel engine, it is possible to work with reduced air/weight ratio with respect to conventional engine, whereby enabling a reduction of the mechanical compression ratio.

The invention still relates to an internal combustion engine using petrol as fuel suitable to work with an enhanced mechanical compression ratio (such as from 11 to 15.5, preferably from 11.5 to 15.5, such as 12, 13, 14.5, 15), i.e. with a mechanical compression ratio greater than the actual in use 7.5-10.5 mechanical compression ratio range for actual petrol engine, but also to internal combustion engine using diesel as fuel suitable to work with a reduced mechanical compression ratio (such as from 11 to 15.5), i.e. with a mechanical compression ratio lower than the actual accepted 16-21 mechanical compression ratio range for diesel engine. It means that by using the catalyst of the invention or the process of the invention, motor or engine can be designed for working with a mechanical compression ratio comprised between 11 and 15.5 whatever be the fuel, i.e. petrol and diesel. It means also that a motor can be designed so as to work once with petrol and once with diesel, or designed so as to avoid damage when filling petrol in the tank of a diesel designed engine.

This enlarged range of mechanical compression for an effective ignition is expected to be due to the formation of CO and/or radicals and/or syngas. CO is expected to act as detonation inhibitor.

The invention relates thus also to a gaseous fluid comprising CO for controlling the detonation, especially to have an inhibition of the detonation.

DESCRIPTION OF THE DRAWINGS

FIG. 17 is a pressure/volume diagram for a combustion of the invention (wide open throttle), FIG. 18 is the diagram showing the burning rate in function of the time (expressed in ° of rotation of the shaft) for the combustion of FIG. 17, FIG. 19 is a pressure/volume diagram for a combustion of the invention (torque 51 Nm), FIG. 20 is the diagram showing the burning rate in function of the time (expressed in ° of rotation of the shaft) for the combustion of FIG. 19, FIG. 21 is a schematic Pressure/volume diagram of a combustion cycle for a motor of the invention and for a motor not of the invention.

FIG. 33 is an enlarged microscopy picture (X ray diffraction) of a small portion of an embodiment of the catalyst of the invention (enlargement 25000 times).

FIG. 34 is a view of the hot zones and cold zone of an cylinder head of the invention and a cylinder heat not of the invention.

FIG. 36 is a schematic view of the detonation principle versus the deflagration principle of the invention.

DETAILED DESCRIPTION OF EMBODIMENT OF THE INVENTION

Figure 3:
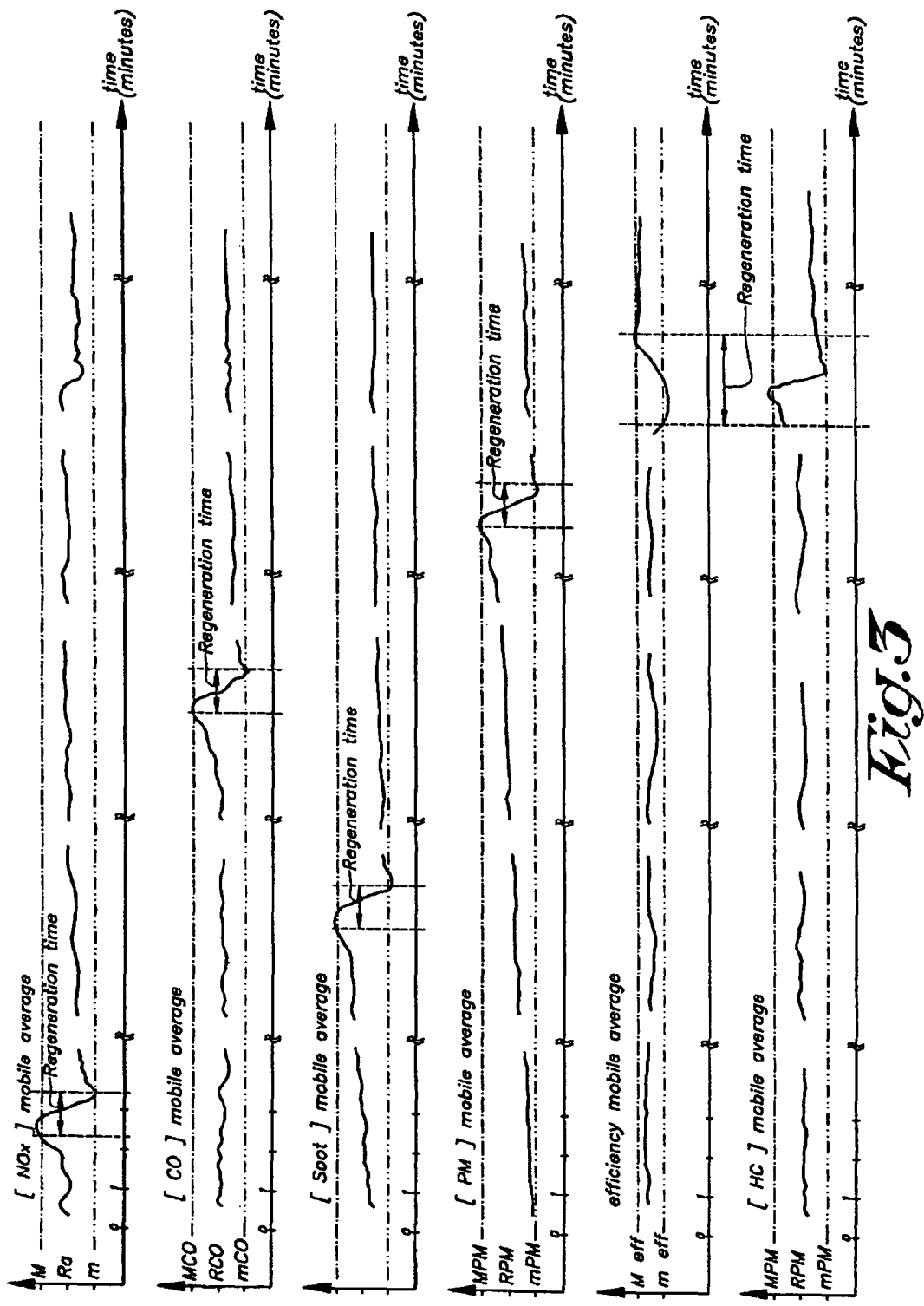
FIG. 3 is a schematic view showing variation of $NO_x$ content in the flue gases.
Figure 14:
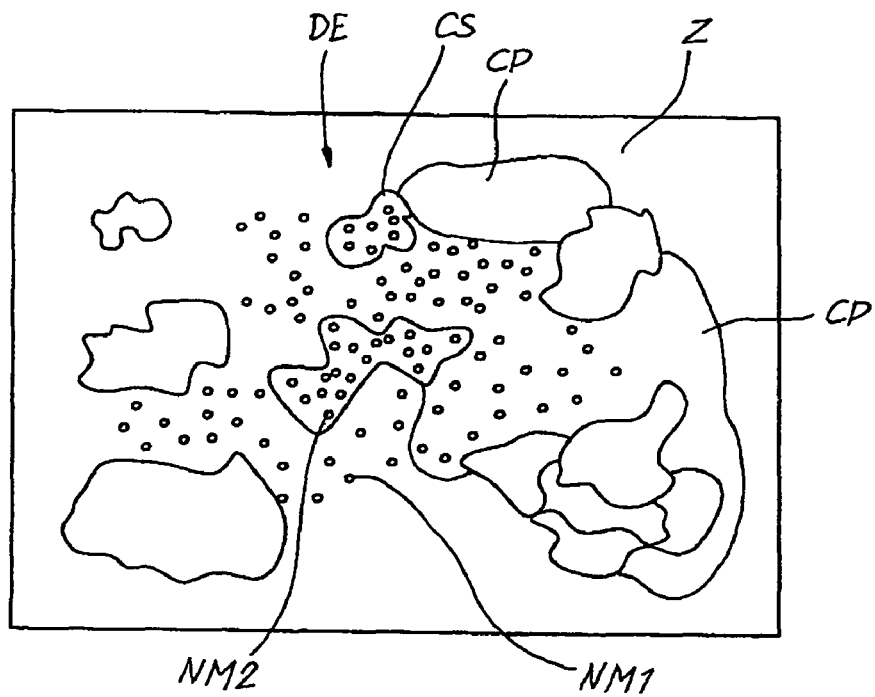
FIG. 14 is an enlarged schematic view of a catalyst coating.

The invention relates thus to a catalytic radical reaction carried out in presence of a catalytic system comprising a support, advantageously a cast iron, advantageously grey iron, most preferably an aluminium containing support, such as an aluminium containing cast iron support, provided with a catalytic deposit contacting advantageously at least one aluminium atom, and carbon nano/meso structures with a size comprised between 0.1 nm and 800 nm, advantageously between 0.5 nm and 500 nm, preferably comprised between 40 nm and 400 nm, such as particles, nanotubes, nanofilms, etc. A catalytic system is schematically shown in FIGS. 14 and 33. Microscopic views of a catalytic system of the invention after being treated at 300° C. for 8 hours at atmospheric pressure ($10^5$ Pa) for removing liquid hydrocarbons having a condensation temperature of less than 300° C. at atmospheric pressure are shown in FIG. 3, the enlargement being respectively 25000 times. The cristallographic analysis showed a substantially complete $CeO_2$ cristallic form with some traces of $Ce(OH)_3$ on the top of the piston head. The cristallographic analysis showed also the presence of large amount of amorphous carbon deposits The deposit DE contains at least Ce/Pr/Nd/La and advantageously at least one or more further elements selected from the group consisting of Sm, Eu, Gd, Tb, Dy, Ho, Er Tm, Yt and Lu. The deposit comprises a series of adjacent grains with a size greater than 1 μm (in the form of adjacent spots CS). The grains have a first face DEF1 in direct contact with the support and a second face DEF2 not contacting the support. Said deposit covers a first portion of the support, while not covering a second portion of the support so as to define zones ZF extending between adjacent grains DE, said zones ZF being then advantageously free of Ce/Pr/La/Nd deposit in direct contact with the support.

Figure 30:
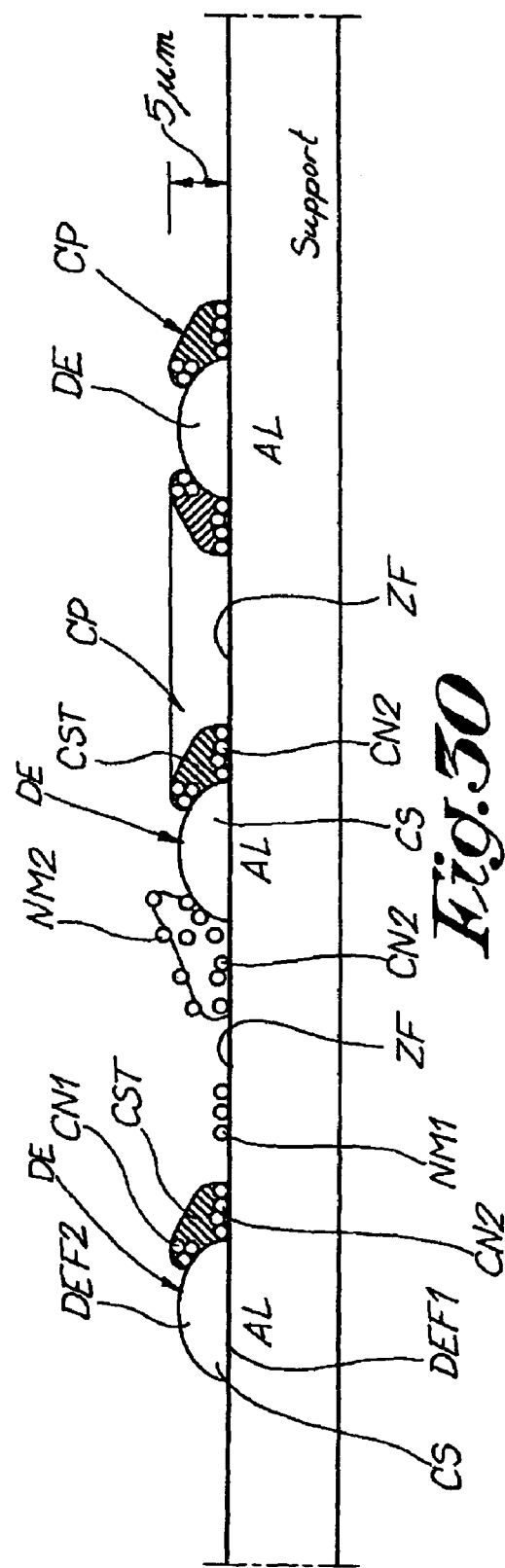
FIG. 30 is a schematic view in cross section of a catalytic system of the invention.

The catalytic system further comprises
a first group of carbon nano/meso structures (active carbon nano/meso particles) CN1 contacting only a portion of the second face of the deposit DEF2, whereby leaving at least partly said second face DEF2 free of carbon deposit,
a second group of carbon nano/meso structures (active carbon nano/meso particles) CN2 contacting only partly the second portion of the support (portion of the zones ZF), and
a carbon containing structure CST extending between at least one carbon nano/meso structure of the first group and one carbon nano/meso structure of the second group, said carbon structure comprising advantageously carbon nano/meso particles. (see FIG. 30) Said carbon containing structure forms also a carbon phase CP connecting adjacent catalytic spots CS.

The group formed by the deposit, the carbon nano/meso structures or particles of the first group, the carbon nano/meso structures or particles of the second group, and the carbon containing has a BET surface of at least about 5 $m^2/g$ after being treated at 300° C. for 8 hours, such as a BET surface comprised between 5 and 20 $m^2/g$, especially between 5 and 10 $m^2/g$.

The carbon containing structure comprises liquid condensed hydrocarbons with a condensation temperature of less than 300° C. at atmospheric pressure (1 atm). Some nano/meso structures or particles NM2 containing Ce/La/Pr/Nd are bound at the outer surface of the carbon phase CP or carbon structure CST, while some other nano/meso structures or particles NM1 containing Ce/La/Pr/Nd are bound directly at the surface ZF of the support.

The carbon nanostructures or particles is advantageously of the carbon black type or in the form of film structure such as a monolayered carbon film structure, a multi layered carbon film structure (such as film structures comprising from 2 to 10 carbon layers, advantageously from 3 to 6 carbon layers.

The carbon nanoparticles or structures are advantageously electrically conductive or having a low electrical resistance. The carbon black particles in said structures have as such advantageously a primary particle size of less than 30 nm, preferably between 15 and 25 nm, a bulk density of less than 150 $kg/m^3$, preferably less than 120 $kg/m^3$, an electrical resistivity of less than 10 ohm·cm, preferably of less than 1 ohm·cm, most preferably comprised between 0.01 and 0.1 ohm·cm, and a surface area BET greater than 75 $m^2/g$, preferably greater than 125 $m^2/g$, most preferably greater than 200 $m^2/g$. The carbon nanoparticles or nano/meso structures are advantageously amorphous (in the sense that they are not visible through a RX analysis and/or that substantially homogeneous large grey or black coloured areas appear through a RX analysis) and are preferably prepared from acetylene. Such carbon black are for example Ketjenblack® from AKZO or Blackpearls® 2000 from CABOT.

The carbon nanoparticles or nanostructures are suitable for acting as absorbing means, i.e. for water absorption, but also for chemical sorption, namely for chemisorber oxygen groups such as phenol, carboxylic acid and ketones. In function of the chemisorption at the surface of the carbon black particles, the pH of the carbon black particles varies from a slightly alkaline (8-10—no oxygen groups being absorbed) to an acid (2-6, after absorption of oxygen containing compounds). Such structures are also suitable for controlling the number of active radicals, by absorbing radicals when too many radicals are present in the reaction chamber and by releasing radicals when the number of radicals in the reaction chamber is for example below a determined amount.

Possible radicals, when having a burning reaction or a reaction in which a hydrocarbon compound is at least partly oxidized, are advantageously selected among the group consisting of CH·· , $CH2^·$, $CH3^·$; $OH^·$, $H^·$, $^·C^·$, $CO^·$ and combinations of these. The carbon nanoparticles or nano/meso structures, when present in an effective catalyst system of the invention or in a fresh catalyst system has advantageously a reduced PAH content in the flue gases or in the condensed hydrocarbon, and is preferably free of PAH. During the working of the catalyst, some PAH will be absorbed by the carbon nano/meso particles during the cooling phases and liberated back or released during hot burning phases essentially in harmless compounds, whereby maintaining a controlled PAH content below a maximum as long as the catalyst is effective.

It is expected that during the compression phase of a motor engine, a cracking of carbon molecules having a high molecular weight occurs, whereby cracking possible PAH in harmless compounds which are more easily burnable or reduced.

After removal of condensed liquid hydrocarbons by heat treatment at a temperature of 300° C., the weight ratio [Ce/Pr/La/Nd]/C is comprised between 0.1 and 1, for example 0.2, 0.5, 0.7. The condensed liquid hydrocarbon phase comprises advantageously from 5 to 20% by weight oxygen, such as 7%, 10%, 15% by weight. The Carbon/cerium atom ratio in the catalyst system after removal of the condensed liquid hydrocarbon condensing at a temperature of 300° C. is advantageously comprised between 4 and 8.

The catalytic system is free of Pb, Pt, Ir, Pd, Rh, Au and Ag, while containing at least one further atom selected from the group consisting of Eu, Sc, Yb, Fe, Zn, Ni, Mn, Ca, Mg, Ba, Si, Cu, P, N, S, Fl, Cl and mixtures thereof.

Such a catalytic system can be used for catalysing various reaction, such as suitable for catalysing hydrocarbon reactions with oxygen, especially for catalysing burning processes, such as the burning of fuel, hydrocarbons, toxic materials, oxidation reaction, reduction reaction, etc. so as to reduce the exhaust in the flue burning gases of oxidised harmful by-products (NOx, CO, soot, particulate material), as well as partially burnt hydrocarbons, PAH, $H_2$, HAP, dioxins, furans, etc., and to improve the burning efficiency and the complete burning into end product $CO_2$ and $H_2O$.

The catalytic system is particularly suitable for catalysing the burning of combustible materials, especially carbon containing materials.

The catalytic or catalysed burning process of the invention can be operated in a closed chamber (with intermittent opening of door(s) or valve(s)) or in an open chamber, such as boiler, reformer, fuel cells, kiln, incinerator, ovens, steel works, power station, explosion chamber, turbines, burner, central heating system, grass cutting machine, HCCI (heterogeneous charge compression ignition), HCSI (heterogeneous charge spark ignition), CAI or homogeneous combustion engine, rocket, guns, flat engines, space shuttle, air planes, furnaces, propellant, pulsation combustion, auto inflammation engine, engine merging jet and IC engine technology, such a hybrid engine in which the combustible material is burn in a burning chamber, whereby the flue gases are exhausted in a turbine suitable for driving a driving shaft. The catalytic coating of the invention can also be used in jet fan turbine or pulsed combustor, in which at least part of the burning is operated in accordance to a deflagration pattern, possibly followed by a detonation pattern. In said jet turbine, the burning is operated advantageously in a central system surrounded by one or more channels for air flow(s), said air reducing the temperature of the outer wall of the central burning system and add fresh air in the flue gases flowing out of the central system. The burning can thus also be operated in accordance to a subsonic pulsed deflagration pattern. As the temperature of the flue gases are reduced (the fuel consumption being lesser for the same power output with respect to a burning system not provided with the coating of the invention), the size of the outer channel(s) can possibly be reduced or downsized.

The catalytic composition of the invention has also some lubricating properties, such as enabling a better surface gliding, lesser mechanical resistance, lesser initial mechanical resistance, friction resistance.

During the compression step, a cool burning occurs, whereby at least some CO is formed, said CO being advantageous for controlling the further burning step, for example according to a deflagration step. Said cool burning is also advantageous as it is expected that the cracking of hydrocarbon compounds with high molecular weight or of carbon structures will consume some free hydrogen, whereby reducing the free hydrogen content and/or whereby fixing free hydrogen on carbon atom(s) so as to render it more burnable or oxidable.

Examples of motors or combustion chamber in which the process of the invention can be operated are:

Linear motors, multistrokes motors (2, 4, 6, 8, 10, 12, etc. strokes), jet, turbine, turbojet, fan jet, statoreactor, rotative explosion motor (such as motors of the Wankel family), steam combustion motors, reciprocating motors, spark ignition motors, compression ignition motors, rocket type, motor with variable compression ratio, motor with and/or without variable lift and valve opening (in time and/or in position) and/or with or without butterfly, turbocompressor, supercharger, etc., with or without pre and/or post combustion. The combustion can be homogeneous, heterogeneous, stratified, and/or any combinations thereof. The combustion can be lean, rich, stoechiometric, or a combination thereof. The combustion is for example successively carried out without mechanical controlled feedback means (such as mechanical electronic control feedback system, mechanical/gas flow control feedback system, mechanical/electrical control feedback system, or any other mechanical feedback system controlling the lean and/or rich environment in the burning chamber) in reducing and oxidizing environment, the catalyst shifting quickly from a "lean" or "extra lean" or oxidising condition towards a "rich" or reducing condition and inversely. Said shift of the catalyst condition is quite continuous in function of the time for each engine regimes. The catalyst acts as an automatic chemical control system of the environment of the burning chamber, said control being carried out by the formation of CO and/or $CO_2$ during the cool burn reaction, by the capture of radicals at least at the first stage of the deflagration pattern and by the release of radicals at least at a second stage of the deflagration pattern. The motor can be cooled by air, water, oil, over fuel, refrigerant, synthetic refrigerant, etc.

Another possible motor is a hybrid motor using an water admission in the burning chamber. Said motor uses the catalyst for dissociating water into $H_2$ and O and/or OH and H in a first step, said species reacting thereafter for forming back water. Said first step is advantageously carried out in presence of one or more hydrocarbon compounds, such as one or more alcohols, such as ethanol, etc.

A possible sequence of said motor is:

pre injection of hydrocarbon in the burning chamber injection at the top dead centre of additional hydrocarbon(s)

after injection of water and/or water vapor in the burning chamber condensing at least partly the gases exhausted from the burning chamber, for example by adjusting the overlap opening of the inlet and exhaust valves.

While not being bound to any theory, it seems that such a quick shift from reducing condition towards oxidising condition and inversely enables a $NO_x$ conversion in lean or oxidizing condition according to the formula $NO+\frac{1}{2}O_2 \rightarrow NO_2$ fixed on a deposit with liberation of $CO_2$, while a NOx conversion in rich or reducing conditions according to the formula $CO+HC+H_2 \rightarrow$ release of $NO_x$ previously fixed on a deposit which then further reacts with CO so as to form $N_2+CO_2$.

The catalyst of the invention is also suitable for dissociating water into $H_2$ and $O_2$ and/or H and O, for example as soon as the catalyst has a temperature higher than 200° C., advantageously higher than 300° C., for example at a temperature comprised between 350° C. and 650° C.

Examples of possible fuels which can be used in the process of the invention are: Gas, methane, butane, propane, liquid, solid fuel, powder fuel, coke, biofuel, natural fuel, synthetic fuel, hydrazine, rocket fuels, hydrocarbons, petrochemical fuels, solid fuel, liquid fuel, gaseous fuel, rubber (synthetic/natural), dust fuel, sugar, alcohol, ethanol, crude oil, diesel, petrol, alcohol, waste, natural gas, synthesis gas fuel, hydrogen, algae, peat, coal (pulverized or not), etc., and mixtures thereof, with or without water addition and with or without additives, such as scavengers (for example organo-metallic compound).

The reaction is advantageously at least partly carried out in gaseous phase. For example, when spraying the fuel in a combustion chamber, the fuel is vaporized, whereby a heterogeneous catalytic reaction occurs. It is expected that some carbon containing compounds in gas phase are absorbed and transformed at the surface of the catalytic system, before being released. The capture and release of carbon containing compound from the gaseous burning phase can also partly explain the shift between oxidising and reducing conditions and inversely.

The fuel can be admitted in the burning chamber through injectors or nozzles for direct admission of the fuel into the combustion chamber or for indirect admission (for example for injecting the fuel in the combustion air before its introduction in the combustion chamber). The injection can be made intermittently and/or continuously, for example one injection for one combustion step or stroke, pilot injections, several intermittent injections for one combustion step or stroke, such as a pre injection, a principal injection and possibly one or more post injections, such as also a multiple injection (a series of 4, 5, 6 or more intermittent injections with variable amount of injected fuel). The injection(s) can be operated with a dosage pump, with hydraulic means, with electromagnetic means, with piezoelectric means, with hydraulic-pneumatic means (such as the device disclosed in U.S. Pat. No. 5,494,015, the content of which is incorporated in the present specification by reference), etc. It has been observed that by using the catalyst system of the invention for controlling the burning of a fuel, it was possible to reduce the fuel consumption for a given work by a factor function of the ratio High Heating Value of the fuel/Low heating value of the fuel. It seems that the hydrogen present in the hydrocarbon compound is better used and converted into $H_2O$ and/or for cracking carbon compounds.

The ignition of the burning can be operated by one or more sparks, by compression, by light emission, by gas (flue gas) recirculation or recycling (HCCI, HCSI, CAI, etc.), by auto inflammation, or substantially by auto inflammation, said ignition being for example operated in a homogeneous and/or heterogeneous and/or stratified charge or premix charge.

The ignition of the burning can be a compression ignition and/or a spark ignition, followed by a surface ignition.

The ignition can also be carried out in a pre burning chamber. In such a case the precombustion is advantageously provided with a catalyst system of the invention, as well as the burning chamber and the exhaust system. According to an embodiment, the initial ignition (heterogeneous) is made on surface, whereby the condition are suitable thereafter for a volume ignition, such as a homogeneous volume ignition, and/or for ensuring a volume auto inflammation.

Advantageously, the ignition can be controlled by one or more laser rays, such as continuous laser rays, intermittent laser rays, etc.

In case of spark plug ignition, it has been observed in embodiments, a high or enhanced plasma production which induces a better ignition of the burning process.

The burning can be operated with atmospheric air, compressed air, polluted air, oxygen enriched air, oxygen, mixtures of water vapor and oxygen and/or air, peroxides, etc. The comburant can enter the burning chamber by natural aspiration, force draft (compressor, fan, turbine, supercharger such as a device disclosed in U.S. Pat. No. 6,328,004, the content of which is incorporated in the present specification by reference, etc.).

The burning is at least operated according to a deflagration pattern. It seems that an efficient formation of some CO during the compression step or that the presence of a sufficient amount of CO in the combustion chamber is a suitable means for controlling the burning reaction in accordance to a deflagration pattern. After said deflagration pattern, the burning can possibly further be operated according to an detonation pattern.

The control of the fuel supply and/or injection, especially of motor engine, can be operated by mechanical and/or electronic and/or pneumatic and/or magnetic means.

The best burning process is achieved by direct injection (spark ignition or compression ignition) enabling multiple injection steps during the intake and/or the compression. One or more injection steps are preferably operated when the exhaust valve is closed, whereby enabling an early cool burning. For diesel fuel, injection step(s) before (i.e. for achieving a cool burning) and during the hot burning.

The burning process can be provided with a gas recycling, such as an exhaust gas recycling starting from the exhaust valve and/or from the exhaust manifold and/or from the exhaust piping or system connected to the exhaust piping, for example connected to a portion located between the exhaust manifold and the exhaust piping or exhaust external outlet or tail pipe. Specific examples are an internal exhaust gas recycling (external exhaust gases or exhaust gases escaping the chamber through an inlet valve and/or outlet valve are at least partly flowing back in the burning chamber, for example a pipe linking the outlet manifold to the inlet manifold), an external exhaust gas recycling with or without intercooler and/or with or without a (multi) gases cleaning system (catalytic cleaning system, 3-way catalyst, four way catalyst or catalytic system, De $NO_x$ system, trapping, absorbing system, particles filters, plasma based post treatment system, combinations thereof, etc.) and/or with or without water removal or water collecting system.

When the burning chamber is provided with one or more valves (trapped valves, rotor valves, sleeve valves, etc.), said valve(s) can be operated hydro pneumatically, electromagnetically, mechanically, combinations thereof, etc. with or without variable lift and/or time opening and/or duration and/or with or without valve overlap opening or variable overlap opening. In embodiments, it has been observed that the use of an appropriate valve overlap opening of the inlet valve(s) and of the outlet valve(s) seems to be quite effective for achieving a good filling of the burning chamber without using a supercharger. Such an valve overlap opening can thus replace partly or completely a supercharger, whereby enabling a downsizing of the supercharger, the mechanical supercharger and/or the electromotor in use of the supercharger, and/or improve the working of the supercharger.

The overlap opening enables thus to increase the volumetric efficiency, but also to control the volumetric efficiency by controlling the overlap opening, such as overlap opening time, the size of the inlet and/or outlet openings.

The burning can be considered (according to the accepted standard or ratio air/fuel) as a stoichiometric burning or a lean burning or a rich burning or a mixture of lean burn and stoechiometric combustion or any combinations thereof.

However due to the catalytic system of the invention, at least in the neighbourhood thereof, the burning passes quickly from an oxidising environment to a reducing environment, and inversely. The air admission in the burning chamber can be adapted for a stoechiometric environment, while when the burning occurs, the burning shifts quickly between a lean or oxidising burning and a rich or reducing burning. Preferably, when the air admission or intake is controlled for condition corresponding to a lean burning, the burning or at least the major part thereof (for example from about the begin up to about the end, such as combustion rate corresponding for example to more than 90%, such as more than 95%) occurs in leaner condition, most preferably as an extreme lean condition, such as the most extreme possible lean condition. In the present specification, a burning is considered as a lean burning when the burning is a burning of fuel in presence of an excess of oxygen or oxygen type or oxygen species. The most oxidising burn condition of the invention corresponds to the limit of flammability of the mixture fuel/comburant be it on excess of oxygen and/or oxygen type and/or other oxidizing organic or inorganic molecules with respect to a stoichiometric. Said most oxidising burn limit depends from the motor configuration and its working. For example, the most oxidising burn limit (for example expressed as the lambda factor) for an engine of the invention is increased by at least 15%, advantageously at least 20%, preferably at least 25%, such as 30%, 40%, 50% or even more, with respect to the most lean burn limit of the same engine but without catalyst system of the invention and regeneration system. The exhaust gases of the burning of the invention correspond however to conditions corresponding to exhaust gases for a stoichiometric post combustion. When the exhaust gases escaping from an engine of the invention are treated in a post combustion system, said post combustion system has a larger range of efficient working with respect to the true stoichiometry, for example with the range 0.5 times the stoichiometry up to 2 times the stoichiometry, for example between 0.8 times the stoichiometry and 1.2 times the stoichiometry. When a post combustion is carried out, said post combustion can be homogeneous, heterogeneous, stratified, combinations thereof, with or without continuous flow, such as with a surface reactor, such as a substantially cylinder or multi cylinder reactor with wall coated with one or more catalysts, such as catalyst comprising: europium/cerium/praseodymium/ytterbium/neodymium(Nd)/Lanthanum, with or without barium, but advantageously with some barium. The efficiency of the post combustion catalyst is even regenerated by the presence in the flue gases of traces of cerium/europium/ytterbium/praseodymium/Neodymium/lanthanum.

As the catalyst of the invention enables an automatic shift between reducing environment and oxidising environment, the control of the burning can be operated without or with a simplified oxygen sensor, whereby simplifying the mapping and/or the working of the ECU (Engine control Unit). When providing a burning chamber with a catalytic system of the invention and with an $O_2$ sensors, the ECU has to be programmed correctly, as, due to the automatic shift reducing environment to oxidising environment, and inversely, the current ECU could in view of a measurement of $O_2$ increase the fuel injected, although some lesser fuel have to be injected.

The burning chamber can comprise, when burning solid materials or solid powders, a fixed bed and/or a fluidized bed and/or a pulsed bed.

Preferably, a catalytic system of the invention is present in the burning chamber as well as in the exhaust system adjacent to the burning chamber, i.e. exhaust system extending at least on a distance of less than 1 meter from the outlet of the burning chamber or exhaust system receiving flue gases from the burning chamber having a temperature of more than 400° C., preferably more than 500° C., most preferably more than 600° C.

The efficiency of the catalytic system can be controlled by determining one or more parameters, such as
- lights emitted by the burning reaction, for example the maximum light emission, such as rays within specific wavelength range, for example visible light rays, non visible light rays, UV, RX, combinations thereof,
- temperature, such as maximum temperature after the cool burning phase or the compression phase, or the difference of temperature between the start of the compression phase and the end of the compression phase,
- maximum temperature of the burning, maximum average burning temperature, etc.
- difference of temperature between the maximum cool burning temperature (or an average thereof, for example during the compression or at the end of the compression step) and the maximum burning temperature (or an average thereof, for example the peak temperature of the deflagration, the average temperature reached for a determined pressure, the temperature at the end of the burning step, the temperature when opening one or more valves for the exhaust of gases, etc.)
- pressure, such as pressure of the cool burning, pressure of the burning, peak pressure of cool burning, peak pressure of the hot burning or of the deflagration, difference of peak pressures between the cool burning peak pressure and the hot burning peak pressure, etc.
- curves pressure/temperature and/or curves pressure and/or temperature versus time, slopes thereof, etc.
- pH of the burning gas or portion thereof, for example measured after condensing
- amount of water or water vapour in the burning gases, for example after or during the cool burning, after or during the hot burning or deflagration pattern,
- gas composition, for example amount of CO and/or $H_2$ during or after the cool burning or compression step,
- combinations thereof.

Specific possible uses of the catalyst system of the invention are
- closed burning process, such as in the closed burning chamber or internal combustion engine (for example for inducing a fuel economy and a better torque or power output, as well as an increased flow and volume efficiency for the inlet, as well as for the exhaust, inducing reduced pressure in the chamber during the exhaust, inducing a reduction of the flue gas temperature, inducing condensation of compounds (possibly UHC) and water vapor, for inducing oxidation-reduction reaction whereby inducing a reduction of noxious gases in the burning chamber and/or in the exhaust manifold and/or in the cylinder head and/or in the exhaust system and/or in the post treatment system
- open burning process, such as in the open combustion chamber, for example heat engine type (piston, turbine), industrial heat combustion units (for inducing a fuel economy, a better heat use, a better flow of gas in and out of the chamber, reduction of noxious gases), in the exhaust system, as well as in the post treatment system of exhaust gases and/or in second burning unit
- open burning process associated to turbine(s), such as in the open combustion chamber, jet turbine, gas pulse jet, turbo propeller jet (for inducing for a fuel economy, a better heat use, a better flow of gas in and out the chamber, reduction of noxious gases), in the exhaust system, as well as in a possible post treatment system of exhaust gases. For the post treatment of the exhaust gases, the jet blade can be provided with the catalyst coating and/or the post combustion end is provided with the catalyst coating so as to add power to the booster device cool burning process, for the cracking or reforming of hydrocarbons or polymers reforming process, etc.

When the process is used for a car engine, the burning chamber can be provided with means for controlling the compression ratio. The chamber can thus be a chamber with a variable closed volume, so as to adapt the compression ratio as required. For example, the dead volume or top dead volume of the chamber can be varied, so that the ratio between the bottom dead volume or largest volume/top dead volume or smallest volume can be varied.

When using a spark plug for the ignition, the spark plug can be a spark plug with one or more anodes (linear, circular, etc) and with one or more cathodes (linear, circular, etc.), but can also advantageously be a spark plug with only one or more electrodes of the same sign (positive or negative), the piston (such as piston head, such as the Saab piston) and/or at least portion of walls of the burning chamber forming then the counter electrode or the ground electrode. The electrode(s) can be coated with one or more coatings, such as coatings comprising one or more atoms selected from the group consisting of Ce, Eu, Yb, Pr, Pt, Ir, Pd, Co, Cu, Au, Ag, La, Nd, etc. and mixtures thereof.

The working of the piston head working as electrode (surface electrode, flat or substantially flat surface electrode or surface electrode receptor) with the spark plug is even improved. For example, the piston head or a portion thereof or the cylinder head is provided with a catalyst of the invention.

The sparking creates a high plasma and/or ionisation and/ or dissociation effect around the spark plug. Such a better sparking is expected to be due at least partly to the cool burning step prior to the sparking and/o due to the formation of radicals.

According to a detail of an advantageous process of the invention, the burning is operated in presence of water vapor and/or alcohol (ethanol, methanol, mixture thereof) and/or glycol (ethyleneglycol, propylene glycol) and/or an aldehyde. Said water vapor (for example with a temperature comprised between 40° C. and 250° C., advantageously between 45° C. and 75° C.) possibly mixed with air is for example mixed with the intake air, injected in the intake manifold, but preferably injected directly in the burning chamber. The alcohol and/or aldehyde and/or glycol when used are preferably injected directly in the burning chamber, possibly mixed with the fuel to be injected, and possibly produced in situ in the burning chamber. Possibly, said water, alcohol, glycol, aldehyde, mixtures thereof can be sprayed directly in the burning chamber or in the intake (for example at the end of the intake, adjacent to the burning chamber) as hot liquid, for example with a temperature greater than 35° C., such as temperature comprised between 40 and 95° C.

According to a preferred embodiment of the process of the invention, the burning is at least partly operated in presence of nano/meso particles of hydrated aluminium silicate, such as clay, especially bentonite, preferably wolframite, . . . , such as colloidal suspension of these compounds.

According to a preferred embodiment, during the overlap period between the opening phase of the exhaust valve(s) and the opening phase of the inlet valve(s), wetted air or water or water vapor is admitted in the burning chamber and exhausted in the exhaust system. When the filter system or the trapping system or the converter of the exhaust system has to be regenerated, it is possible during said overlap period to admit cerium containing composition, said composition passing then substantially completely through the burning chamber for being suitable for regenerating the filter, trap system or converter or for pretreating the filter, trap system or converter so as to enable a regeneration thereof after being contacted with hot flue gases. The pretreatment step can be carried out during a series of successive overlap periods of the opening of the inlet valve and the opening of the exhaust valve.

Advantageously, the catalyst is regenerated or rejuvenated during at least some steps of the burning process, for example when the efficiency of the burning or of the content (such as the average content) of oxidised harmful or poisonous by-products (such as $NO_x$, CO, PAH, $H_2$, etc.) is higher than a maximum allowable threshold value. The regeneration or rejuvenation can be carried out during a predetermined period, such as 5 minutes or 10 minutes (i.e. period considered as sufficient for restoring the catalytic efficiency). However, the end of the regeneration or rejuvenation step is preferably controlled by determining a sufficient efficiency for example for the burning and/or for the reduction of harmful by-products.

The regeneration or rejuvenation of the catalyst can also be controlled in function of the efficiency of the cool burning step. For example, in case the peak average temperature of the compression step (for example average measured for a time period of more than 1 minutes, advantageously for more than 3 minutes, such as for 5 to 15 minutes) and/or the peak pressure of the compression step (for example average measured for a time period of more than 1 minutes, advantageously for more than 3 minutes, such as for 5 to 15 minutes) is below a minimal value, the rejuvenation or regeneration is carried out for a time which is for example predetermined or as long as an average peak temperature or pressure is not reached for the compression step (for example average measured for a time period of more than 1 minutes, advantageously for more than 3 minutes, such as for 5 to 15 minutes).

The catalyst system of the invention, which is suitable to reduce the exhaust in the flue hot burning gases of oxidised harmful by-products ($NO_x$, CO, soot, particulate material), as well as partially burnt hydrocarbons, PAH (poly aromatic hydrocarbons), $H_2$, etc., to values lower than predetermined threshold, as well as a better use of the fuel combustible (such as a burning rate greater than a threshold value) is advantageously treated intermittently, for regeneration or rejuvenation purposes, with a cerium and/or europium and/or ytterbium and/or praseodymium and/or lanthanum and/or neodymium containing composition and/or compound (said compound may contain manganese without having possible ozone problems as it would be the case in engine not provide with a catalyst system of the invention.) in presence of a gaseous medium comprising at least water vapour (especially a gaseous medium containing more than 15% by volume water, especially more than 20% by volume water) and/or exhaust combustion gases at a temperature higher than 200° C. (advantageously higher than 400° C., preferably at temperature from 500 up to 1200° C.). Said treatment or regeneration of the activity of the catalytic system is intermittent, i.e. with intermediate period without regeneration or rejuvenation, for example with intermediate period of more than 10 minutes, advantageously of more than 30 minutes, preferably of more than 60 minutes without regeneration or rejuvenation.

The regeneration or rejuvenation of the catalytic system is advantageously controlled so that a regeneration or rejuvenation step is started when the content (for example an average content measured on a period of more than 5 minutes, such as 10 minutes, 20 minutes, 30 minutes) of one or more harmful by-products in the flue gases is above a maximum allowed threshold, and is stopped when said content (for example an average content) is lower than an acceptable threshold.

In this way, it is possible to maintain one or more harmful by-products, within an acceptable range comprised between a minimum acceptable threshold or value and a maximum allowed (for example by law, directives, regulations) threshold or value, i.e. remains within a range around an average threshold or value.

Although the regeneration or rejuvenation of the catalyst of the invention is preferably carried out by means of a cerium containing gaseous medium, the catalyst of the invention can also be treated continuously or intermittently, for regeneration or rejuvenation, by burning deoxygenated fuel, such as fuel deoxygenated by membrane filtration, such as disclosed in U.S. Pat. No. 6,315,815, the content of which is incorporated in the present specification by reference. For example, deoxygenated fuel is injected or admitted in the burning chamber only when the content or average content of a harmful by-product(s) is higher than a predetermined threshold. The amount of fuel injected or admitted in the burning chamber is advantageously controlled. While said deoxygenated fuel can be injected or admitted in the burning chamber alone (without other fuel), it can be of interest in some case to inject or admit in the combustion chamber a mix of deoxygenated fuel and oxygenated fuel or a fuel not submitted to a deoxygenation step. Such a mix can for example comprise from 5 to 95% by weight of oxygenated fuel (OF) and from 95% to 5% by weight of non deoxygenated fuel (NOF), such as mix with ratio OF/NOF equal to 15, 10, 8, 5, 3, 2, 1, 0.5, 0.33, 0.2, 0.125, 0.10, 0.06, 0.04.

The regeneration or rejuvenation step or treatment can also be operated by injecting or admitting in the burning chamber oxygenated fuel possibly mixed with non deoxygenated fuel, and cerium and/or europium and/or ytterbium and/or praseodymium and/or neodymium and/or lanthanum containing composition and/or compound (said compound is however preferably substantially manganese free for avoiding possible ozone problems or other environmental problems in countries where manganese is prohibited for said problems), and by burning the fuel in the burning chamber in presence of said admitted cerium and/or europium and/or ytterbium and/or praseodymium and/or neodymium and/or lanthanum containing composition or compound. Possibly, the cerium and/or europium and/or ytterbium and/or praseodymium and/or neodymium and/or lanthanum containing composition or compound is admitted or injected after the injection or admission of the fuel, for example after the start of the combustion or ignition of the fuel, for example after that 25% of the fuel is burned, or after that 50% of the fuel is burned or after that more than 75% of the fuel is burned.

The amount of oxygenated fuel and/or cerium and/or europium and/or ytterbium and/or praseodymium and/or neodymium and/or lanthanum containing composition or compound injected or admitted to the burning chamber is advantageously an effective amount for restoring a minimum efficiency of the catalyst of the invention.

The regeneration step can be operated in phases for which no or substantially no fuel is injected.

The regeneration can also be operated with fuel containing cerium and/or europium and/or ytterbium and/or praseodymium and/or neodymium and/or lanthanum. The fuel is preferably free of Lead and Mn.

The presence of the catalyst coating on the surface of the cylinder in contact with the piston ring joint(s) acts as anti nock means.

The regeneration method disclosed here above is not only applicable to the regeneration of catalyst of the invention, but also to other catalyst present in the burning chamber or in other chemical reactors, such as hydro cracking reactors (for crude oil, vegetable oil and other hydrocarbon intermediate). The invention relates thus also in general to the regeneration of a catalyst in a burning chamber or reactor by burning in said chamber or reactor a deoxygenated fuel, possibly mixed with a non deoxygenated fuel and possibly in presence of one or more cerium and/or europium and/or ytterbium and/or praseodymium and/or neodymium and/or lanthanum containing composition or compounds. The deoxygenated fuel can be mixed prior to its admission or injection into the combustion chamber with a non deoxygenated fuel and/or one or more cerium and/or europium and/or ytterbium and/or praseodymium and/or neodymium and/or lanthanum containing composition or compound. The invention relates thus also to a fuel comprising, especially consisting essentially, of a deoxygenated fuel mixed with one or more cerium and/or europium and/or ytterbium and/or praseodymium and/or neodymium and/or lanthanum containing composition or compounds, said fuel having advantageously an dissolved oxygen level less than 20 ppm, preferably less than 10 ppm, more preferably less than 5 ppm.

Some regeneration of the catalyst can also be achieved by admitting some hydrogen in the burning chamber, so that said hydrogen could be used for cracking some hydrocarbons deposited on the catalyst, whereby improving the efficiency of the catalyst.

When burning, it seems that the addition to the feed stock of some hydrogen could be advantageous, so as to improve the cool burning and/or the cracking occurring during the cool burning.

The detection of $NO_x$ is advantageously made by one or more $NO_x$ sensors determining the $NO_x$ content of the flue gases, such as the Bosch $NO_x$ sensor. It has been observed that when operating the combustion in presence of the catalyst of the invention, a better working of the $NO_x$ sensor could be achieved and/or a more reliable $NO_x$ value could be determined with less or lower noise. The detection of $NO_x$ is advantageously carried out outside of the burning zone, for example in the exhaust system, such as in the exhaust manifold or exhaust pipe (advantageously before the passage of the flue gases in the converter or three or four ways catalyst).

The $O_2$ sensor or the lambda sensor had also a better working (better accuracy and better alternate steady state (lean/rich) and/or shorter response, i.e. a better $O_2$ measurement and/or a better rich/lean alternating) which was less or even not altered when operating the burning in presence of the catalyst of the invention. The life time of the sensors $NO_x$, $O_2$ and Lambda could also be improved. It has been observed when making tests that a far more rapid answer to the Lambda signal, which was further more far more steadier, could be achieved even when cold starting the tested engine. By modelization, it can be said that emissions of CO, NOx, soot, unburned hydrocarbons, etc. will also have a very rapid low steady state after possibly an initial peak, for example in lesser than 1 minute. This is particularly advantageous for cold-starting procedures, especially in urban or cities, whereby enabling to comply to very strict Euro Norms.

As less fuel is required in an Internal Combustion Engine (ICE) provided with the catalyst of the invention, the ECU (Electronic Control Unit) has to be adapted with respect to the ECU used in the current ICE.

In the motor of the invention or ICE, the correct working or burning is controlled by one or more $NO_x$ sensors and/or by one or more $O_2$ sensors analysing the flue gases before and/or during and/or after a post treatment, such as a catalytic post treatment, such as a three or four ways catalyst treatment system.

For the treatment step (regeneration or rejuvenation), it is possible to use various systems for adding cerium and/or europium and/or ytterbium and/or praseodymium and/or Neodymium and/or lanthanum or "cerium and/or europium and/or ytterbium and/or praseodymium and/or Neodymium and/or lanthanum" containing compound(s) in the inlet means (such as intake manifold, preferably after the throttle), in the burning chamber, in the exhaust gas recirculation system (EGR) and/or in the exhaust means (for example in and/or after the exhaust manifold). When cerium and/or europium and/or ytterbium and/or praseodymium and/or Neodymium and/or lanthanum containing compound is added in the burning chamber, the system of FR 2,731,009; U.S. Pat. Nos. 4,991,395; 4,844,028 and Celcat can be used. However, a more specific device will be disclosed later. More specifically, cerium and/or europium and/or ytterbium and/or praseodymium and/or neodymium and/or lanthanum (for example as compound containing this rare earth) is directly injected in the combustion chamber with water or water vapor or alcohol or glycol. Even if it seems to be not the best method for regenerating the catalyst, the catalyst can be regenerated by injecting cerium particles with the fuel in the burning chamber. Such a fuel can then be a fuel as disclosed in WO 03/040270 (Oxonica patent application). The fuel comprises advantageously then a mix of rare earth compounds, for example at least three different rare earth compounds, especially a mix comprising La, Ce, Pr and Nd. At least 90% by weight of the rare earth compounds present in the fuel consists of Ce, La, Pr and Nd, whereby with respect to the metallic weight of Ce, Pr, La and Nd, the weight content (% by weight) of Ce, Pr, La and Nd of advantageous embodiments are:

about 50% Ce; about 30% La; about 15% Pr; about 5% Nd, less than 1% Samarium, less than 1% yttrium, all other metal present below 0.1% each;

25 to 28% La; 49-52% Ce, 4-6% Pr, 13-15% Nd, less than 0.5% Fe; less than 0.8% Mg, less than 0.03% Ca; less than 0.05% Si, less than 0.03% P;

more than 22% La; more than 48% Ce; less than 7% Pr; 7 to 21% Nd, other (Fe, Mg, Si, P, etc.) less than 2%

63-67% Ce, 32-36% La, less than 2% of other rare earth metals, less than 1% of other impurities (Fe, Mg, Ca, Si, P, etc.)

The rare earth compound used for the regeneration purpose, for example to be contacted with a water containing gas, said water containing gas being thereafter contacted with the catalyst to be regenerated, can have various forms and shapes, such as ingots, wire, rods, pellets, helicoidal shapes, plates, etc. The rare earth compound is advantageously substantially completely in their metallic forms. The rare earth compound can be mixed with one or more additives, binders, etc. and or coated with oil, resins, etc. Possible compositions of the rare earth compound (with a total rare earth content of 90% by weight up to 99.5% by weight) expressed in their metallic form (% by weight) are:

about 50% Ce; about 30% La; about 15% Pr; about 5% Nd, less than 1% Samarium, less than 1% yttrium, all other metal present below 0.1% each;

25 to 28% La; 49-52% Ce, 4-6% Pr, 13-15% Nd, less than 0.5% Fe; less than 0.8% Mg, less than 0.03% Ca; less than 0.05% Si, less than 0.03% P;

more than 22% La; more than 48% Ce; less than 7% Pr; 7 to 21% Nd, other (Fe, Mg, Si, P, etc.) less than 2%

63-67% Ce, 32-36% La, less than 2% of other rare earth metals, less than 1% of other impurities (Fe, Mg, Ca, Si, P, etc.)

The invention relates thus also to such a fuel mix, especially a diesel mix. Said fuel mix comprises advantageously also some carbon nano/meso particles, for example with a carbon nano/meso particles comprised between 0.001 weight % and 1 weight %. Said fuel mix can also comprised one or more rare earth atoms or compounds. The mix comprises advantageously at least two, preferably at least three rare earth elements selected from the group consisting of La, Ce, Pr and Nd. Most preferably the fuel mix comprises Ce, La, Pr and Nd. The rare earth content of the fuel is advantageously less than 2% by weight, preferably less than 1% by weight, such as comprised between 0.0001% and 0.1% by weight.

The rare earth used in the fuel mix is advantageous such that the compositions of the rare earth compound (with a total rare earth content of 90% by weight up to 99.5% by weight) expressed in their metallic form (% by weight) are:

about 50% Ce; about 30% La; about 15% Pr; about 5% Nd, less than 1% Samarium, less than 1% yttrium, all other metal present below 0.1% each;

25 to 28% La; 49-52% Ce, 4-6% Pr, 13-15% Nd, less than 0.5% Fe; less than 0.8% Mg, less than 0.03% Ca; less than 0.05% Si, less than 0.03% P;

more than 22% La; more than 48% Ce; less than 7% Pr; 7 to 21% Nd, other (Fe, Mg, Si, P, etc.) less than 2%

63-67% Ce, 32-36% La, less than 2% of other rare earth metals, less than 1% of other impurities (Fe, Mg, Ca, Si, P, etc.)

The regeneration of the catalyst can also be carried out by a gazeous medium containing OH radicals and/or hydroxides, such as $La(OH)_3$, the content of OH radical or hydroxides being advantageously greater than 1%, preferably greater than 3% by volume.

The regeneration step can also be operated at least partly by admission of carbon nano/meso particles in the burning chamber, for example during the intake phase.

The regeneration treatment is advantageously operated at an average top burning temperature lower than 900° C., preferably lower than 850° C., such as lower than 800° C., for example lower than 700° C. Said average temperature is for example determined on the full expansion cycle of the motor.

A regeneration can be operated during the intake and/or compression step, as well as during the exhaust step. such a regeneration can then be considered with respect to a regeneration step during a hot burning phase, as being a pre regeneration step and a post regeneration step.

The treatment step is advantageously at least a partial regeneration step of the burning catalyst and/or a partial post coating of the burning catalyst.

Advantageously, said burning catalyst is treated (preferably at least partly regenerated) with an effective amount of cerium and/or europium and/or ytterbium and/or praseodymium and/or neodymium and/or lanthanum containing composition or compound, said effective amount being selected so as to avoid substantially any cerium and/or europium and/or ytterbium and/or praseodymium and/or neodymium and/or lanthanum nanoparticles emission at the outlet. For examples, the average content of cerium and/or europium and/or ytterbium and/or praseodymium and/or neodymium and/or lanthanum nano/meso particles in the flue gases is lower than 50 ppm, for example lower than 20 ppm, advantageously lower than 10 ppm, preferably lower than 5 ppm, such as comprised between 1 ppb and 2 ppm, for example 5 ppb, 10 ppb, 50 ppb, 100 ppb, 200 ppb, 500 ppb.

When the treatment step is made intermittently, it has been observed that it was advantageous to add or admit water or water vapor or an aqueous medium (free or substantially free of cerium and/or europium and/or ytterbium and/or praseodymium and/or neodymium and/or lanthanum, but possibly mixed with one or more additives, such as glycols, alcohols, aldehyde, peroxide, etc., so as to form for example an alcohol containing medium, a glycol containing medium, etc.) in the combustion chamber (directly or indirectly for example via the inlet means or intake manifold) during a combustion period for which the burning catalyst coating is not treated with a cerium and/or europium and/or ytterbium and/or praseodymium and/or lanthanum containing composition or compound in presence of water vapor and/or exhaust combustion gases at a temperature higher than 200° C.

According to a specific embodiment of the method, water or water vapor or aqueous medium or an alcohol medium or a glycol medium free of cerium and/or europium and/or ytterbium and/or praseodymium and/or neodymium and/or lanthanum is admitted in the burning chamber or in the inlet means or intake manifold during a treatment step of the burning catalyst coating, such a water or water vapor or aqueous medium or alcohol medium or glycol medium admission enabling a better control of the water content present in the burning chamber and/or enabling a supplemental control of the burning in function of the amount of water added or present during the burning.

EXAMPLES

Figure 1:
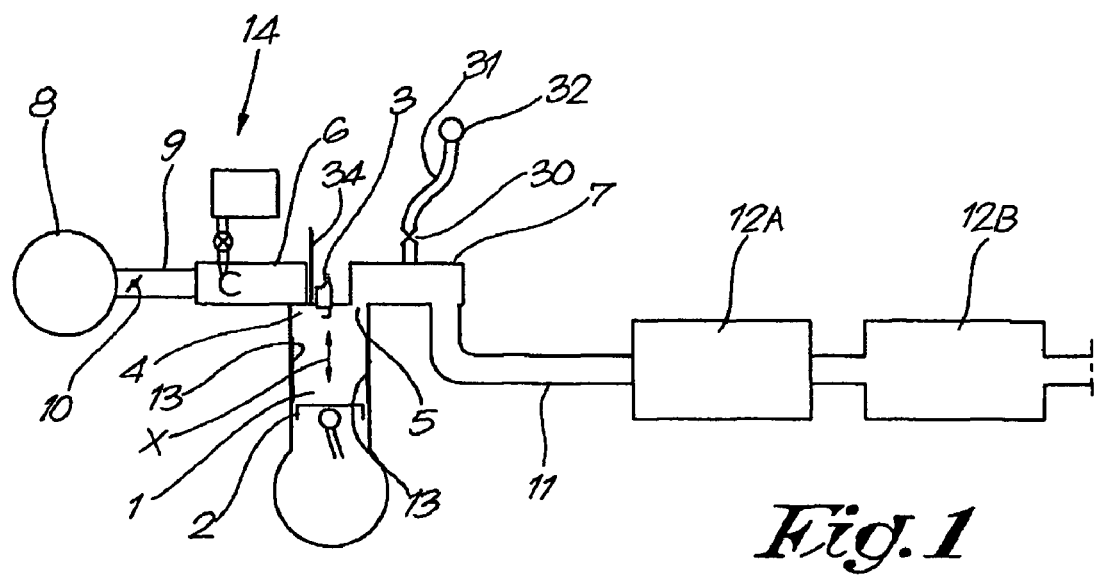
FIG. 1 is a schematic view of an internal combustion motor of the invention (one piston being drawn)

The motor of FIG. 1 comprises several chambers 1 in each of which a piston 2 is moved (arrow X). A spark plug 3 is used for the ignition of the mixture air-fuel present in the chamber 1. Valves 4,5 are actuated so as to allow the inlet of air and combustible in the chamber 2, the outlet of flue gases out of the chamber 2, as well as a possible flushing effect (the inlet valve or valves and the outlet valve or valves being in open position, whereby enabling air to cool the chamber and to remove some still present flue gases) as well as a cooling effect of the flue gases. The motor comprises also: an intake manifold 6, an outlet manifold 7, an air filter 8, a pipe 9 with possibly a valve or butterfly 10 for controlling the air or air-fuel consumption, an outlet pipe 11, a filtering system 12A for the flue gases (for example for further oxidizing thereof, for trapping particles, 3-ways catalyst system, etc) and a soot trap system 12B. The engine of FIG. 1 is a four stroke engine using for example petrol or diesel as fuel.

The piston, the cylinder head, as well as lateral cylindrical wall of each burning chamber 2 made of an aluminum containing material (alloy, for example an aluminum containing iron cast, such as an iron cast with an aluminum content comprised between 5 and 20% by weight, preferably from 7 and 15% by weight) are provided with a thin catalyst system 13, said system 13 being homogeneous or homogeneously dispersed on said piston, cylinder head and wall, in the form of adjacent spots (see FIG. 14). The lateral cylindrical wall of the cylinder could also be an inner liner or sleeve placed in or covering the cylinder. For example, said spots with a surface size of 5 to 100 µm² (surface of the wall coated by one spot with a particle size of more than 1 µm; the particle size is defined for example as the larger size of the spot, but preferably as equal to the equivalent diameter determined by the following formula [(4×Surface)/Contour] in which the Surface is the surface of one spot, while Contour is the length of the contour or circumference of said spot) and a thickness of less than 5 µm. The catalytic system comprises at least Ce/Pr/Nd/La/Carbon nanoparticles, as well as one or more elements selected among the group consisting of Eu, Yb, Ba and mixtures thereof. The spots are for example free or substantially free of Pt, Pd, Ag, Au, Ir. The Ce/Pr/La/Nd containing spots are in direct contact with the aluminum or alumina containing support (piston, cylinder head, wall, sleeve or covering of the cylinder). The Ce/Pr/La/Nd containing deposit has a lamellar structure. The spots are separated the one from the other by a phase containing activated carbon nanoparticles, advantageously a condensed liquid hydrocarbon containing phase in which activated carbon nanoparticles are dispersed.

The weight ratio [Ce, Pr, Nd, La]/C in the catalytic system after removal of the possibly condensed liquid hydrocarbon (removal by treating the hydrocarbon phase at a temperature of 300° C. for 8 hours) is comprised between 0.1 and 1, such as about 0.5.

The spots comprised also one or more other rare earth elements, such as Sm, Gd, Gd, Tb, Dy, Ho, Er, Yt and Lu.

The deposits or spots and/or the carbon phase comprise at least one doping atom selected from the group consisting of Cu, Fe, Zn, Ni, Mn, Ca, Mg, Ba, Si and mixtures thereof. The deposits or spots are advantageously porous, so as to enable at least volatile hydrocarbons and other compounds, such as liquid condensed hydrocarbons, phenol, aldehydes, ketones, hydrogen, methane, etc. to flow in the porosity or inner channel of the deposit. A carbon phase, such as carbon black, can flow at least partly in the porosity of the deposits.

The catalyst system present in the burning chamber was free of lead, i.e. a lead content of less than 500 ppb, such as less than 250 ppb or even better lesser (for example less than 100 ppb).

The carbon phase which contacts the aluminium containing support or wall and the spots (possibly covering only partly said spots) is a condensed liquid hydrocarbon containing phase comprising from 10 to 20% by weight. Oxygen.

The burning is thus operated at least partly (for example after removal of the liquid condensed phase during the compression step or the initial combustion stage) in direct contact with aluminium or alumina, cerium oxide and activated carbon. A liquid condensed phase is formed back or condensed back when exhausting the flue gases out of the combustion chamber, or when the temperature of the gases in the combustion chamber is below 350° C.

The catalyst system is such that it enables simultaneously a reduction of the content in the flue gases at the exhaust of the burning chamber of $NO_x$, CO, soot, particulate material, as well as partially burnt hydrocarbons, PAH, $H_2$, etc., while improving the burning efficiency and thus further reducing fuel consumption and thus $CO_2$ for a same power output.

For example, as long as the catalyst system is efficient, the average $NO_x$ content, the average CO content, the average soot content, the average particulate material content, and the only partly burnt hydrocarbon average content remain respectively in a predetermined range, comprised between a minimum threshold and a maximum threshold, for example the maximum admissible content of $NO_x$ or soot or particulate material or soot or only partly burnt hydrocarbon. For example, the maximum admissible content of $NO_x$ and/or soot and/or particles and/or unburned hydrocarbons is determined by the designer or regulators, in view of regulations or legal prescriptions or obligations, such as national laws, regional guidelines, etc.

For a burning chamber or a cylinder with a maximum volume of 300 cm³, the amount of catalyst system of the invention is about 2 to 3 g, meaning that the quantity of carbon present in the catalyst system is far higher than the quantity of fuel admitted in the chamber for one burning step. For example, the weight ratio carbon containing combustible/catalyst system is lower than 0.1, advantageously lower than 0.05, but preferably greater than 0.001, such as comprised between 0.001 and 0.1, better between 0.001 and 0.05.

Such a coating (see FIG. 14) is for example applied by plasma spray, spray, dipping, curing, etc. with or without precleaning step, for removing partly or completely the remaining carbon particles. Said catalyst coating comprises a series of catalyst spots CS adjacent the one to the other, some of which contacting each other. Zones Z remain however free of catalyst deposit or poor in catalyst deposit. For example, the spot CS are rich in lanthanides, for example with a content of 20 to 50% La and/or Ce (content by weight determined as atom). The spots have an average size of less than 25 µm, advantageously of less than 10 µm, preferably of less than 5 µm. The surface is advantageously provided with a quite homogeneously distributed particles with a size greater than 1 µm, with some nanoparticles such as particles with a size of less than 500 nm, and even less than 250 nm, such as less than 100 nm, less than 50 nm. Said nanoparticles comprises nanoparticles NM1 with a high lanthanide and/or cerium and/or europium content (such as a total (lanthanide+cerium+europium+Nd+Pr) content of more than 10% by weight, advantageously of more than 20%, for example comprised between 25 and 40%, said weight content being measured as atoms), and nanoparticles NM2 with a low lanthanide and/or cerium and/or europium content (such as a total (lanthanide+cerium+europium+Nd+Pr) content of less than 10% by weight, advantageously of less than 5%, for example comprised between 0.5 and 3%, said weight content being measured as atoms). Said nanoparticles NM2 are located essentially in spots CS present on the surface.

The nanoparticles NM1 and NM2 are advantageously substantially free of metal such as Pt, Ir, Au, Pd, but could contain some metal (for example up to about 5% by weight) such as Cr, Al, Ni and mixtures thereof. (said metal content being measured as atomic metal content).

The adjacent spots are connected the one to the other by a carbon containing phase CP, said carbon containing phase being formed by nanoparticles of activated carbon dispersed in a carbon phase comprising condensed liquid hydrocarbons, i.e. hydrocarbons which are preferably formed by condensation at temperature below 250° C. The carbon containing phase is in direct contact with the aluminum containing support, as well with cerium containing spots CS. The carbon containing phase is advantageously also provided with some cerium/Ia/Pr/Nd containing nanoparticles NM1.

Some carbon nanoparticles, such as active carbon nanoparticles, are in direct contact with a deposit containing Ce/La/Pr/Nd, while some other carbon nanoparticles are in direct contact with the support bearing the deposit, said carbon nanoparticles have a primary particle size lower than 20 nm, advantageously lower than 10 nm, such as comprised between 2 and 10 nm. Possibly, carbon primary nanoparticles can form an agglomerated structure.

Such a catalytic system has advantageously a BET surface of 2 to 10 m²/g (especially greater than 5 m²/g), said surface being measured after three heat treatment steps, a first at 250° C. for 8 hours, the second at 300° C. for 8 hours and the third at 210° C. for 8 hours, so as to remove gaseous product or product suitable to be converted into gas at said temperature, i.e. liquid hydrocarbons which can be evaporated or transformed in gaseous product at temperature up to 250° C. Such a catalyst coating, advantageously in the form of spots, such as adjacent spots distant from each other, ensures a contact surface between flue gases and the surface of the wall of the chamber which is at least 10 times (advantageously at least 25 times, preferably from 30 to 300 times, such as 50, 100, 150, 200 times) the wall surface calculated without the catalyst system.

During the working of the motor, the content of the condensed liquid hydrocarbon present in the carbon containing phase varies from about 0% when the combustible material is burning (temperature higher than 700° C.) up to 90% at the end of the expansion step or after the end of the burning, for example when the temperature of the gas present in the chamber is below 500° C. (the temperature of the wall of the combustion chamber or catalyst coating being then reduced to less than 400° C., such as less than 350° C.).

The Ce/Pr/La/Nd containing spots have a ceramized like structure, making a ceramic like coating. Such a ceramic like coating reduces the heat stresses, which are due to the high variation of temperature in the burning chamber, at the level of the inner cylinder wall and the inner piston wall, as well at the cylinder head and valves (inlet, outlet), whereby inducing less stress and reducing or even preventing the formation of micro cracks. The invention relates thus also to a method for reducing the formation of stresses and cracks in an iron cast liner or sleeve of a cylinder, by providing the liner or sleeve with a Ce/La/Pr/Nd containing coating, said coating being partial or incomplete.

According to a non binding theory, such a controlled temperature of the catalyst coating is advantageous as enabling a better control of the formation and/or higher release of active burning radicals at the level of the catalyst surface, the formation or release of radicals being possible during the inlet phase as well as during the compression phase, said radicals being possibly however not completely in a releasable form or being still partly entrapped in the coating.

The catalytic coating comprises during its working some carbon containing product. The volume of carbon containing products which are volatile at a temperature of 300° C. at atmospheric pressure is comprised between 0.05 cm³ and 0.7 cm³ (advantageously from 0.1 and 0.5 cm³) per cm³ of catalytic coating. According to a possible working assumption of the catalyst, the catalyst is able to absorb and to release some volatile compounds present in the combustion chamber, whereby taking out from the flue gases some still combustible gaseous products, while liberating absorbed combustible (condensed) gaseous products or by-products thereof (products absorbed during a preceding combustion phase or at the end of a preceding combustion phase or by-products formed in contact with the catalyst) during the combustion phase. According to a possible way of action of the catalyst, fuel admitted in the burning chamber is partly absorbed during the compression phase, said absorbed fuel being then release during the burning phase, whereby enabling a control of the burning. The catalyst of the invention acts thus in some way to a means for controlling in function of the time, the fuel participating to the burning, as it is currently made with expensive controlled injection system.

The average atom ratio C/Ce of the catalyst system present in the burning chamber is comprised between 1:1 and 10:1, preferably between 4:1 and 8:1.

The catalyst has preferably to be regenerated intermittently (when required) so as to ensure a correct absorption/release mechanism. By using a coating catalyst, the previously absorbed combustible material will be released during the burning and will participate to the burning chamber. As the release of volatile hydrocarbons from the coating is function of the temperature and pressure, the burning time will be prolonged, especially due to the absorbed hydrocarbons present on the cylinder head, the piston head, as well as possibly cylindrical portion of the cylinders. It seems also that a better mass fraction burning with lesser knock can be reached due to the burning of released hydrocarbons from the coating.

While not being bound to any theory, it seems that the catalyst system is suitable for cracking some condensed liquid hydrocarbons or heavy carbonated product into product with a lower molecular weight, which can therefore more easily be rendered free during a further compression step and/or burning step. It seems also that an ionization of the catalyst and from the catalyst is operated, said ionization being probably carried out by the release or capture of electron and amplified or not when using a spark ignition or a laser ignition.

For each burning chamber, it seems that, after removal, from the catalyst system, of the condensed liquid hydrocarbon having a condensation temperature of less than 300° C. at $10^5$ Pa, the weight of catalyst coating, especially the sum (amount of deposit contacting the support+amount of carbon nanoparticles+amount of carbon containing structure of the catalyst system) is advantageously from 0.1 to 5 g per volume of 100 cc of combustion chamber (maximum volume when using burning chamber with variable volume), for example from 0.2 to 3 g, such as 0.4, 0.5, 0.7, 1 g and 2 g per 100 cc. Said weight is measured without liquid condensed carbon absorbed products, i.e. products condensed at temperature below 300° C., or without product which can be removed or rendered gaseous by a heat treatment at 250° C., without burning effect thereof or formation of CO and/or $CO_2$.

The catalyst coating comprises advantageously from 5 to 50% by weight of a plastizer, such as a phthalate plastizer, with a boiling point higher than 200° C.

The deposit of catalyst on the piston is advantageously quite symmetric with respect to the axis of symmetry extending between the openings of the valves.

The invention relates thus also to a burning process, in which the burning chamber is provided with a catalytic coating of the invention.

During the compression step (CO and/or H2 being formed) of a four stroke engine using a catalytic system of the invention, a cool burning process occurs. During such a cool burning, hydrocarbons are reformed and/or cracked, temperature is increased whereby enabling an increased compression ratio, CO is formed whereby decreasing the detonation propensity of the mixture, possible liquid or paste fuel are evaporated. Said cool burning enables thus an in-situ reforming of the fuel into a fuel mixture with a lower or reduced detonation tendency and/or with more unsaturated hydrocarbons suitable to catch possible free hydrogen, whereby rendering said hydrogen more reactive thereafter according to a deflagration pattern.

The invention relates thus also to a fuel gas mix containing CO as detonation inhibitors or as detonation control means, whereby enabling to have larger compression zones.

The exhaust pipe 11 (before the filtering system 12A) and/or the exhaust manifold 7 (preferably the exhaust manifold 7 and the exhaust pipe 11) are provided with a catalyst system of the invention. The amount of catalyst system of the invention present in the exhaust pipe and/or in the exhaust manifold is advantageously at least equal to the amount of catalyst coating of the invention present in the burning chamber exhausting flue gases. Preferably, the amount of catalyst present in the exhaust pipe is at least twice (preferably comprised between 3 and 20 times) the amount of catalyst in the burning chamber exhausting the flue gases for one exhaust step.

Figure 2:
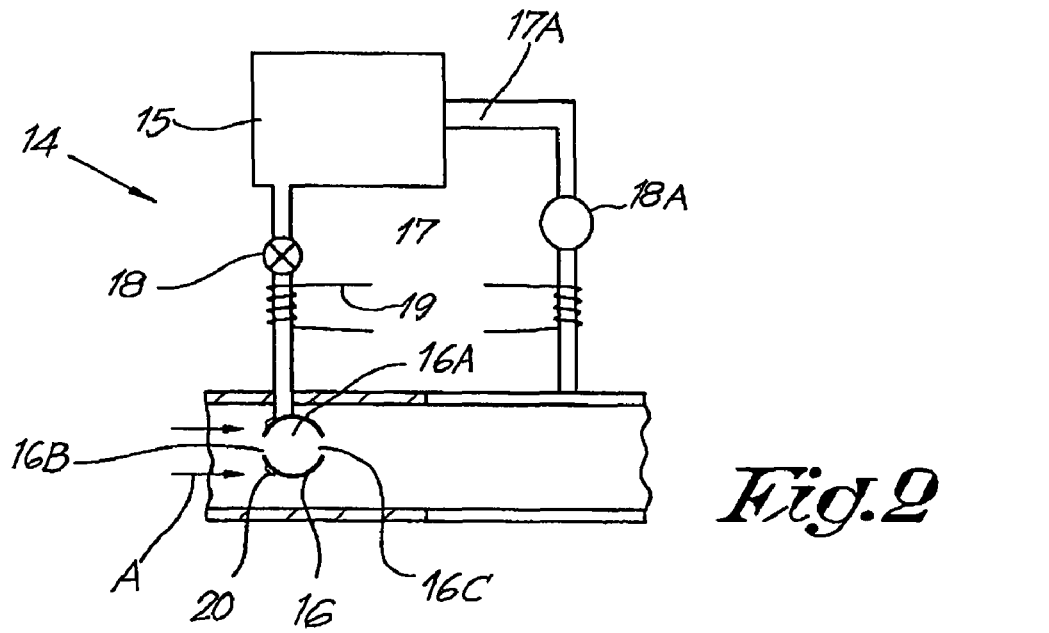
FIG. 2 is an enlarged view of a detail of the motor of FIG. 1.

The motor is associated with a system 14 (see for example FIGS. 1 and 2) for treating, when required, the burning catalyst coating 13.

The treatment is controlled so that the average content of at least one oxidized harmful by-products in the flue gases (average measured on combustion period of 30 minutes, preferably average measured for a period of 5 to 15 minutes) remains substantially in an acceptable range. (see FIG. 3) Most preferably the average contents respectively in $NO_x$, CO, soot and particulate material are determined, whereby as soon as one of said averages is above its acceptable range, the catalyst system will be regenerated or rejuvenated, preferably up to reaching a threshold corresponding to the minimum of the acceptable range or to a value within the acceptable range.

The treatment is intermittent, i.e. during some period, water vapor and cerium and/or the product obtained by contacting water vapor with cerium, preferably metallic cerium is admitted in the intake manifold, while during some other period, water vapor and cerium is not admitted in the intake manifold. For example the period between two regeneration treatments is at least 15 minutes, preferably at least 30 minutes. The average period between two regeneration treatments is for example comprised between 60 minutes and 10 hours, said period depending of the acceptable range or of the maximum acceptable content.

Said system 14 comprises for example: a water tank 15, an ovoid water vapor distributor 16, a pipe 17 connecting the water tank 15 with the vapor distributor, a valve 18 mounted on the pipe for controlling the water flow out of the water tank, and a heating system 19 (associated to the pipe 17) for converting the liquid water into vapor. The vapor distributor is placed in the intake manifold 6. The distributor 16 has an ovoid inner chamber 16A provided with an air inlet opening 16B and with an air/vapor outlet opening 16C. Air (A) flows in the inner chamber 16A (from the inlet 16B towards the outlet 16C) according to a turbulent pattern so as to ensure a good mixing of the air with the water vapor. The wall of the vapor distributor are coated with a cerium containing coating. The coating comprises from 10 to 25% by weight of wolframite clay, and 90 to 75% weight of a rare earth containing composition (the rare earth being advantageously present as metal and/or as hydroxides). The rare earth present in the composition, expressed as % in weight in their metal form, comprises about 50% Ce, 20-26% La, 15-19% Nd, 5-6% Pr, trace of Europium and trace of ytterbium. Specific compositions are for example:

Composition A: 25-28% by weight La, 49-52% by weight Ce, 4-6% by weight Pr and 13-15% Nd, maximum Fe content of 0.5% by weight, Mg maximum content of 0.8%, Ca maximum content of 0.03% by weight, Si maximum content of 0.05% by weight and P maximum content of 0.03% by weight;

Composition B: minimum 22% by weight La, such as 32 to 36% by weight, minimum 48% by weight Ce, such as 63 to 67% by weight, maximum 7% by weight Pr, such as 1% by weight, 0 to 21% by weight Nd, maximum 0.5% by weight Fe, maximum 0.8% by weight Mg, maximum 0.03% by weight P.

The weight ratio rare earth composition/wolframite clay is comprised between 3 and 9. When the air/water vapor mixture contacts the Ce containing catalyst, said air/water vapor is charged with nano/meso particles of wolframite clays and/or rare earth. Due to the turbulence of the air in the ovoid chamber, a good contact can be provided between the air/water vapor flow and the Ce containing coating. The turbulence is also advantageous for ensuring the formation of a substantially homogeneous air/water vapor flow with Ce particles (preferably nanoparticles) and with refractory particles.

When the water vapor formed in the pipe 17 flows into the ovoid chamber 16, said water vapor is mixed with air, said mixture having then a temperature comprised between 60 and 70° C.

It is believed that at least part of the water vapor admitted in the burning chamber comprises advantageously hydroxyl radicals or groups, especially OH⁻ species and/or Lanthanides hydroxides and/or rare earth hydroxides, such as Lanthanum hydroxides, cerium hydroxides, etc. The water vapor can also comprise some rare earth oxides, such as Lanthanide oxides, lanthanum oxide, etc.

The water vapor is for example a vapor with a rare earth hydroxide content comprised between 10 ppb and 500 ppm, preferably between 10 ppb and 10 ppm, most preferably between 10 ppb and 2 ppm, such as 25 ppb, 50 ppb, 100 ppb, 150 ppb, 250 ppb and 350 ppb.

The water vapor is admitted in a sufficient quantity that the content of hydroxyl radicals in the gases contacting the catalytic surface to be regenerated is comprised between 0.2% and 20%, such as 1%, 2%, 3%, 5%, 8%, 10%, 15% during the compression phase.

The gaseous mixture (air/partial water vapor+rare earth) flowing out of the ovoid chamber flows in the intake air manifold 6 before flowing in one burning chamber. The outer wall of the ovoid shaped distributor is provided with fins 20 so as to induce a rotational inwards movement to the principal air flow A.

It is advantageous to use systems, such as an ovoid chamber, provided with lanthanum/cerium/europium/ytterbium and/or praseodymium containing element(s) having a face in contact with water vapor, said element(s) being such that the surface in contact with water vapor remains substantially constant during the use of the system, for example for more than 75,000 Km, such as more than 80,000 km, more than 100,000 km or even more than 150,000 km, or even more than 200,000 km. In said burning chamber, fuel is for example injected by means of controlled nozzles 34.

At least the air/water flow with nano/meso particles of cerium and possibly refractory material is submitted to a compression (pressure of 5 to 20 bars), before being used for the burning. Advantageously at the end of the compression step of the air/water vapor flow, fuel is injected.

Thereafter, the flame ignition is only started by the spark plug ignition. After the flame ignition, the temperature and the pressure in the burning chamber raise sharply up to a pressure of 30-100 bars (or even more) and up to a temperature (average) of about 700-1000° C. (or even more). Due to the high plasma rate (ignition phase followed by a deflagration burning pattern followed or not by an detonation burning pattern), some cerium particles and refractory materials impacts the burning coating, whereby ensuring a treatment of said burning coating (at least partial regeneration of the burning coating. Furthermore, it has been observed that the presence of cerium micro and/or nano/meso particles, carbon nanoparticles and refractory micro and/or nano/meso particles in the volume of the burning chamber had also some catalytic effect on the burning reaction (better control of reaction, $NO_x$ reducing effect, soot reducing effect, CO reducing effect, etc.), especially when the regeneration or rejuvenation of the catalyst coating is required. Such a regeneration can be operated during the intake, the compression phase, the ignition phase, the expansion phase and even during the exhaust phase.

During a regeneration step of the catalyst chamber, the rate of addition of cerium was adjusted so as to be about 0.5 to 50 ppm per liter of fuel, preferably between 0.5 and 20 ppm per liter of fuel, such as 0.5 ppm, 1 ppm, 3 ppm and 5 ppm. The rate of water vapor addition was adjusted so as to be about 0.005 l to 0.1 l water per liter of fuel, advantageously between 0.01 and 0.075 l water per liter of fuel, preferably 0.05 l and 0.07 l water per liter of fuel. The fuel has for example a density comprised between 0.7 and 1.5. The fuel is advantageously liquid or can be rendered liquid or gaseous by heating. The fuel can also be solid, such as in powder form or in a form suitable for a fluidized burning bed.

The intermittent treatment can also be carried out for regenerating or rejuvenating the filtering system 12A, as well as the soot trap system 12B. When the filtering system 12A or the trap system is clogged, for example due to residue of soot particles (due to a decay of the activity of the catalyst present in the burning chamber), water vapor and cerium is admitted in the intake manifold, whereby a mixture comprising fuel burning gases, water vapor and cerium is exhausted via the exhaust pipe 11 towards the filtering system 12A and the trap system 12B. Said gaseous mixture has a cleaning/washing effect, as well as reduce the initial burning temperature of residue of soot particles.

The intermittent regeneration of the surface catalyst present in the burning chamber can be operated together with the regeneration or rejuvenation of the filter 12A and/or the trap 12B, but can be operated at different moment.

The intermittent regeneration of the surface catalyst present in the burning chamber requires for example an amount of cerium and water vapor which is lesser than the amount of cerium and water vapor required for the regeneration or rejuvenation of the filter 12A and/or trap 12B and/or the catalyst present in the exhaust pipe 11. According to a preferred embodiment, the regeneration of the surface catalyst of the combustion chamber is carried out when the filtering and/or trapping system (12A,12B) has to be regenerated.

The amount of cerium admitted in the intake manifold for the regeneration or rejuvenation of the surface catalyst of the burning chamber is advantageously lower than the amount of cerium admitted for the regeneration of the soot trap system. It means also that when only the surface catalyst of the burning chamber has to be regenerated, the duration of treatment with cerium and water vapor is for example very short, while the duration of treatment with cerium and water vapor is much longer for the regeneration of the soot trap or the three way catalyst.

When only the surface catalyst of the burning chamber has to be regenerated, the amount of cerium and water vapor or the duration of treatment will advantageously be sufficiently low for not enabling the regeneration of the soot trap.

The regeneration of the soot trap system requires often a higher amount of cerium. Therefore, when having to regenerate the soot trap system, it is advantageous to increase progressively (in steps or continuously) the cerium concentration in the flue gases. For example, in a first step, the cerium added in the intake manifold will be sufficient for regenerating the surface catalyst of the burning chamber (but not for regenerating the soot trap), while in a second step, the cerium concentration in the flue gases is increased so as to be sufficient for regenerating the soot trap or for initializing the soot trap regeneration. Advantageously an intermediate step without adding cerium is carried out between the first and the second step. Such a working is advantageous as the soot present in the flue gases due to the regeneration of the catalyst of the combustion chamber will then be better trapped in the trap system.

The particulate trap system can be a trap system without chemical additive or catalyst coating, or a trap system with chemical additive(s) or catalyst coating. As less soot is formed when the burning catalyst is efficient, the working of the trap system is improved (less regeneration steps being required). While not be bound to any theory, it seems that possible soot particles formed during the burning (for example at their initial stage of formation) are reacted with hydrogen so as to convert said soot particles or seeds in cracked compounds which are then more reactive for being converted into $CO_2$. The burning chamber forms thus an in situ converter of carbon seed particles or soot particles into hydrocarbon compounds. Such a conversion seems also to be more controlled when the hot burning (i.e. burning at temperature higher than 700° C.) follows a deflagration pattern, instead of a detonation pattern.

According to an embodiment, some air+water vapour+cerium (for example in its hydroxide form) is admitted in the burning chamber when the inlet valve(s) and the outlet valve(s) are in open position, whereby enabling a flow of air+cerium+water vapour to flow in the post treatment unit. Such a flow is advantageous for ensuring a kind of regeneration in the chamber, as well as in the post treatment unit. Such an air flow is also advantageous for ensuring a temperature drop and increasing the condensation of condensable compounds.

According to still a further possible embodiment, a very low amount of cerium is admitted continuously in the inlet manifold, said amount being sufficient for regenerating the surface catalyst of the burning chamber, but being not sufficient for reducing of at most 50° C., advantageously at most 30° C., the ignition temperature of the soot in the trap system with respect to the ignition temperature when no or substantially no cerium is admitted. When the soot trap system has to be regenerated, the amount of cerium added in the inlet manifold is increased, so as to reduce the ignition temperature of the soot in the soot trap of at least 50° C., advantageously of at least 100° C., with respect to the soot ignition temperature without cerium.

The cerium admitted for regeneration can also be admitted through the air admission, through the fuel admission, through a direct injection system, through a portion of the piping or device used for the exhaust gas recirculation or recycling.

According to a possible embodiment, the cerium suitable for regeneration purposes can be admitted through the exhaust gas recirculation system or any portions suitable for ensuring an exhaust gas recirculation.

It has also been observed that a better working of burning chambers with active surface catalyst of the invention and thus of the engine could be achieved when ensuring an overlap of the opening time of the exhaust valve(s) and of the opening time of the inlet valve(s), so as enable fresh air (advantageously free of fuel) to flow at least partly substantially directly from the inlet towards the outlet, whereby decreasing the temperature of the flue gases and causing possibly a condensation, such as a water condensation. Such an air flow in the burning chamber is also suitable for condensing possibly some remaining hydrocarbons present in the burning chamber, as well as for cooling the surface catalyst present in the chamber and/or avoiding overheating of any catalyst of post treatment system. It seems also that this cooling is interesting for the absorption or adsorption of oxygen containing compounds (such as phenol, aldehyde, etc.) in the catalyst present in the burning chamber. The cooling effect due to the overlap opening enables also a high volumetric efficiency.

A combination of one or more of said effects can also thus be achieved.

When operating a motor engine with admission valve(s) and exhaust valves(s), the opening of the admission and exhaust valves at the end of the burning gas expansion step, i.e. before reaching the bottom dead center of the piston, is adequate, as it enables a fresh air suction from the admission valve(s) directly towards the exhaust. Such a suction is due to a condensing effect of some gases or vapours, such as water vapours. Such a suction of fresh air enables a cooling of the burning chamber, as well as of the exhaust gases, whereby increasing the condensing effect, which will increase the out flow of gases from the cylinders and thus the increase the incoming flow in the cylinder.

When a regeneration is required, the overlap of the opening time of the exhaust valve(s) and of the opening time of the inlet valve(s) can be adapted. For example for regeneration purposes, the overlap time of the opening of the exhaust valve(s) and of the opening of the inlet valve(s) is reduced with respect to the overlap time during a normal working of the engine, i.e. between two successive regeneration steps. This enables to increase the temperature of the flue gases and/or the temperature of the surface coating, whereby enabling a better regeneration or rejuvenation of the surface catalyst and/or of the filter and/or the trap system.

FIG. 3 is a schematic diagram of average $NO_x$ content, CO content, HC content and PM content (particulate material) in the flue gases on a period of 10 hours working) in function of the time. As it can be seen from the starting of the engine, a substantially constant reduced $NO_x$ content, reduced CO content, HC content and PM content could be achieved in the flue gases.

For example, the average reduced $NO_x$ content in the flue gases was lower than about 30 ppm (such as lower than 20 ppm), meaning a reduction of more than 50%, advantageously of more than 75%, preferably of more than 80% of the $NO_x$ content when no active surface coating was present in the burning chamber.

In dashed line, the $NO_x$/CO/HC/PM mobile average contents on a period of 15 minutes are represented. The regeneration of the system is operated as follow: As long as the $NO_x$/CO/HC/PM mobile average contents on a period of 15 minutes are lower than their respective predetermined threshold value, no regeneration of the catalyst coating is operated by admission of water vapor and cerium and/or europium and/or neodymium (Nd) compound in the burning chamber. When the $NO_x$ mobile average content on a period of 15 minutes and/or CO mobile average content on a period of 15 minutes and/or HC mobile average content and/or PM mobile average content is higher than their predetermined maximum threshold value, a regeneration of the catalyst coating is operated by admission of cerium and/or europium and/or ytterbium and/or praseodymium and/or lanthanum compound in the burning chamber together with water vapor. Said regeneration is for example carried out up to reaching a minimum threshold value for at least the parameter which had a mobile average content higher than the acceptable threshold. The regeneration or not of the coating catalyst can be controlled for example by controlling the valve 18, i.e. water vapor is admitted in the ovoid chamber 16 when regeneration of the coating catalyst is required. This enables a better use of the cerium/europium/ytterbium and/or praseodymium and/or neodymium (Nd) and/or lanthanum particles used for regeneration and a better efficiency of the catalyst, as it is well-known that an excess of catalyst will catalyze also secondary reaction, such as undesirable secondary reaction. Such an intermittent regeneration enables also a better working of the filtering system, as well as of the trap system.

Figure 4:
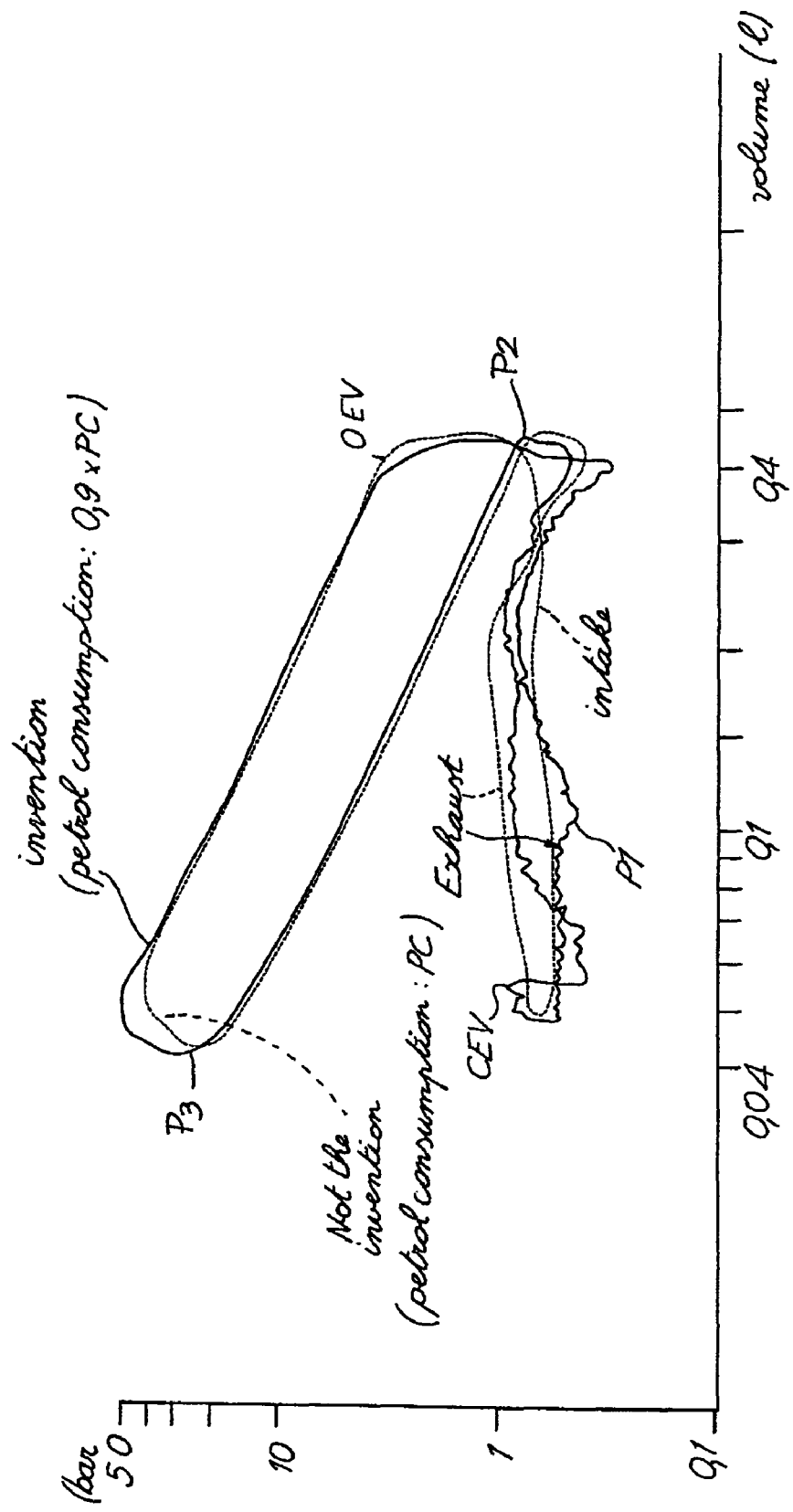
FIG. 4 is a schematic view of the Pressure/Volume diagram in the combustion chamber of the invention, and in the combustion chamber not according to the invention.

FIG. 4 is a schematic Pressure/Volume diagram (P/V) showing the pressure in the burning chamber, for a device of the invention with active and efficient catalyst coating (invention) and for a device not coated with a burning catalyst coating, nor provided with a system for injecting water vapor and cerium in the intake air (dashed line, not invention). The consumption for the P/V diagram in the combustion chamber of the invention was 10% lower than the consumption for the P/V diagram in dashed line (not the invention). As it can be seen from said graph, the pressure in the chamber during the intake (measured at the level of the spark plug) shows a depression peak after closing the exhaust valves, creating a better suction of air in the chamber and therefore a better filling of the chamber. The inlet valves were opened during the exhaust phase, whereby enabling a cooling of exhaust gases, a flushing effect in the burning chamber and a cooling effect of the catalyst present in the burning chamber. During the overlap of the opening phase of the inlet valve and of the exhaust valves of a burning chamber, only air was admitted. The volume filling rate of the chamber is for example greater than 90 or 95%. This depression seems to characterize the four stroke engine of the invention. The inventor has no definite explanation of this surprising behavior. A possible explanation could be that during the intake some reaction or absorption occurs at the coated surface (oxidation and/or oxygen absorption and/or water absorption and/or mist formation and/or condensing of hydrocarbons present in the chamber), whereby reducing the pressure in the chamber. The lower pressure in the chamber during the exhaust seems also be due to a better exhaust of the combustion gases. The depression peak (P1) in the chamber is for example lower than 0.5 bar.

At the end of the intake, as soon as the inlet valve is closed (i.e. the chamber is closed) the pressure (P2) in the chamber increase quickly to about 1 bar ($10^5$ Pa), and during the compression step a higher compression pressure (P3) is obtained. This can be due to the higher filling rate of the chamber and/or due to the release of product at the catalyst coating and/or due to the transformation of the disappearance of some mist. The filling rate of the chamber is moreover substantially only done through the inlet valve(s), without flue gases backflow through the outlet valve(s).

Just before the ignition, a gain of pressure of about 2-3 bars was reached in the closed combustion chamber with respect to a combustion chamber of an internal combustion engine not mounted according to the invention.

The combustion step was better controlled, as the pressure in the combustion chamber increased more quickly and was maintained at a higher level than for the device not of the invention. The exhaust gases are also better take away, as at the end of exhaust stroke (closing of the exhaust valve CEV) the depression (P1) in the chamber is lower. The hot combustion, after the ignition of the fuel mixture, followed first a deflagration pattern, whereby enabling to maintain a substantially constant pressure during the expansion of the volume of the burning chamber. Such a maintain of pressure or controlled pressure pattern of the burning can be possibly due to a better control of the burning temperature and/or a better control of the burning speed.

During the exhaust, the pressure in the chamber was lowered with respect to the engine not the invention, this meaning that a higher suction was created as soon as the valve was opened and maintained during the exhaust cycle.

In FIG. 4, the opening of the admission valve and the exhaust valve was not optimized. In case said opening was better optimized and that only air was able to flow in the chamber and out of the chamber (i.e. the fuel being injected directly in the burning chamber, i.e. direct injection, and being not sucked in the burning chamber as an air/fuel mixture), the exhaust gases will be better cooled with fresh air, while the burning chamber will also be better cooled. In order to improve the passage of fresh air from the inlet valve towards the exhaust, the inlet valve can be profiled or shaped. Such a flow of air in the chamber will further improve the exhaust of burning gases, as well as the filling rate of the burning chamber. Such a flow of air will also be adequate for an in situ condensation of some possible unburned hydrocarbons. During said air admission at the end of the expansion, the catalyst will be in contact with oxygen, whereby enabling a kind of rejuvenation of its oxygen content, before the filling of the chamber.

It seems that in the motor of the invention, a further cycle exists from the end of the expansion stroke and in the exhaust stroke. Said cycle creates a depression in the combustion chamber meaning that less power is required for expulsing the exhaust gases or even that the exhaust gases exert a suction on the piston (i.e. minimizing pumping losses). Such a depression is probably due to a depression created in the exhaust pipe or tail.

The motor of the invention of FIG. 4 has thus a burning stage comprising two cycles, namely a deflagration cycle (for burning for example more than 50% by weight of the fuel) followed or not by a detonation cycle or a more or less detonation like cycle, such as a mix of detonation/deflagration pattern (for burning less than 50% of the fuel). The power supply increase by using the deflagration cycle is marked by cross hatching and reference $PS^+$.

FIG. 17 is another view of a P/V diagram obtained with a burning process of the invention with wide open throttle (WOT). In said diagram, the high pressure level (more than 50 bars) in the burning chamber was maintained during the expansion (up to a volume corresponding to about 30% of the maximum volume of the burning chamber).

FIG. 18 shows the mass fraction burning rate of the burning process of FIG. 17 (WOT). Said figure shows that the combustion from 20% of the fuel up to about 80% of the fuel extends over a period corresponding to a (shaft) rotation of about 10°. The maximum pressure was reached after a burning rate of about 50% of the fuel (50% by weight of the fuel to be burn during a combustion stroke) is burned, said maximum pressure being maintained up to a burning rate of about 99% during a longer shaft rotation.

FIG. 19 is a view similar to FIG. 17, but for a torque of 51 Nm.

As it can be seen from said drawing, as soon as the exhaust valve is opened, a peak of depression is created in the combustion chamber (pressure of about 0.4 bar). This depression seems to be due to a better aspiration of exhaust gases in the exhaust piping, for example due to a flue gas and/or water and/or hydrocarbon condensation. The intake comprises a step for which the inlet valve and the exhaust valve are in open position, meaning an overlap of the opening times (step 1), and a step for which the inlet valve is open, while the exhaust valve is closed (step 2) Between the two steps, a depression peak is formed. According to a possible approach, the suction of gases through the exhaust is so high, that an air flow is formed between the inlet valve and the outlet valve. Said air flow ensures a good exhaust of the flue gases from the outlet manifold, as well as a temperature reduction or drop in the outlet manifold, outlet piping and after treatment systems. None or almost none or a very small portion of flue gases present in the combustion chamber remains in the chamber during the suction step. For example, the portion of flue gases remaining in the chamber corresponds to a volume of less than 5% volume of the maximal volume of the cylinder, preferably less than 2%, preferably less than 1%. During said overlap period, water can be injected in the inlet air flow, which is preferably free of fuel. Possibly, some cerium compounds can be added for regeneration purposes for example of the converter or of the filter or the trap system.

During the suction step with the exhaust valve in open position, the fresh air sucked is partly used for filling the chamber and partly for being sucked towards the exhaust manifold. This depression can also possibly be used after the closing of the outlet valve for sucking a portion of the exhaust gases, for example of the exhaust piping, whereby an exhaust gas recirculation is carried out through a single supplemental piping or EGR system, whereby enhancing the efficiency of actual EGR.

This better suction of the exhaust gases enables also a better cooling of the flue gases present near the piston and/or a better cooling of the valves as well as of the catalyst coating, whereby enabling a better condensation of possible unburned hydrocarbon. Such an inner condensation, as well as some water vapor absorption by the catalyst can possibly be also a reason of the pressure drop at the closing of the outlet valve.

The turbulence and the suction speed due to the additional suction due to the exhaust is possibly a further reason of the better filling of the chamber.

The variation of mass burn rate (%) in the burning process of FIG. 19 is shown in FIG. 20. As it can be seen the burning from 20% by weight of the fuel up to 80% by weight of the fuel is carried out in a period corresponding to about 20° of rotation of the shaft. The maximum pressure or high pressure level is reached after the burning of about 50% by weight of the fuel, said high pressure level being then maintained up to a substantially complete burning, i.e. to a volume corresponding to an angular rotation of about 35° with respect to the top dead center.

Figure 15:
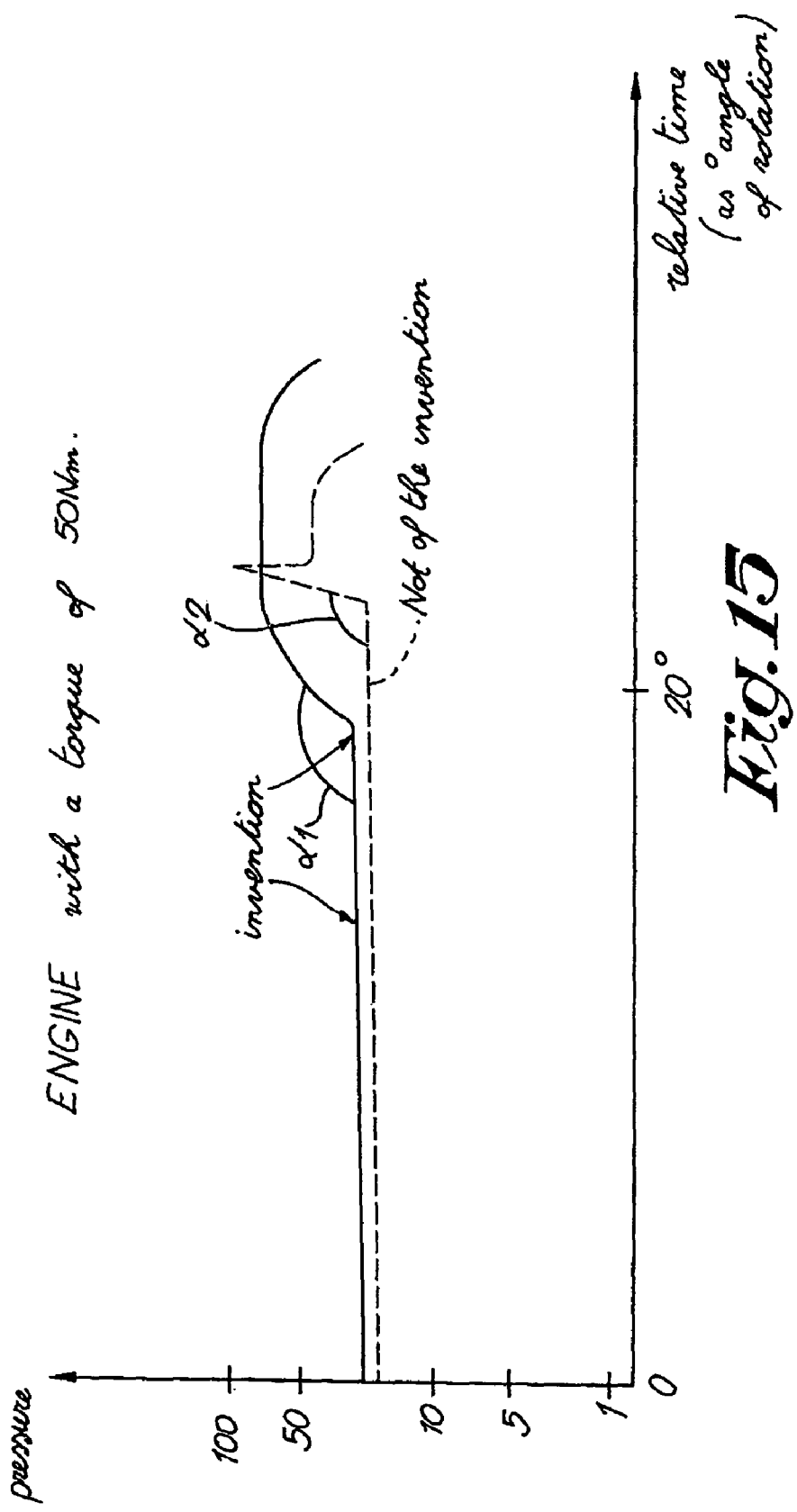
FIG. 15 is a schematic graph representing the pressure in function of the combustion time

A better control of the burning can thus be operated in the device of the invention. FIG. 15 shows schematically the variation of the pressure in a burning process of the invention for a torque of 51 Nm, while in dashed line the variation of pressure in a combustion process not according to the invention for a torque of 51 Nm is shown. The fuel consumption for the motor of the invention was 10% lesser than for the motor not of the invention.

The time is expressed in said drawing as a number of degree (°) of the angle of rotation of the driving shaft. The time is not calculated from the ignition, but is relative (i.e. time 0 is not the true ignition time).

As it appears from said graph, the fuel burning in the method of the invention is more controlled, as said burning is carried in two steps, a first step up to a pressure of about 25 bars (substantially linear increase when expressing the pressure as a logarithm function) followed by a second step of rapid linear increase of the pressure (when expressed as a logarithm function). A variation of about 1° for a rotation of the shaft of about 2000 rpm corresponds to less than about 0.00009 second.

With a classical burning, the burning is carried out as an detonation of substantially all the combustible material or fuel present in the burning chamber at once, the pressure increase occurs substantially immediately.

The angle $\alpha 1$ defined between the two increase steps for the burning of the invention is higher than 105°, such as about 120° to 150°. The angle $\alpha 2$ for a combustion not according to the invention is about 100°. A larger angle means a longer burning time, meaning a better flame stability and/or better flaming conditions. While the working of the burning of the invention is still clearly understood, it is suspected that the presence of the catalyst coating and/or a higher radical content controls the burning, by forming successive small or local deflagrations, the number of local deflagrations being increased in the second combustion step. It was also observed that in the burning process of the invention, a higher pressure could be reached in the burning chamber and that said high pressure could be maintained during a longer period. It seems that part of an explanation of the better control of the burning is due to the formation of hydrogen species at or adjacent to the coating. Another possible explanation of said better control could be of the keeping alive for a longer period the radicals or radicals at the catalyst surface due to the quick shift reactions at surface between $NO_x$ conversion at lean conditions and $NO_x$ conversion at rich conditions, and inversely. It is believed that a more stratified burning process is achieved due to the release of oxygen containing compounds from the catalyst of the invention or due to one or more explanations given hereabove, or a combination of said explanations.

It has been observed, through pre-coating measurement after the heat treatment, that the burning zone of tested engine pre-coated with the catalyst of the invention had a typical stratified burning pathway (equal repartition of the hot zone on both side of the sparkplugs, throughout the whole midline of the combustion chamber, said midline extending between the exhaust valves and the inlet valves, whereas the cold zone was lying outside both valve systems). In an engine not provided with the catalyst coating of the invention, a cold zone was observed close to one of the exhaust valves, while a hot zone was observed diagonally opposite to and close to the intake valve, typical for a hot end-gas backflow phenomena. Such a stratified burning and/or better end reactions or termination of $H^+ + OH^-$ into $H_2O$ could explain the lower emission rate of pollutants, as well as the lower vibration and the reduced knock effect and a better use of the maximum energy output of the fuel, whereby enabling a better burning process. (See FIG. 34)

It was even observed that when controlling the air admission ratio with respect to the fuel consumption as being for a substantially stoichiometric burning in a conventional motor, the burning in the chamber of the engine of the invention resembles to a lean combustion, while at the outlet, the flue gases had substantially the characteristics of the flue gases of a stoichiometric burning. Such fact was especially observed when the catalyst was effective so as to reduce $NO_x$, CO, soot, particulate material, as well as partially burnt hydrocarbons, PAH, $H_2$, etc., and so as to improve the burning efficiency.

While not bound to any theory, it seems that when cerium/ europium/ytterbium/praseodymium/neodymium/lanthanum (and possibly a refractory material) is present on the surface of the burning chamber, rapid shifts between oxidizing environment and reducing environment and inversely occur during the burning without requiring specific mechanical feedback control means for controlling the fuel injection (such as mechanical electronic control feedback system, mechanical/ gas flow control feedback system, mechanical/electrical control feedback system, or any other mechanical feedback system controlling the lean and/or rich environment in the burning chamber) in the burning chamber during the burning. The presence of the cerium/europium/ytterbium/praseodymium/neodymium (Nd)/lanthanum (advantageously together with refractory material) at the surface of the combustion chamber and in a lesser extent dispersed in the volume of the combustion chamber seems to modify the reaction conditions, the reaction speed and the transitional states of the burning.

Figure 32:
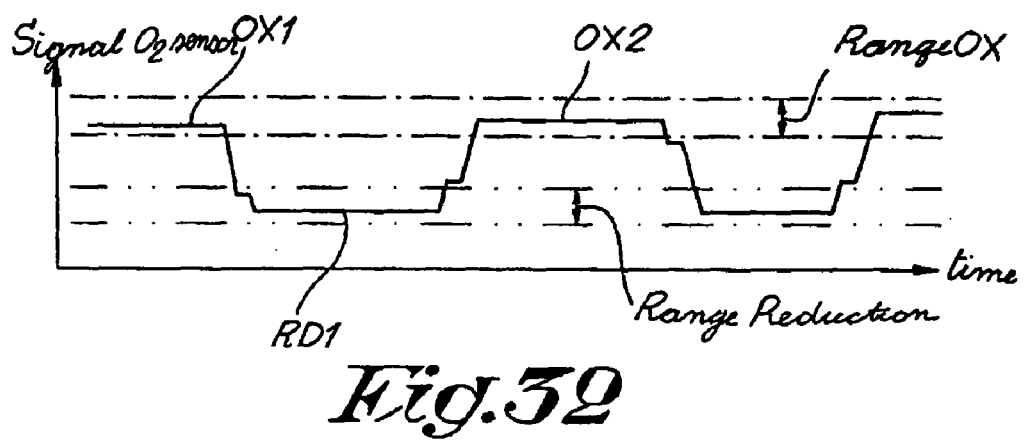
FIG. 32 is a graph showing the $O_2$ sensor signal in the exhaust gas of a burning chamber with a catalyst coating of the invention.
Figure 55:
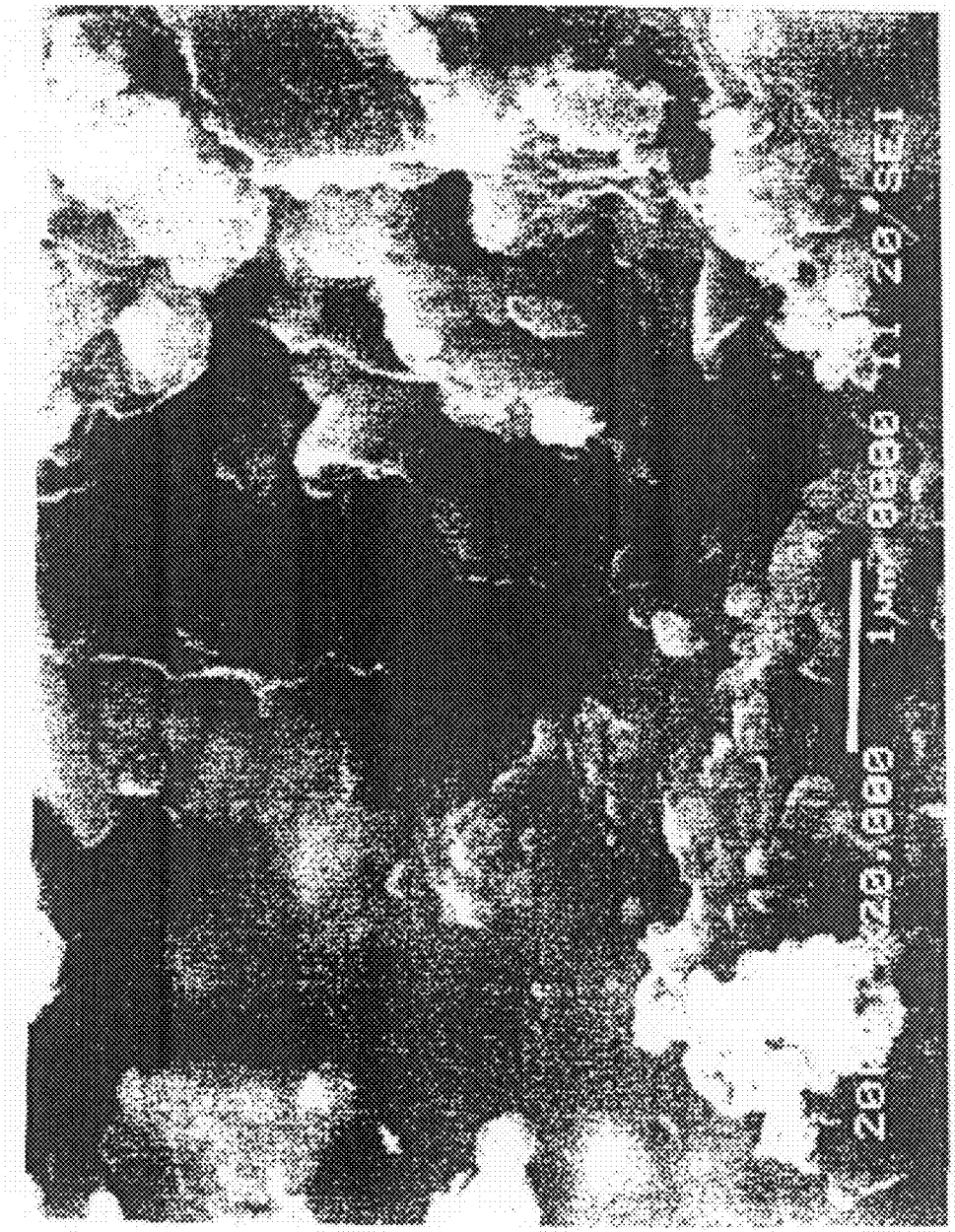

The flue gases escaping the chamber were thereafter treated in a three ways catalyst so as to trap the possible cerium containing particles present in the flue gases. The working of the three ways catalyst was improved and the live time of said three ways catalyst was increased. A correct working of the three ways catalyst was achieved in lean burning conditions according to a $O_2$ sensor, as well as in a stoichiometric burning conditions according to a $O_2$ sensor. It enables thus a correct working of the three ways catalysts on a broader range of burnings, whereby preventing possible damages of the three way catalyst and whereby the electronic control system for preventing possible damages of the three way catalysts can be simplified or even no more requested. The cut off of the $O_2$ sensor when shifting from an oxidizing environment towards a reducing environment is much clear and substantially immediate, whereby enabling a better control of the burning. As it can be seen from FIG. 32, the signal of the $O_2$ sensor when determining an oxidizing environment is stable and sufficiently removed from the signal when the environment is reducing. The signal is thus a substantially rectangular wave, two successive oxidizing steps (OX1,OX2) being separated by a short reducing step, the length of an oxidizing step being preferably at least twice as length than a reducing step (RD1). It seems also that the oxidizing environment in the burning chamber provided with an efficient coating catalyst of the invention is quite constant for all oxidizing steps (range OX), while the reducing environment in the burning chamber provided with an efficient coating catalyst of the invention is quite constant for all the reducing steps (range RD). The passage from one oxidizing level towards one reducing level being operated without intermediate steps.

While in the actual control system, it is more the shift of the $O_2$ from a reducing environment towards an oxidizing environment and inversely which is used, in the invention, as the signal is more stable, the duration of the oxidizing phase and/or of the reducing phase can be used for the feedback control. For example, the feedback is operated in function of the ratio oxidizing period/reducing period and/or in function of the ratio average oxidizing level/average reducing level, or a combination thereof.

As due to the presence of the catalyst coating of the invention when being efficient, the shift between oxidizing environment and reducing environment and inversely is carried out automatically, a simplified Electronic Control Unit can be used, said simplified ECU using no more the signal of the $O_2$ sensor for controlling for example the injection of the fuel. The fuel can be for example be injected at once, whereby facilitating furthermore the control of the working of the engine and its manufacturing.

Furthermore, it was observed that when the catalyst coating was effective so as to reduce $NO_x$, CO, soot, particulate material, as well as partially burnt hydrocarbons, PAH, $H_2$, etc., a more stable signal was achieved with the $O_2$ sensor.

The flue gases, the engine working, the regenerated coating and condensed water of the burning process were analyzed.

This analysis shows the following results less fuel consumption for the same work substantially no CO in the flue gases (less than 0.3%, advantageously less than 0.2%, preferably less than 0.1%)

substantially no particles in the flue gases (substantially no soot or carbon particles or cerium containing particles)

better torque at lower rpm and such as less than 3000 round per minute, especially less than 2000 rpm, such as between 500 and 1500 rpm.

no knocking less gaseous $SO_2$ (less than 20 ppm, such as less than 10 ppm)

better performance in the engine horse power brake test increased efficiency of the trap systems, such as the particulate filter of the type as disclosed in U.S. Pat. No. 4,902,487 or CRT filter less corrosion of all surfaces in contact with hot flue gases, such as the exhaust pipe, surface of the trap system, tail pipe, exhaust valves, etc.

quick steady state with respect to the low production rate of air pollutants from cool start;

better ignition with high plasma production rate increased life time of the spark plug less unburned fuel or hydrocarbons present in the exhaust gases, especially less methane higher oxygen content (such as more than 4%) in the exhaust gases better cooling of the motor, less intense heat transfer requested towards the coolant lower peak temperature in the burning chamber lower exhaust temperature for the flue gases (temperature of 50 to 70° C. lower than the temperature reached without efficient burning coating in the combustion chamber, said temperature being measured at the outlet manifold)

a high rate of fresh air flowing through the chamber when the inlet valve and outlet valve are opened (opening overlap time), whereby it seems to be highly advisable to use injector(s) for injecting directly the fuel or combustible in the burning chamber, when the inlet valve and/or outlet valve is closed, advantageously just after the closing valve, reduced amount of PAH, dioxins and furans in the exhaust gases, some formation of $H_2O_2$ and other OH species or radicals ($OH^-$, $H_2O_3$, etc.) during the compression step and/or in the end phase of the combustion step, as well as during the combustion phase and in some extent during the exhaust phase, whereby enabling the formation of a higher amount of OH radicals, as well as other radicals, no flame quenching during the combustion, the catalyst coating seems to induce a stratified burning phase mode allowing a further leaning out of overall air/fuel mixture, anti knock additives are no more required in the fuel as such, as the coating acts as an anti knock system, the catalyst coating acts as an efficient sequestering or trapping means for compounds with reactive or active ends, such as not completely burn hydrocarbons, partly oxidized hydrocarbons, such as ester, alcohols, aldehydes, phenol, ketones, PAH, etc.

the release of the condensed liquid hydrocarbons or partly oxidized hydrocarbons from the catalyst system can be retarded with respect to the start of the combustion process and/or can act as a system for maintaining a correct burning along all the face of the combustion chamber coated with the catalyst system lower $CO_2$ content more rapid exhaust of the flue gases less pumping losses (inlet/exhaust) or tuned inlet—exhaust flow the catalytic coating seems to act as it was a reservoir for species selected from the group consisting of oxygen, oxygen radicals O*, O−, H+, hydrogen, hydrogen radicals H*, hydroxyl radicals, etc. and for intermittently releasing oxygen or oxygen species or radicals, hydrogen, hydrogen species or radicals, hydroxyl species or radicals, etc. The release of reactive radicals or species seems to be controlled so as to be progressive so that radicals species are still released at the end of the combustion reaction. Such a release is for example continuous or the release rate is progressively increased. The catalyst is also able to uptake radicals, said radicals being then able to reform water or other compounds by-products by reaction at the surface or in the catalyst.

The catalyst coating seems to act as a means adapted for enabling an electron/radical combustion process, at least along the catalyst surface, the catalyst making electron bridges, whereby increasing the reactivity of the hydrocarbon, especially of the hydrocarbon in contact with the cerium containing deposit and the aluminum containing support. The hydrocarbon rendered reactive can then be removed from the catalyst surface into the volume of the combustion chamber, while still being reactive.

The catalyst surface acts as a storage system during rich and lean swing in the air/fuel ratio and to promote water gas shift reaction The catalyst layer containing $CeO_2$, when exposed to reducing gases, is chemically reduced to a non-stoichiometric compound which is commonly called $CeO_{(2-x)}$ which is between the composition of $CeO_2$ and $Ce_2O_3$ or $CeO_{1.5}$. The reduction of the $CeO_2$ to $CeO_{(2-x)}$ consumes some of the reductants in the gases bringing the A/F ratio back to 14.6. As soon as the A/F ratio becomes oxidizing, the $CeO_{(2-x)}$ is quickly converted back to $CeO_2$ where it is again capable of reacting with a reducing A/F ratio. This ability of $CeO_2$ to react with reducing gases and oxygen permits the automotive catalyst to operate at this desirable A/F ratio of 14.6, while maintaining a shift between oxidation phases and reduction phases with alternating plateaus.

Good catalyst efficiency for a large range of temperature (such as from 300° C. up to 1000° C. or even more)

Temperature stability

Possibility of increased mechanical compression ratio

Auto chemical control of the burn rate process or kinetic of the burning, whereby enabling a larger burning limit range (minimum–maximum), such an autocontrol corresponds to a multi injection combustion. Such an autocontrol is advantageous for enabling a correct chemical combustion with a correct rate at the end of the combustion, for example when the oxygen content is low.

Better use of the fuel energy density or storage density, as the catalyst enables a better combustion or transformation of the hydrogen or hydrogen species into $H_2O$ or water vapor. The catalyst enables thus to use a large portion of the high heating value of the fuel, i.e. a portion of the high heating value which appears in addition to the low heating value. This enables thus to reduce the volume or size of the combustion chamber. Even if it is only a theoretical approach, it is possible that a portion of the oxygen required for the final combustion of the hydrogen or hydrogen species is coming from the $NO_x$. The approach used for hydrogen or hydrogen species is also of application for the combustion of PAH, dioxins and precursors thereof into harmful compounds.

Low rate of poisoning of the catalyst for example by Sulfur or sulfur containing compounds, lead or lead containing compounds, etc., easy removal of possible catalyst poison, for example during a regeneration or rejuvenation step, Lower vibration due to lower friction, no knock and stratified burning Less noise, in particular audible noise, Possibility to control the working of the motor so that a high proportion of the work during the combustion and expansion phases is carried out at substantially constant pressure during increasing volume or during the expansion phase, Formation of a higher plasma rate in the zone adjacent to the sparkplug, such as in a larger zone, in particular in a zone extending up to a portion of the cylinder head. Due to said increased plasma, a formation of nanoparticles of carbon particles and/or the compound used for the regeneration and/or higher vaporization of fuel and/or higher electron production is formed.

The catalyst coating rejuvenation or regeneration allows an ongoing optimized high efficiency burning process during the whole life time use of a motor.

It seems also that the efficiency of a diesel/LPG/gas/hydrogen/gasoline or petrol motor using a burning chamber of the invention is due to an increased effective volumetric compression ratio and/or a compression following better the perfect gas law (increased γ), whereby increasing the temperature at the end of the compression step and therefor increasing the maximum theoretical efficiency according to Carnot. The same effect has been seen for engine of the invention using gasoline as fuel.

The efficiency seems also to be due to a lower cutoff ratio (expansion ratio during the combustion up to the maximum pressure of the compression step). The cutoff ratio of the cycle of FIG. 4 is about 2 (0.08/0.04) for the invention, while said cutoff ratio is about 2.5 (0.1/0.045) for the combustion not of the invention. Such a decrease of the cutoff ratio means an increase of the theoretical thermal efficiency of about 5%.

When an EGR is used, a higher EGR can be applied than the current ones, as well as on a larger rev's (rpm range) and on a larger load charge. For example, in the engine of the invention more than 20% of the exhaust gases can be recycled.

Possibility to downsized the post treatment

Less Hydrogen in the flue gases (this is confirmed by the higher $H_2O$ content in the flue gases)

Higher volumetric air intake efficiency has been measured with the engine of the invention, said efficiency being able to be monitored through the use of variable valve timing and/or lifting systems benefiting of the change of the valves overlap timing for controlling the fresh air intake in function of the rev's or rpm range and the load. Such a monitoring can replace partly or completely the use of an end-gas driven supercharger devices and/or the end-gas driven supercharger can be downsized and/or replaced by a higher efficient driven smaller supercharger device (especially electrically driven).

Deflagration burning pattern,

Low energy activation system

Better termination of the burning phase by radical combination of H with OH to form $H_2O$ Etc.

Figure 16:
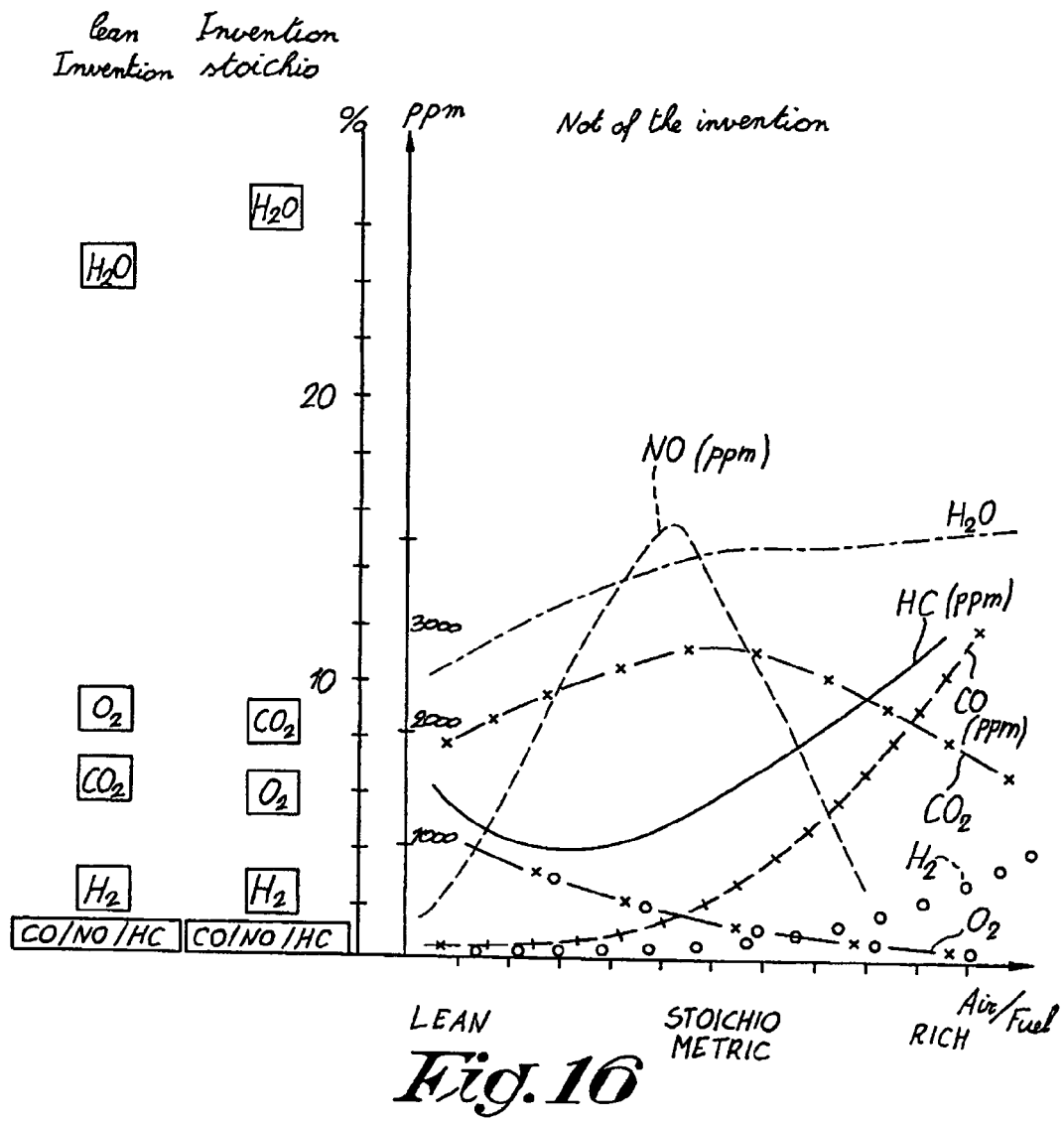
FIG. 16 is a graph showing the gas emission for a normal combustion for an internal combustion engine and for a combustion according to the invention
Figure 91:
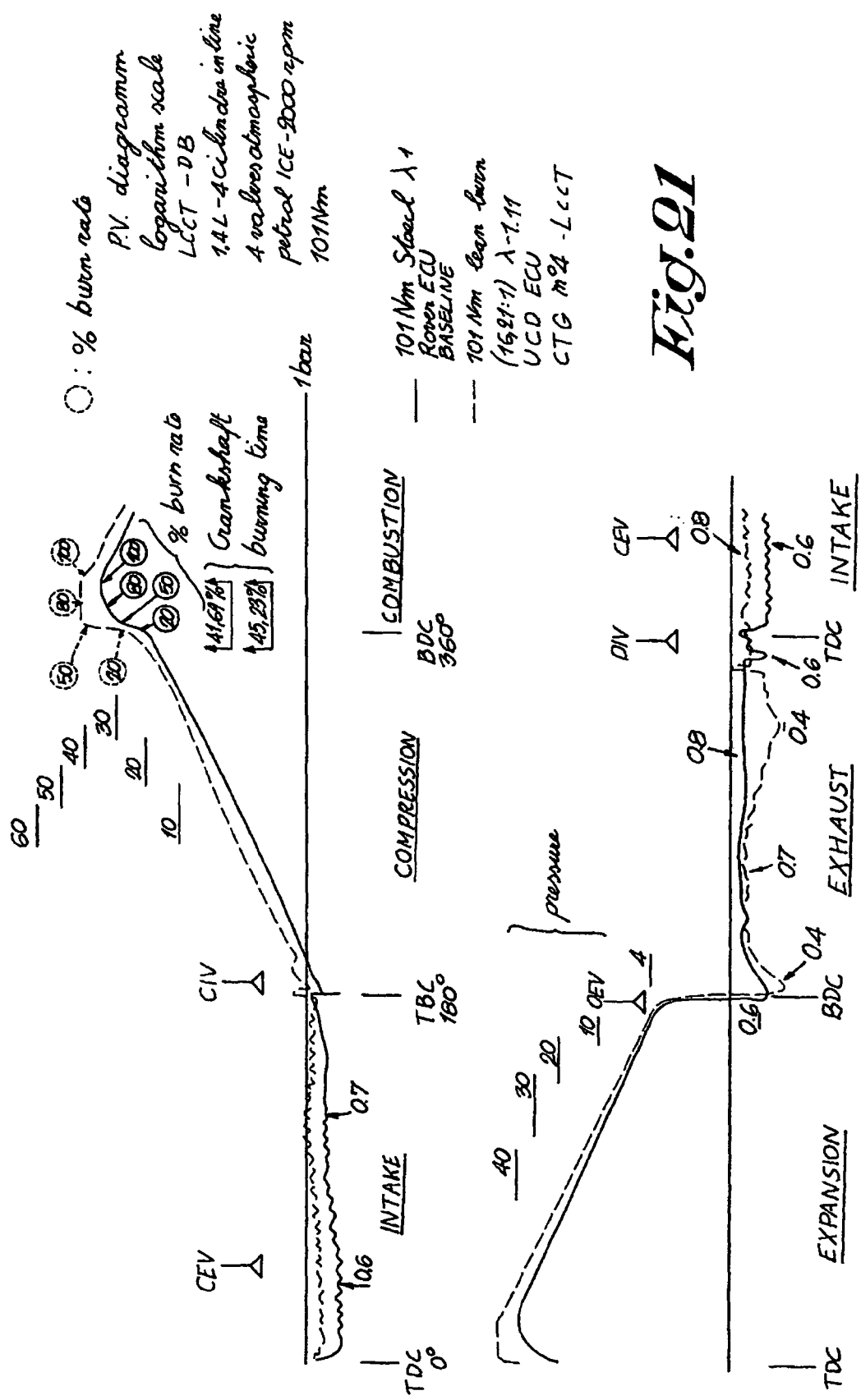

FIG. 16 is a graph showing for a normal combustion, the evolution of $CO_2$, $O_2$, $H_2$, NO, HC (unburned) and $H_2O$ content in the exhaust gases, in function of the air/fuel ratio, i.e. for a lean combustion, for a stoichiometric combustion and for a rich combustion. The NO, HC and CO contents are expressed in ppm, while the $H_2O$, $O_2$, $CO_2$ and $H_2$ contents are expressed in % by volume. When using the burning process of the invention, with a stoichiometric air/fuel ratio at the inlet of the burning chamber, the oxygen level and the $CO_2$ level correspond to the level for a normal lean combustion. For identical lean condition, the oxygen content in the combustion of the invention (exhaust gases) is higher than the level obtained in the exhaust gases for a traditional lean combustion. When using lean condition for the burning process of the invention, the oxygen and $CO_2$ levels will correspond to level of a still leaner normal combustion. The flue gases of the combustion of the invention had a very high water content (more than 20% by volume).

It has also been seen that the weight ratio air/fuel can be increased with respect to the traditional engine. For example when using the burning chamber of the invention, it is possible to have a correct working with air/fuel weight ratio greater than 15, such as greater than 16, especially comprised between 16 and 20, such as about 18.

It is assumed that in the burning process, a mechanism combining oxidation steps and reduction steps occurs, namely a mechanism ensuring a complete oxidation of C and HC into $CO_2$, and a reduction mechanism of noxious gases or other harmful gases (for example due to the presence of hydrogen). It is assumed that during the combustion process, some water vapor is dissociated in hydrogen species and oxygen species. At the end of the burning, remaining H species reacts with O species to form OH species which further react with H species for forming $H_2O$.

It has also been observed that a thin deposit of cerium/refractory containing compounds was obtained on different elements in contact with the flue gases. This post deposit was even present on at least a portion of the burning coating.

A possible way of action of the catalyst can be:

reaction of $NO+\frac{1}{2}O_2$ with the catalyst coating of the invention, whereby forming a $NO_2$ species which when binding to the catalyst coating release $CO_2$, said binding reaction being then followed by the following further reaction:

$CO+HC+H_2$ react with the catalyst surface for releasing $NO_x$ and reforming some carbonate on the catalyst, said $NO_x$ further reacting with CO on the catalyst coating so as to form $N_2$ and $CO_2$.

Such a deposit occurs for example on the spark plug from tip to rim, anode/cathode or all the surface of the spark plug located in the burning chamber, on the cylinder walls, on the exhaust valve (on the first face directed towards the burning chamber and/or on the face opposite to said first face and/or on the circular face, on the rod), on the piston, on the inlet valve (on the first face directed towards the burning chamber and/or on the face opposite to said first face and/or on the circular face, on the rod), on the outlet manifold, piston seals, valve seal, on the valve rod, on the valve seat, on the outlet pipe (before and after any gas treatment system, i.e. up to the tail end) and on the gas treatment system 12. Such a deposit is advantageous for avoiding or limiting corrosion problems, for having further $NO_x$ reducing effect, for regenerating catalytic activity of the gas treatment system, for limiting and/or avoiding the deposit of soot and carbon, for further catalyzing the oxidation and/or reduction of compound in the flue gases, etc.

For example, for a sparkplug, the coating of the invention is applied on the tip (Pt containing tip) and/or the mass electrode (for example made of Ni-Yttrium) and/or the rim. It seems that the presence of a coating of the invention enables an improvement of the plasma formation.

The presence of the catalytic deposit seems to prevent the deposit of large particles which are detrimental for ensuring a good sealing at the valve level, as well to prevent corrosion problem as well as preventing burning of exhaust valves.

It was also observed that the 3D-vibration (tridimensional, axis X, Y, Z) of the motor was significantly reduced and that the stability of the combustion flame was improved.

FIG. 21 is a view showing the evolution of the pressure during the intake step, the compression step, the burning step, the expansion step and the exhaust step for a motor of the invention with a torque of 101 Nm and for a motor not of the invention with a torque of 101 Nm, the fuel consumption in the motor of the invention being 10% lesser than the fuel consumption in the motor not of the invention. In said figure TDC means Top Dead Center, while BDC means Bottom Dead Center. The percentage of fuel burning is also given in said figure.

It appears clearly from said figure:

that higher pressure can be obtained in the motor of the invention, that said high pressure can be maintained during a longer period, that after the opening of the exhaust valve, a higher depression is created, meaning that a better sucking of exhaust gases (without need of a supercharger) occurs, (tuning effect)

that the pressure is maintained at a lower level during the exhaust (after the opening of the exhaust valve OEV) up to the opening of the inlet valve OIV, that after the opening of the inlet valve OIV but before the closing of the exhaust valve CEV, the pressure is higher, meaning a better suction of fresh air through the inlet valve (possibility to create an air wash or flushing in the burning chamber between the inlet and the outlet, whereby a better cooling, a better filling, a delayed fuel injection, etc.), a portion of said air being further sucked in the exhaust pipe due to the depression, that a higher pressure is reached after the closing of the exhaust valve CEV during the intake, meaning a better filling of the chamber.

The better filling of the chamber of the motor of the invention enables to make a downsizing of the motor, whereby reducing further its weight, its volume and its fuel consumption with respect to a commercial motor for the same power output.

A better filling also implies that a higher compression volumetric ratio can be achieved, whereby reaching at the end of the compression conditions corresponding substantially to conditions for an auto inflammation based combustion cycle (petrol, diesel). A better filling also implies that a higher mechanical compression ratio rate can be used in case of a sparkplug ignition and/or that a lower mechanical compression ratio rate can be used in the case of diesel engine.

With respect to a motor with a torque of 101 Nm not of the invention, it was possible with a motor of the invention with a torque of 101 Nm and with a fuel consumption reduction of about 10%, to increase the average top pressure of about 25%, increase of the indicated mean effective pressure (IMEP P/V) of about 3%, decrease of $CO_2$ content of about 15% (due to a lower fuel consumption and due to a higher filling rate of the combustion chamber, due to a higher air/fuel ratio, whereby implying a larger dilution of the $CO_2$), to increase the thermal efficiency by about 9%, and to increase the volumetric efficiency of about 11%.

The working of the engine could still be improved by providing the exhaust system, such as the exhaust pipe with a catalyst coating of the invention.

According to a preferred embodiment (se FIG. 2), during a non regeneration step, some water vapor was admitted in the intake air, via the pipe 17A provided with a valve 18A and a heating means 19. The admission occurs then advantageously between the ovoid chamber 16 and the combustion chamber. Such an admission is for example operated when no water vapor is admitted in the ovoid chamber 16 by the pipe 17. With such a system it is possible to benefit of the advantages of the addition of water vapor in the combustion chamber during the non regeneration step, i.e. when the burning coating is sufficiently efficient.

In case the ovoid chamber 16 is located between the admission via pipe 17A and the combustion chamber, a minimum amount of water vapor can entered in the ovoid chamber 16, whereby enabling to have a minimal cerium and/or europium and/or ytterbium and/or praseodymium and/or neodymium (Nd) and/or lanthanum content in the intake air, such as a minimal amount comprised between 1 and 100 ppb, such as 20 ppb, 50 ppb, 75 ppb. When the catalyst coating has to be regenerated, water vapor is then admitted in the ovoid chamber 16, while the water vapor admission via pipe 17A is reduced or stopped, preferably reduced.

Figure 5:
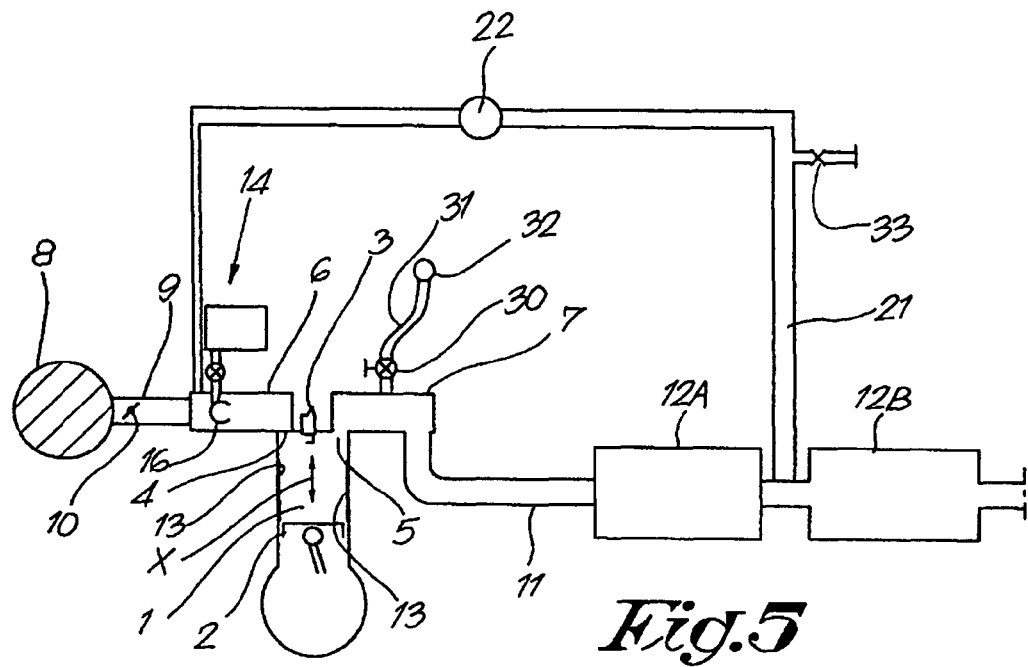
FIG. 5 is a view of an embodiment similar to that of FIG. 1, but with an exhaust gas recycling.

FIG. 5 is a schematic view of an internal engine similar to that of FIG. 1, except that the engine is associated with a exhaust gas recycling system (EGR).

In the internal engine of FIG. 5, a pipe 21 connects the outlet pipe 11 after the 3 ways catalyst 12A with the intake manifold 6. A fan or turbine or turbo fan 22 (for example electric driven) is mounted on said pipe 21 so as to ensure the suction of part of exhaust gases for recycling said sucked exhaust gases in the intake manifold 6.

By controlling the speed of rotation of the fan, turbine or turbo fan, it is possible to control the volume of exhaust gases recycled. Advantageously the exhaust gas recirculation is prevented when the inlet valve and the exhaust valve are both in open position, while being operated when the exhaust valve is in closed position.

The regeneration of the catalyst of the combustion chamber and/or of the soot trap system (12B) can be operated as disclosed in the description of FIG. 1.

However, advantageously the amount of recycled exhaust gas will be adapted for the regeneration to be operated. For example, when the coating catalyst of the burning chamber has to be regenerated, the amount of recycled flue gases will be reduced with respect to the amount of recycled flue gases when no regeneration has to be carried out. When the soot trap, the filter or the converter has to be regenerated, the amount of recycled flue gases will be reduced with respect to the amount of recycled flue gases when no regeneration has to be carried out, but will advantageously be greater than the amount of recycled flue gases, if any, used during the regeneration of the catalyst coating of the burning chamber.

Figure 6:
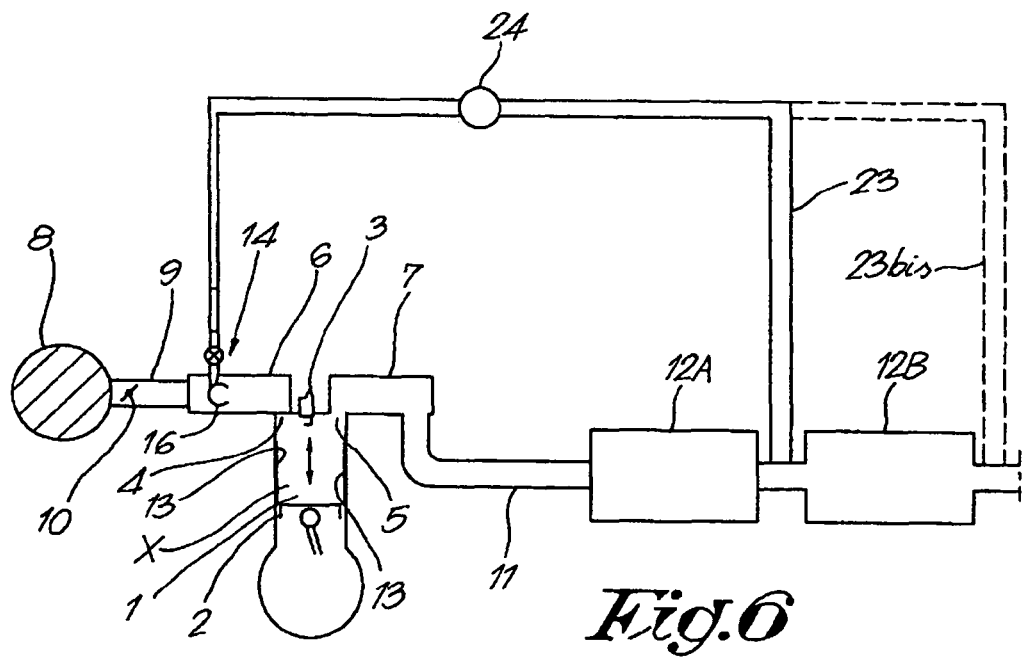
FIG. 6 is a further view of an embodiment of a motor with exhaust gas recycling.

FIG. 6 is a schematic view of another internal engine similar to that of FIG. 1, except that the engine is not provided with a device for forming vapor 14, but is provided with a recycling pipe 23 with a fan, turbine or turbo fan 24 for recycling a part of the exhaust gases into the ovoid chamber 16 (the air inlet 16B being possibly closed). Possibly, the recycling pipe can recycle combustion gases after being treated completely by the filtering system 12A and the soot trap system 12B, i.e. combustion gases ready for being exhausted in the atmosphere. Such a recycling pipe 23 bis is shown in dashed line.

The regeneration operations can be carried out as disclosed for the device disclosed in FIG. 1 and in FIG. 5.

Figure 7:
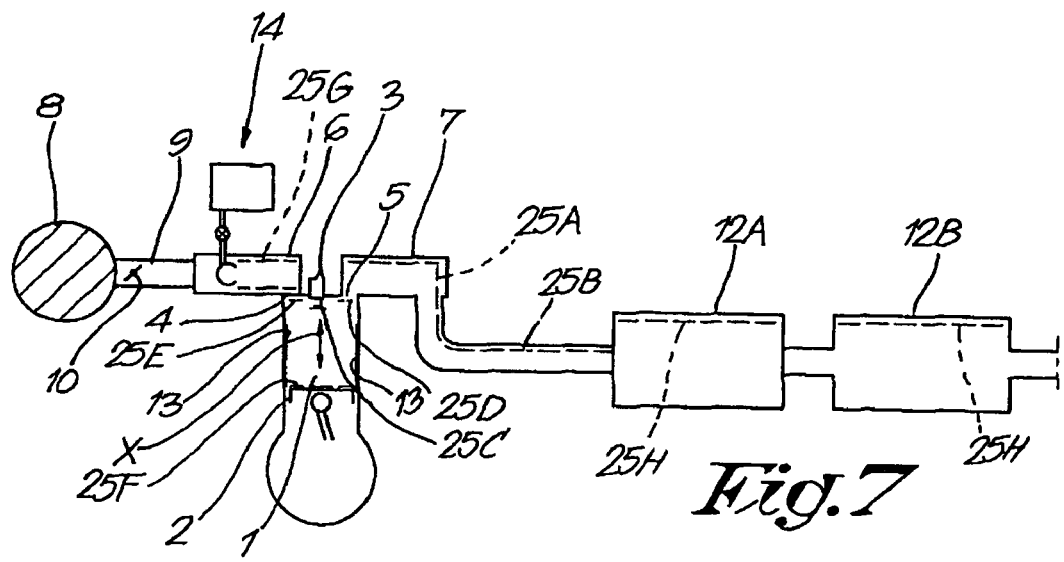
FIG. 7 is a view similar to that shown in FIG. 1, with further precoating.

FIG. 7 is a further schematic view of an internal engine of the invention, similar to the engine of FIG. 1, except that one or more of the following elements are provided with a catalyst coating 25 (shown in dashed lines). Said elements are:
  the exhaust manifold 7 with a catalyst coating 25A, and/or
  the exhaust pipe 11 with a catalyst coating 25B, and/or
  the spark 3 with a catalyst coating 25 C, and/or
  the outlet valve with a catalyst coating 25D, and/or
  the inlet valve with a catalyst coating 25 E, and/or
  the piston 2 with a catalyst coating 25F, and/or
  the intake air manifold with a catalyst coating 25G and/or
  the trap or oxidizing system or oxidizing/reducing system 12A, 12B with a catalyst coating 25H.

Said catalyst coating is for example a coating comprising cerium, lanthanum, praseodymium and neodymium, and advantageously further europium and/or ytterbium, and at least a refractory compound.

Advantageously, the catalyst coats a portion of the exhaust pipe extending between the exhaust manifold and the filter or trap or converter. Said catalyst is advantageously as disclosed in this specification for the catalyst of the burning chamber.

When the catalyst coats partly the exhaust pipe, the catalyst coats advantageously a portion of the pipe extending at least at a distance of at least 100 cm, advantageously at a distance comprised between 100 and 200 cm from the outlet valve. The catalyst coats for example a portion of the pipe which is intended to be in contact with flue gases having a temperature at least about 200° C. below the maximum temperature of the exhaust gases at the outlet valve, for example in contact with flue gases with a temperature comprised between 300° C. and 500° C.

The catalyst present in the pipe, especially at said portion, is preferably a deposit containing at least Ce/Pr/Nd/La and comprising a series of adjacent grains with a size greater than 1 µm. The grains have a first face in direct contact with the support and a second face not contacting the support. Said deposit covers a first portion of the support, while not covering a second portion of the support so as to define zones extending between adjacent grains, said zones being then advantageously free of Ce/Pr/La/Nd deposit in direct contact with the support.

The catalytic system further comprises:
  a first group of carbon nano/meso particles (active carbon nano/meso particles) contacting only a portion of the second face of the deposit, whereby leaving at least partly said second face free of carbon deposit,
  a second group of carbon nanoparticles (active carbon nano/meso particles) contacting only partly the second portion of the support (portion of the zones), and
  a carbon containing structure extending between at least one carbon nano/meso particles of the first group and one carbon nano/meso particles of the second group, said carbon structure comprising advantageously carbon nano/meso particles.

The group formed by the deposit, the carbon nanoparticles of the first group, the carbon nanoparticles of the second group, and the carbon containing has a BET surface of at least about 5 m²/g after being treated at 300° C. for 8 hours, such as a BET surface comprised between 5 and 20 m²/g, especially between 5 and 10 m²/g.

The carbon containing structure comprises liquid condensed hydrocarbons with a condensation temperature of less than 300° C. at atmospheric pressure (1 atm).

After removal of condensed liquid hydrocarbons by heat treatment at a temperature of 300° C., the weight ratio [Ce/Pr/La/Nd]/C is comprised between 0.1 and 1, for example 0.4, 0.5, 0.7, 0.9. The condensed liquid hydrocarbon phase comprises advantageously from 5 to 20% by weight oxygen, such as 7%, 10%, 15% by weight. The Carbon/cerium atom ratio in the catalyst after removal of the condensed liquid hydrocarbon condensing at a temperature of 300° C. is advantageously comprised between 0.5 and 4.

The catalytic system is free of Pt, Ir, Pd, Rh, Au and Ag, while containing at least one further atom selected from the group consisting of Eu, Sc, Yb, Fe, Zn, Ni, Mn, Ca, Mg, Ba, Si, Cu, P, N, S, Fl, Cl and mixtures thereof.

The interest to have coating on elements in contact with hot flue gases is to enable even after the combustion step a further $NO_x$ reduction, CO reduction, HC reduction, soot reduction and an anti soot deposit formation. Furthermore, the possible $H_2$ still present will be oxygenated so as to form OH radicals and/or water.

The amount of catalyst present in the pipe is greater than the amount of catalyst present in the burning chamber or burning chambers exhausting flue gases at one moment. For example, for an engine with four cylinders exhausting flue gases the one after the other, the amount of catalyst in the pipe is comprised between 2 and 10 times the amount of catalyst present in one burning chamber.

Figure 8:
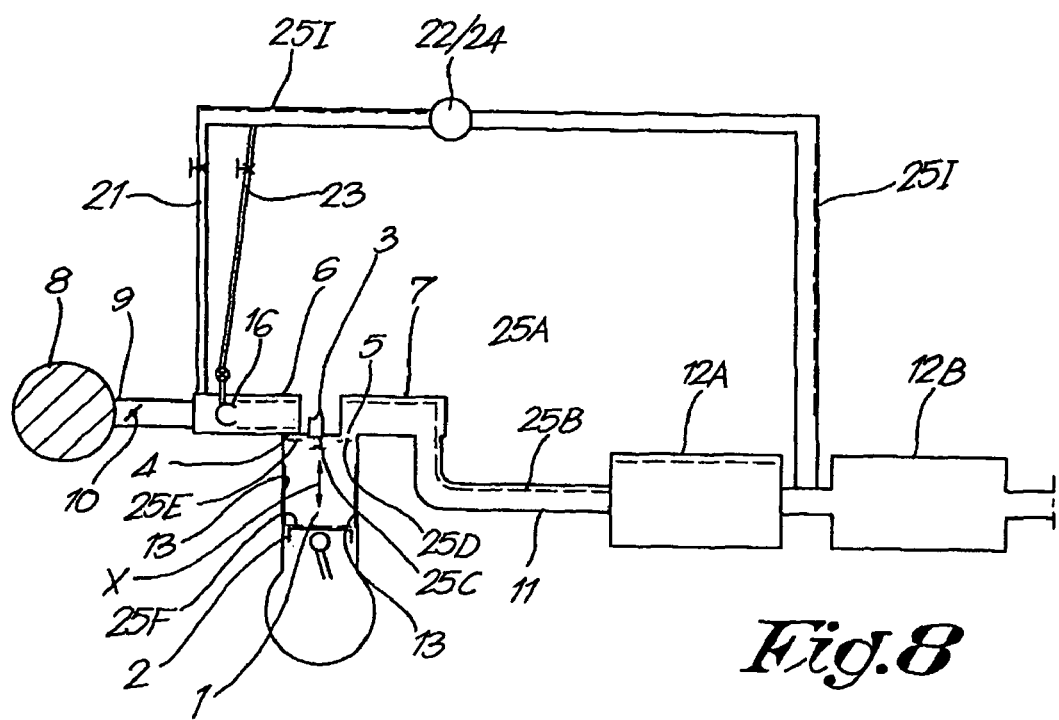
FIG. 8 to 10 are further views of embodiments of the invention

FIG. 8 is still a further view of an internal engine of the invention similar to that of FIG. 7, but provided with an exhaust gas recycling system (21,22) or (23,24). In said embodiment, at least the pipe (21,23) for recycling a part of the exhaust gases is provided with a catalytic coating 25I, such as a catalytic coating containing cerium, Pr, La and Nd and possibly europium and at least a refractory material. Possibly in this embodiment, the ovoid chamber 16 is not necessary for the admission of cerium compound in the intake air for the regeneration of the catalyst. However in said case, water or water vapor is advantageously admitted in the EGR FIG. 7, see reference 14).

In the devices of FIGS. 1, 5 to 8, the cerium containing compound was used for keeping substantially steady the $NO_x$ reduction, CO reduction, HC reduction and PM reduction, while having a high efficiency during the whole life of the engine. This stable reductions and high life-time efficiency seem to be the consequence of a regeneration or rejuvenation of the catalyst coating.

When making tests with the internal engine of anyone of the FIGS. 1, 5 to 8, it has been observed that the regeneration or rejuvenation of the coating of the burning chamber was better when using simultaneously cerium and/or europium and/or ytterbium and/or praseodymium and/or lanthanum (possibly mixed with one or more other rare earth), together with a refractory material or a precursor thereof.

While in said figures, the invention is disclosed for an internal combustion engine, the process of the invention can also be carried out for other type of combustion engines or processes using a catalyst. For example, the process of the invention can be carried out in a gas turbine, a jet, turbojet, an incinerator, a fixed bed, a fluidized bed, HCCI, CAI, pulse combustion, Mems engine, microelectronic engines, etc., the combustion chamber and/or the outlet pipe of which being provided with a catalyst coating of the invention. However, preferably the burning is made in a burning chamber provided with a catalyst coating, in presence of water vapor at least partly at a pressure higher than $2\ 10^5$ Pa, advantageously at a pressure higher than $5\ 10^5$ Pa, preferably higher than $10\ 10^5$ Pa.

Further tests have then been made for confirming that the burning process made in presence of a catalyst of the invention and a sufficient amount of water was suitable for reducing the formation of $NO_x$, the formation of soot and carbon particles, the formation of $SO_2$, the formation of PAH, dioxins and furans, as well as precursors thereof, etc., while improving the burning.

It was observed that when adding to the rare earth catalytic system of the system disclosed in U.S. Pat. No. 4,844,028 or in U.S. Pat. No. 4,991,395 with a minimum amount of refractory nano/meso particles, such as aluminosilicate particles, preferably wolframite particles, a better $NO_x$ reduction could be achieved than with the system disclosed in U.S. Pat. No. 4,844,028 or in U.S. Pat. No. 4,941,395.

Furthermore, the presence of said nano/meso particles of refractory material was also reducing possible corrosion problems or risks.

According to a possible embodiment of said devices, said devices are connected to a control means adapted for example to introduce in the combustion chamber cerium and/or europium and water vapor, when the $NO_x$ mobile average content (for example average calculated on a combustion period of 15 minutes) is above a maximum acceptable value and to stop the introduction of cerium and/or europium in the combustion chamber when the $NO_x$ mobile average content is below or about a minimum value, as well as, when the CO mobile average content (for example average calculated on a combustion period of 15 minutes) is above a maximum acceptable value and to stop the introduction of cerium and/or europium in the combustion chamber when the CO mobile average content is below or about a minimum value, as well as when the HC mobile average content (for example average calculated on a combustion period of 15 minutes) is above a maximum acceptable value and to stop the introduction of cerium and/or europium in the combustion chamber when the HC mobile average content is below or about a minimum value, as well as when the Particulate Material mobile average content (for example average calculated on a combustion period of 15 minutes) is above a maximum acceptable value and to stop the introduction of cerium and/or europium in the combustion chamber when the particulate material mobile average content is below or about a minimum value, as well as when the burning average efficiency (for example average calculated on a combustion period of 15 minutes) is lower a minimum acceptable value and to stop the introduction of cerium and/or europium in the combustion chamber when the burning average efficiency is higher or about a predetermined value.1

In the devices of FIGS. 1, 5 to 8, it can be of interest to have an air admission, especially a controlled fresh air admission in flue gases. Such a controlled air admission is for example in the device of FIG. 1 an air admission valve 30 connected to a pipe 31 on which a fan 32 is mounted. Said fresh air is admitted in the exhaust gases manifold 7. The admission of fresh air can be controlled for example in function of the richness of the flue gases, and/or so as to have always a substantially stoichiometric flue gases and/or so as to reduce the temperature of the exhaust gases.

In the device of FIG. 5, two air admissions are provided, a first similar to that of the device of FIG. 1, the second (33) adapted for admitting fresh air in the exhaust recycling pipe 21. As a fan 22 is already mounted on said pipe 21, it is possible to use a valve 33 or a controlled valve for the admission or sucking of fresh air in the pipe 21.

Figure 9:
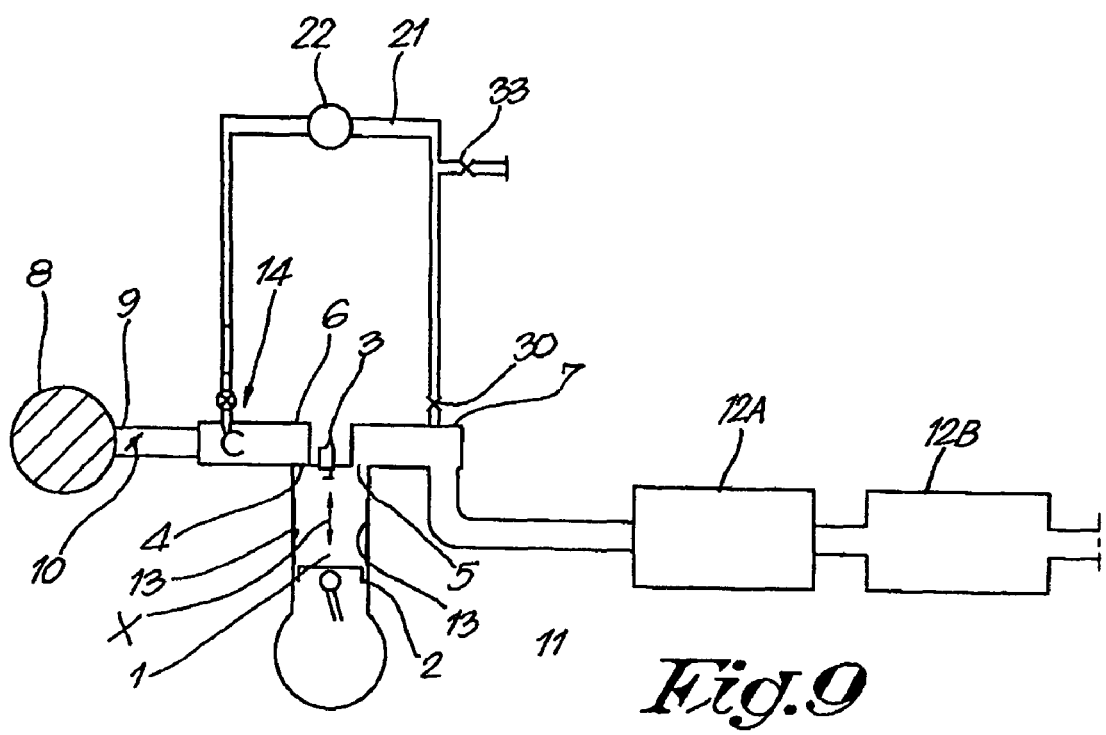

In the FIG. 9, the device is provided with a pipe for recycling exhaust gases from the exhaust manifold to the intake manifold. Said recycling is for example made by a pipe 21 with a fan 22 and an air admission valve 33. Possibly, instead of being recycled through the ovoid chamber 16, the recycled gas can be recycled in the intake manifold not via the ovoid chamber. In case the exhaust recycling pipe 21 is provided with a coating cerium/europium+refractory material, it is possible to have an embodiment without ovoid chamber. When the regeneration of the burning catalyst is operated by exhaust gas recirculation, it is necessary that a sufficient amount of flue gases are recirculated while being in contact with a sufficient amount cerium. Preferably, some water is added in the recirculated gas.

Instead of admitting air in the exhaust manifold through the valve 30 and/or in the recycling pipe 21 through the valve 33 and/or in an exhaust pipe or system, it is also well possible to admit water vapor and/or a mixture of water vapor and air instead of admitting only air.

The precoating of the burning chamber for achieving a precursor coating of the catalyst coating can be operated in various manner.

Possible examples are given hereafter:

A combustion motor which have already been used for 25,000 km was treated as follows:

step 1: each combustion chambers or cylinders have been treated with a decoking agent for removing the coke deposited on the wall of the chamber. Such a decoking agent is introduced in the combustion chamber through the opening obtained by removal of the spark plugs. After a sufficient contact time with the decoking agent, the coke is removed and the combustion chamber are cleaned and dried.

Step 2: Each combustion chambers have then been treated with a liquid or viscous composition containing at least a first catalytic material or a precursor thereof. Said liquid or viscous composition is introduced in the combustion chamber via the opening of the spark plugs. The piston of each combustion chamber is moved so that all the wall of the combustion chamber are provided with a layer of liquid or viscous material.

Step 3: After placement of the spark plug, the motor is used so as to submit the coating layer to a high temperature and to a high pressure, especially to a cycle of successive steps of high temperature and high pressure steps with intermediate steps at low temperature and low pressure (atmospheric pressure).

Step 4: The efficiency of the catalyst coating is now analyzed, for example visual analysis, $NO_x$ reduction analysis, CO analysis, HC analysis, etc. If the efficiency of the catalyst coating is not sufficient, steps 2 and 3 have to be repeated.

In this method, the liquid or viscous material contains for example a metal or a rare earth metal or salts thereof. For example, the liquid or viscous material contains Ce, Nd, Pr, La particles or compounds, or mixtures thereof, and active carbon nanoparticles. The liquid or viscous material is for example an oily or wax based material. The active particle (cerium, activated carbon) or compound content in the liquid or viscous material is for example at least 20% by weight, advantageously at least 35% by weight, for example from 50 up to 85% by weight. The compounds can be organometallic compounds, such as any organometallic compounds disclosed in EP 1,215,272, the content of which is incorporated in the present specification by reference. When using solid particles, said particles are preferably nanoparticles, possibly agglomerated so as to form agglomerates with a particle size of less than 10 µm, preferably less than 100 nanometers. Possibly, the solid particles can be coated with an adhesive or mixed with aluminum particles.

According to a possible embodiment, the oily or wax composition is applied on heated wall of the combustion chambers, so as to facilitate the deposit of catalyst material (for example by evaporation of one or more solvents present in the composition).

The wax or oily composition can also comprise a plastizer and/or release agent. In another example, instead of using a oily or wax based material for coating, fine powder was used. Said powder was sprayed in the combustion chamber with the piston moving, so that all the wall of the combustion chamber are coated with a powdery layer. The walls of the combustion chamber are then advantageously preheated so as to ensure a better coating or adherence of the particles. The spraying of the powder is advantageously carried out in the absence of coke or coke precursor.

After the assembly of the cylinder head, piston, valves, and block or block cylinder (advantageously after being honing) and/or during the process of assembling of the motor, the catalyst coating or a precursor thereof is deposited, possibly after a pre run test, but preferably before testing.

For new motor, it has been observed that prior to the coating with the catalyst layer, it was advantageous to pretreat or pre-run the combustion chamber while moving the piston with or without additives. Such a pretreatment is for example operated by placing a lubricant (liquid, wax, powder, such as graphite powder, spherical graphite powder) in the combustion chamber. After said pretreatment, the combustion chamber is advantageously washed or cleaned so as to remove the remaining lubricant or powder present in the combustion chamber.

It has also been observed that the only treatment of the piston head was already effective for achieving a good result with respect to reduction of $NO_x$, CO, HC and Particulate Material in the flue gases.

When a new motor is provided with a reactivation system for a catalyst present in the combustion chamber, the first catalyst layer can be deposited during the manufacture of the combustion chamber or part(s) thereof, or just after. For example catalytic particles can coat faces of the mould used for molding the motor or for molding the piston head.

The coating can also be operated (possibly after a decoking step when applied to used engines) by applying first an adhering agent, such as a liquid wax, while applying thereafter on said adhering layer a powder mixture comprising Ce containing particles and active carbon nanoparticles.

According to a specific embodiment, the cerium containing powder is first applied on the wax coating, while thereafter dry active carbon nanoparticles are applied.

In the device of FIGS. 1, 5 to 9, the admission of cerium particles is made in the intake manifold. In possible embodiments, it is possible to make such an admission in the exhaust manifold, in the exhaust recycling pipe, in the exhaust pipe or in the intake pipe 9. However, in the preferred embodiment, the cerium admission is made in the intake manifold and/or in the exhaust recycling pipe, most preferably in the intake manifold.

While in the devices of the invention shown in the attached drawings, cerium is admitted with refractory material (clays), it is possible to make separate admission, a first admission means for admitting cerium particles in the intake air and a second admission for admitting refractory material (such colloidal clay) in the intake air.

The piston head can also be provided with a catalyst coating of the invention or a precursor thereof by applying a catalyst coating or a precursor coating on the head face of the piston. This coating can be applied by dipping, brushing, spraying, painting, etc.

According to further possible embodiment, walls in contact with hot flue gases, such as walls of the combustion chamber, wall of the outlet manifold, exhaust valves, wall of the exhaust pipe, wall of the exhaust recycling means are provided also with a refractory coating or layer.

In the example, the catalyst used for regeneration or for the rejuvenation or for the treatment of the catalyst coating comprises cerium. In other possible examples, the catalyst comprises europium and refractory material, such clay, hydrated clay particles. In still another example, the catalyst comprises a refractory material and cerium, lanthanum and praseodymium and neodymium (Nd).

Figure 10:
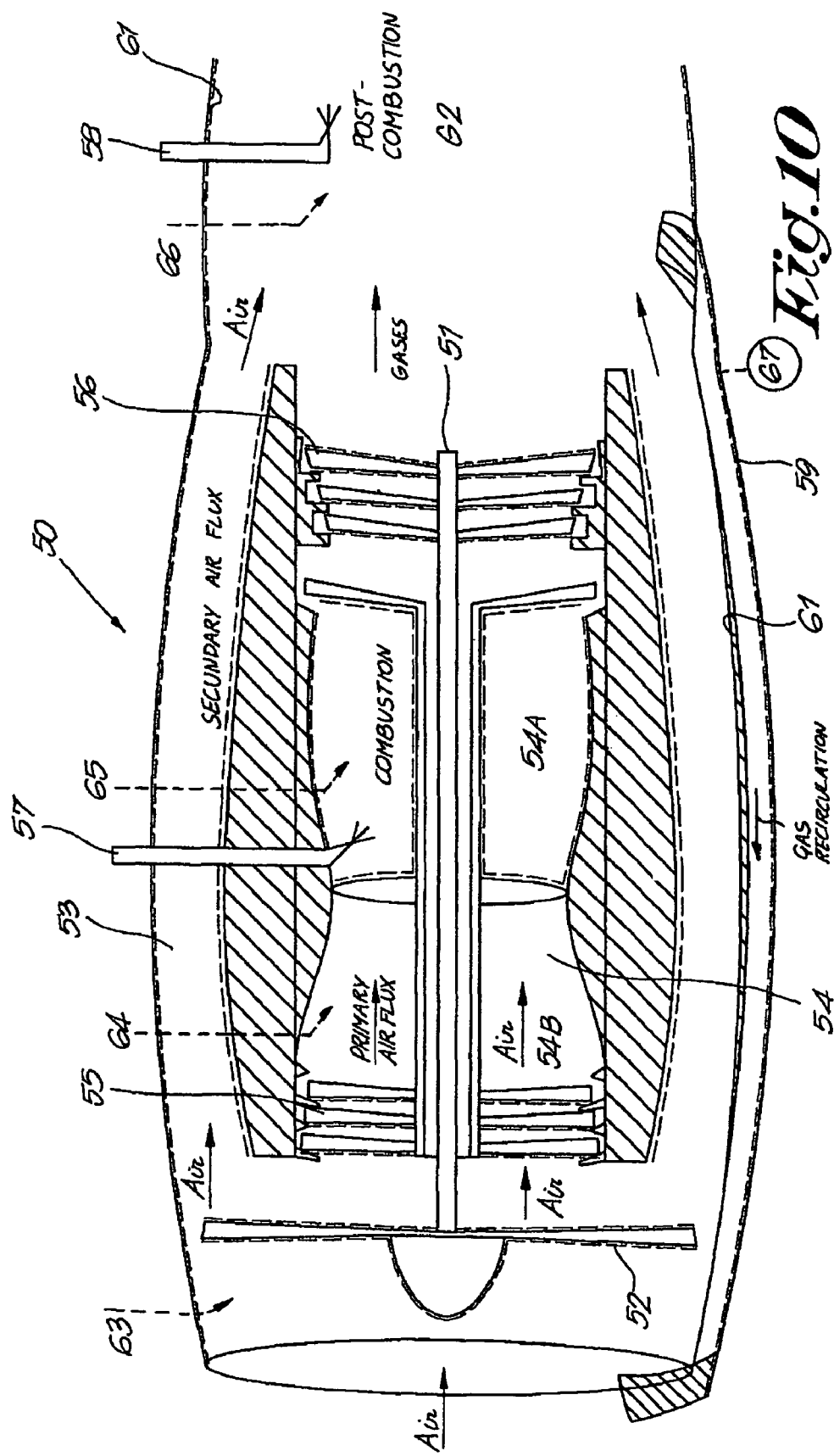

FIG. 10 is a schematic view of a turbine 50 comprising a rotating rod or axle 51 bearing fin 52 for sucking air and pushing said air in the turbine chambers 53,54, fins 55 for compressing air and forming the primary air flow towards the main burning chamber 54A, fins 56 for rotating the axle 51 due to the gas expansion of the combustion gases in the burning chamber. The exhaust gas flowing through the fins 56 are mixed with the secondary air flow issuing from the chamber 53. The turbine is provided with a fuel admission 57 for admitting fuel into the burning chamber, and possibly with a fuel admission 58 for enabling a post combustion of the exhaust gases of the combustion chamber mixed with air of the secondary air flow.

If required, the turbine can be provided with a exhaust recycling system, such as a pipe 59.

Various parts of the turbine can be provided with a catalyst coating 60. The coating is for example attached to a liner coating the blades of the turbines. Such a coating is shown in dashed lines. For example the inner wall 61 of the turbine or a portion thereof in contact with the second air flow and with the exhaust gases, and/or wall of the burning chamber 54A or a portion thereof, and/or the fins 52 or a portion thereof, and/or fins 55 or a portion thereof, and/or fins 56 or a portion thereof, and/or wall of the recycling pipe 59 or a portion thereof and/or walls of the post combustion chamber 62 or a portion thereof are provided with such a coating. Most preferably, only parts in contact with hot flue gases are coated with such a coating.

The regeneration or rejuvenation or treatment of the catalyst coating can be carried out by admitting cerium and/or europium and/or ytterbium and/or praseodymium and/or lanthanum particles and refractory particles, preferably with water vapor, before the fins 52, in the primary air flow (portion 54B of the chamber 54, before the burning chamber 54A) and/or in the burning chamber 54A and/or in the post combustion chamber 62.

The systems for admitting cerium and/or europium and/or ytterbium and/or praseodymium and/or neodymium (Nd) and/or lanthanum particles and/or refractory particles are indicated schematically with numerals 63,64,65,66,67. Said systems are advantageously a system similar to that shown in FIG. 2.

The turbine can be provided with different specific admission systems for admitting in different places catalyst particles.

According to a possible embodiment, the admission of cerium/europium particles and of refractory materials (such as clay particles) is made separately. For example, the refractory material or clays (for example hydrated clay) is admitted before the burning chamber 54A, such as in the chamber 54B and/or before or after the fins 52, while the cerium/europium/ytterbium/praseodymium/neodymium (Nd)/lanthanum compound is admitted in the burning chamber 54A and/or in the post combustion chamber 62. According to still a possible embodiment, the refractory material is admitted in the burning chamber, while the cerium/europium/ytterbium/praseodymium/neodymium (Nd)/lanthanum compound is admitted in the post combustion chamber. Still according to another possible embodiment, the cerium/europium/ytterbium/praseodymium/lanthanum compound is admitted in the combustion chamber, while the refractory material is admitted in the post combustion chamber.

However, preferably, an air/water vapor mixture containing cerium or europium and refractory material (such as clays) is admitted in the burning chamber and in the post combustion chamber, if any. By modelizing, it has been found that good result could be obtained when introducing cerium and/or europium and/or ytterbium and/or praseodymium and/or lanthanum particles together with refractory material (such as clay, wolframite) in the burning chamber or in the compressed air (54B) entering in the burning chamber. Said admission is preferably made in presence of water vapor.

Figure 11:
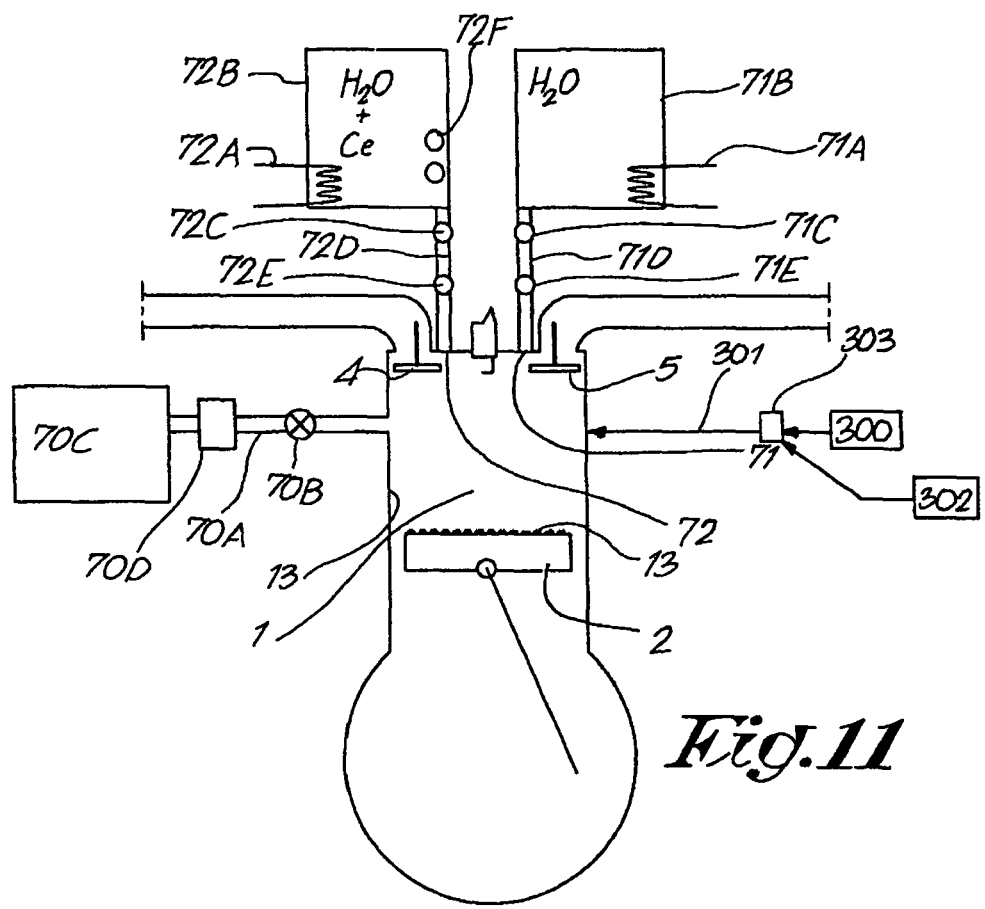
FIG. 11 is a schematic view of still a further embodiment.

In the embodiment of FIG. 11, the burning chamber 1 is provided as in the embodiment of FIG. 1 with a coating 13 comprising lanthanides, cerium, praseodymium and neodymium, and preferably europium and ytterbium. Such a coating was also present on the surface of the piston 2. The catalyst comprises also some carbon nanoparticles and a hydrocarbon phase. The amount of catalyst, especially the sum (amount of deposit contacting the support+amount of carbon nanoparticles+amount of carbon containing structure of the catalyst system) after removal from the catalyst system of condensed liquid hydrocarbons at a temperature of 300° C. at about atmospheric pressure is about 0.75 g per 100 cm$^3$ of the burning chamber 1 with the piston in its position corresponding to the maximum volume of the chamber 1.

The burning chamber 1 is provided with injection means 70, 71,72 for injecting in the burning chamber fuel or petrol, water and, when regeneration is required, water containing cerium and/or europium and/or ytterbium and/or praseodymium and/or neodymium (Nd) and/or lanthanum.

The burning chamber is provided with an inlet opening with a controlled valve 4 and an exhaust opening with a controlled valve 5.

The injection means 70 for injecting (for example by spraying or pulverizing) fuel or petrol in the chamber 1 or for introducing a gaseous fuel in the chamber 1 is connected via a pipe 70A with a controlled valve 70B to a tank or reservoir 70C. A means 70D such as a pump enables to give sufficient pressure to the fuel for its injection in the chamber. The injection of fuel is advantageously controlled, so that some fresh fuel is injected possibly in one or more distinct steps, during the admission and/or during the compression and/or during the burning phase (for the compression ignition), and so that no fuel is injected during the overlap time of the opening phase of the inlet valve and the opening phase of the outlet valve.

It has been observed that the cool burning during the compression phase was suitable to enable to achieve the results achieved with multiple injection phases during the burning phase, but with a better power output and still less harmless compounds.

The injection means 71 is intended for injecting water or water vapor (preferably hot water, such water with a temperature of 30-90° C., especially water with a temperature of about 40 to 75° C.) in the burning chamber during an air intake.

The water is heated by a heating means 71A (electrical heating means, heater using the heat of the motor cooling agent, heater using the heat of the flue gases, etc) in a tank or reservoir 71B. The hot water is pumped by the controlled pump 71C for flowing in the pipe 71D provided with a controlled valve 71E.

The injection means 72 is intended for injecting water or water vapor containing cerium and/or europium and/or ytterbium and/or praseodymium (preferably hot water, such water with a temperature of 30° C. to 90° C., especially water with a temperature of about 40° C. to 75° C.) in the combustion chamber during an air intake.

The water is heated by a heating means 72A (electrical heater, heater using the heat of the motor cooling agent, heater using the heat of the flue gases, etc.) in a tank or reservoir 72B containing particles, beads, pieces, comprising cerium and/or europium 72F. The hot water is pumped by the controlled pump 72C for flowing in the pipe 72D provided with a controlled valve 72E.

The injection of water vapor or hot water (free of cerium/europium/ytterbium/praseodymium and/or neodymium (Nd)) via the pipe 71, as well as the injection of water vapor or hot water containing cerium/europium/ytterbium/praseodymium and/or lanthanum can be controlled, so that the requested amount of cerium/europium ytterbium/praseodymium and/or neodymium (Nd) and/or lanthanum, as well the necessary water amount is present in the burning chamber for enabling a correct regeneration of the catalyst in the burning chamber, or for regenerating the filter, the trap system and/or the converter. For example, when the catalyst coating has not to be regenerated, only water or water vapor and fuel are injected in the combustion chamber.

For avoiding possible freezing problems of the water, one or more additives can be added in the reservoir 72B and 71B, such as alcohol (alcohol means in the present specification compounds with a monoalcohol function, with two or more alcohol functions, such as diols, polyalcohols, etc.) such as ethanol and/or methanol, glycol, ethylene glycol, diethylene glycol, propylene glycol, organic acid, etc. and mixtures thereof. The use of alcohol, such as ethanol, is quite interesting as it enables to use the alcohol as useful fuel source. The content of additive in the water is for example comprised between 2 and 50%, or even more, but is advantageously comprised between 5 and 20% by weight (for example an aqueous medium containing 8 to 15% volume ethanol).

The embodiment of FIG. 11 has been repeated except that the reservoir 72B and/or 71A contains further some activated carbon nanoparticles, with possibly a suspension agent. For enabling a correct suspension of the nanoparticles, some additive can be added such as glycols, polyethyleneglycols, etc.

In still another embodiment, the container 72B did not contain cerium compound but only active carbon nanoparticles, such as hollow carbon nanoparticles, said particles having a BET surface area of more than 100 m$^2$/g, such as between 150 and 500 m$^2$/g.

In still a further embodiment, the combustion chamber is connected to a reservoir 300 containing dry activated carbon nanoparticles, such as hollow particles considered as being electrically conductive, said reservoir being connected to the combustion chamber by a pipe 301. For conducting particles in the combustion chamber, air is flowing in the pipe 301 from an air source 302 so as to suck particles via a venturi 303. The admission of active carbon nanoparticles can also be operated by adding the nanoparticle in the inlet pipe or inlet manifold.

Figure 12:
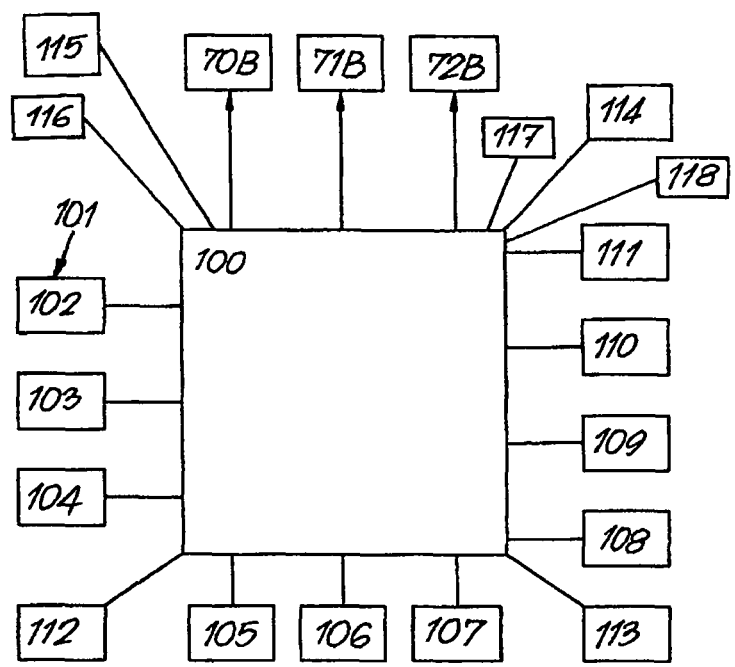
FIG. 12 is a schematic view of a possible control unit.

FIG. 12 is a schematic view of a central unit for controlling the combustion, as well as the regeneration/rejuvenation operation.

Said central unit 100 receives from various sensors 101 (possibly via other central unit) information about various parameters, such as:

temperature of the hot water 102 (in the tank 71B and the reservoir 72B); for example as long as the temperature has not reached a minimal temperature, the unit controls the working so that no water injection is made in the burning chamber or so that water vapor is injected after the closing of the exhaust valve (for example in case the catalyst of the burning chamber has to be regenerated) or so that water vapor is injected in the inlet pipe or in the burning chamber during the overlap period of opening of the inlet valve and the opening of the exhaust valve (for example when the filter or trap or converter has to be regenerated);

temperature of the cooling agent of the motor 103; for example, as long as the temperature of the cooling agent is lower than a minimum temperature (for example 75° C.), the central unit prevent the injection of water and of a minimum amount of cerium/europium/ytterbium/praseodymium/lanthanum for regeneration purposes;

fuel consumption 104; for example in case the fuel consumption is reduced to less than a predetermined value, no cerium/europium/ytterbium/praseodymium/lanthanum is injected in the burning chamber for regeneration purposes and/or in case the fuel consumption is higher than a predetermined value, at least a minimal amount of cerium/europium preferably with water or water vapor is injected in the burning chamber for regenerating the catalyst of the burning chamber;

speed variation or acceleration or gear change or variation of the rotation speed 105, for example, as soon as a variation of more than a predetermined value is determined within a time period, at least a minimum amount of cerium/europium is injected in the burning chamber;

deceleration or motor brake 106; for example when a deceleration or motor brake is determined, water or water vapor with a minimum amount of cerium/europium is injected in the burning chamber so as to provide a minimum regeneration of the catalyst coating, prior to the following acceleration;

speed 107, for example the regeneration of the catalyst is carried out when the speed is lower than a minimum value, preferably comprised between a minimum speed and a maximum speed, water or water vapor and at least a minimum amount of cerium/europium are injected is the burning chamber;

fuel characteristics 108;

NOx content in the flue gases (109); for example As long as the NO$_x$ mobile average content on a period of 15 minutes is lower than a predetermined threshold value (M, for example corresponding to 1.3× the requested average RA), no regeneration of the catalyst coating is operated by admission of cerium and/or europium compound in the burning chamber. When the NO$_x$ mobile average content on a period of 15 minutes is higher than the predetermined threshold value (M, for example corresponding to 1.3× the requested average RA), regeneration of the catalyst coating is operated by admission of cerium and/or europium compound and water/water vapor in the burning chamber. Said regeneration is for example carried out up to reaching a minimum threshold value (m, for example a value corresponding to about 0.7× the requested average RA) (see FIG. 3).

Brake 110; for example as soon as a braking is carried out, more water or water vapor is injected in the burning chamber Air flow 111, Water content 112 of the reservoir used for feeding the cerium/europium/ytterbium/praseodymium/neodymium/lanthanum in the burning chamber Water content 113 of the water free of additive to be directly injected in the burning chamber Status of the filter and/or soot trap system 114 (drop of pressure between inlet and outlet; soot content in the flue gases) For example, as soon as the drop of pressure in the filter and/or trap system is higher than a specific value (Msoot), cerium and water are injected in the burning chamber (for example during the overlap period of the opening of the inlet valve and of the outlet valve) for regenerating the filter and/or trap or for preparing the regeneration thereof in a further step. The regeneration is carried out during a time sufficient for achieving a soot content lower than a predetermined value msoot.

CO content in the flue gases (115); for example As long as the CO mobile average content on a period of 15 minutes is lower than a predetermined threshold value (MCO, for example corresponding to 1.3× the requested average RCO), no regeneration of the catalyst coating is operated by admission of cerium and/or europium compound in the burning chamber. When the CO mobile average content on a period of 15 minutes is higher than the predetermined threshold value (MCO, for example corresponding to 1.3× the requested average RCO), regeneration of the catalyst coating is operated by admission of cerium and/or europium compound and water/water vapor in the burning chamber. Said regeneration is for example carried out up to reaching a minimum threshold value (mco, for example a value corresponding to about 0.7× the requested average RCO) (see FIG. 3).

HC content in the flue gases (116); for example As long as the HC mobile average content on a period of 15 minutes is lower than a predetermined threshold value (MHC, for example corresponding to 1.3× the requested average RHC), no regeneration of the catalyst coating is operated by admission of cerium and/or europium compound in the burning chamber. When the $HC_x$ mobile average content on a period of 15 minutes is higher than the predetermined threshold value (MHC, for example corresponding to 1.3× the requested average RHC), regeneration of the catalyst coating is operated by admission of cerium and/or europium compound and water/water vapor in the burning chamber. Said regeneration is for example carried out up to reaching a minimum threshold value (mhc, for example a value corresponding to about 0.7× the requested average RHC)

Particulate Material (PM) content in the flue gases (117); for example As long as the PM mobile average content on a period of 15 minutes is lower than a predetermined threshold value (Mpm, for example corresponding to 1.3× the requested average Rpm), no regeneration of the catalyst coating is operated by admission of cerium and/or europium compound in the burning chamber. When the PM mobile average content on a period of 15 minutes is higher than the predetermined threshold value (Mpm, for example corresponding to 1.3× the requested average Rpm), regeneration of the catalyst coating is operated by admission of cerium and/or europium compound and water/water vapor in the burning chamber. Said regeneration is for example carried out up to reaching a minimum threshold value (mpm, for example a value corresponding to about 0.7× the requested average RA) (see FIG. 3).

Efficiency of the burning (118); for example As long as the mobile average efficiency on a period of 15 minutes is higher than a predetermined threshold value (meff), no regeneration of the catalyst coating is operated by admission of cerium and/or europium compound in the burning chamber. When the mobile average efficiency on a period of 15 minutes is lower than the predetermined threshold value (meff), regeneration of the catalyst coating is operated by admission of cerium and/or europium compound and water/water vapor in the burning chamber. Said regeneration is for example carried out up to reaching a threshold value (Meff, which value is greater than meff) (see FIG. 3).

Etc.

The central unit controls for example the regeneration of the burning catalyst as soon as one parameter (such as CO content, $NO_x$ content, HC content, PM content, efficiency) has a value no more acceptable, or a value no more in an acceptable range. The regeneration is continued as long as all the criteria are within their acceptable range. For example in FIG. 3, a regeneration step is tarted when the HC content in the flue gases was higher than the maximum acceptable value MHC and was ended when the efficiency of the catalyst was above a minimum value Meff.

The central unit controls for example the water (vapor) injection before and/or in and/or after the burning chamber, for example when high rpm or high load is need for further limiting the peak temperature in the burning chamber and/or in the exhaust, such as for further preventing a burning of valves and/or for avoiding a soot burning when not required in the exhaust treatment system. The central unit can thus be programmed so as to avoid the 5% and more limit of CO admitted content in case of today.

The control unit 100 controls for example the valves 70B, 71B and 72B, as well as can emit signal corresponding to an efficient working or to a defect of working. The control unit can also control the admission of active carbon nanoparticles from the reservoir 300, for example by controlling the air flow in the pipe 301.

The control unit can also possibly control direct injection of water vapor and/or air and/or cerium additives in the exhaust, i.e. in combustion flue gases, for example in the exhaust manifold, in the recycling system of flue gases, in the exhaust pipe before and/or after the filter, but before the soot trap system.

The central unit is provided with warning instructions, so that in case after two regeneration steps (during each a time, such as 10 minutes) is not suitable for enabling a correct regeneration of the catalyst, a warning message is emitted so that the driver knows that he has to go to a garage or to specialists for control.

As, the water content in the flue gases is quite high, it is advantageous to provide the exhaust pipe with a system for collecting at least a portion of said water vapor, advantageously for its re-use.

The condensation of water vapor present in the exhaust gases is advantageous,
- as it enables at the same moment the formation of larger particles (i.e. easier to be trapped),
- as it creates a sucking of the gases, i.e. a better removal of the flue gases present in the burning chamber, and
- as it is a source of water, which can be reinjected in the burning chamber or in the inlet manifold, possibly after a filtration step.

Figure 13:
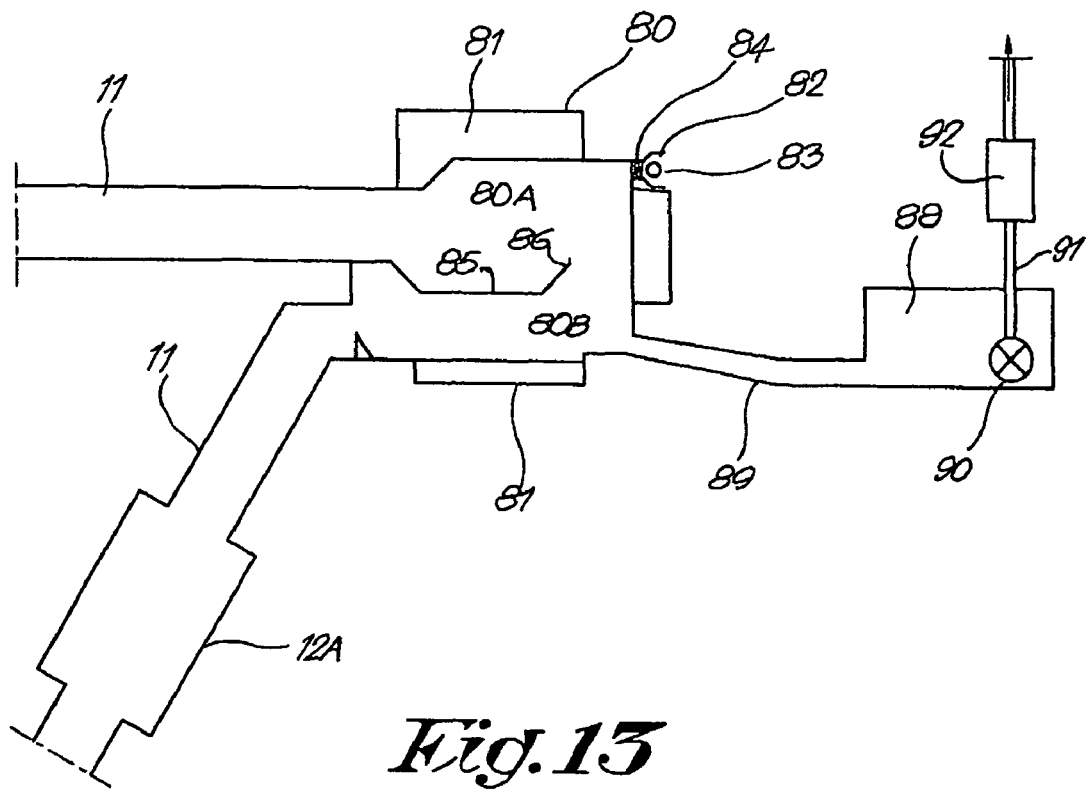
FIG. 13 is a view of a system for condensing water of the flue gases.

The flue gases are conducted via the pipe 11 towards a filtering means 12 A (FIG. 13). Before filtering the flue gases, the flue gases pass through a condensation chamber 80, the outer faces being for example cooled by air, for example by the air flow created by the movement of the car. For increasing the cooling effect, fins 81 can be mounted on said outer faces.

The chamber 80 comprises possibly an opening provided with a controllable closing valve or with a one way valve 82 for enabling the entry of fresh air when the depression created in the chamber 80 is too high (for example sufficient for displacing a closing ball or seal 83 against the action of a spring 84). Such an entry of fresh air is advantageous for reducing the temperature of the flue gases, whereby improving the water condensation and/or a suction of flue gases from the burning chamber enabling a controlled ratio or tuning air inflow/gases outflow.

The chamber has an upper part 80A and a lower part 80B. The chamber 80A is provided with a collector 85 with an edge 86 adapted for enabling the over flow of water towards the chamber 80B, when the collector 85 is full. Said overflow of water forms a kind of water curtain, which is advantageous for trapping solid particles. Said As, the water content in the flue gases is quite high, it is advantageous to provide the exhaust pipe with a system for collecting at least a portion of said water vapor, advantageously for its re-use.

The condensation of water vapor present in the exhaust gases is advantageous,

- as it enables at the same moment the formation of larger particles (i.e. easier to be trapped),
- as it creates a sucking of the gases, i.e. a better removal of the flue gases present in the burning chamber, and
- as it is a source of water, which can be reinjected in the burning chamber or in the inlet manifold, possibly after a filtration step.

The flue gases are conducted via the pipe 11 towards a filtering means 12A (FIG. 13). Before filtering the flue gases, the flue gases pass through a condensation chamber 80, the outer faces being for example cooled by air, for example by the air flow created by the movement of the car. For increasing the cooling effect, fins 81 can be mounted on said outer faces.

The chamber 80 comprises possibly an opening provided with a controllable closing valve or with a one way valve 82 for enabling the entry of fresh air when the depression created in the chamber 80 is too high (for example sufficient for displacing a closing ball or seal 83 against the action of a spring 84). Such an entry of fresh air is advantageous for reducing the temperature of the flue gases, whereby improving the water condensation and/or a suction of flue gases from the burning chamber enabling a controlled ratio or tuning air inflow/gases outflow.

The chamber has an upper part 80A and a lower part 80B. The chamber 80A is provided with a collector 85 with an edge 86 adapted for enabling the over flow of water towards the chamber 80B, when the collector 85 is full. Said overflow of water forms a kind of water curtain, which is advantageous for trapping solid particles. Said water overflow and the water condensed in the part 80B is collected in the collector 87 connected to an intermediate reservoir 88 via a pipe 89, from which water is pumped by the pump 90 towards the reservoir 14 or 72B or 71B via the pipe 91 provided with a filter 92.

Such a condensation step is advantageous, as it enables also the removal of the flue gases of some $CO_x$, $SO_x$, $NO_x$, sulfur containing compounds, Phosphate, combinations thereof, etc. and other compounds which are water soluble or not, such as hydrocarbons.

For filling one of more of said reservoirs (from which water is intended to be injected in the burning chamber or in the inlet manifold), water can also be collected from the air conditioning system of the car or from a window for example during a heavy rain and conducted towards said reservoir(s).

Reference is also made to U.S. Pat. No. 5,494,015 (the content of which is incorporated in the present specification by reference). Said document discloses a hydraulic pneumatic restrictor suitable for the admission of fuel. This system can also be used for the admission of water and/or water containing cerium and/or europium for regeneration purposes.

Hereafter a description is given to various process schemes in which the burning chamber is provided with a catalyst of the invention and in which the flue gases are at least treated in a soot collector.

The following typical process schemes and the corresponding operating conditions are given only as examples. It is obvious that the invention can be used to design other embodiments of the invention, whatever be the type of fuel and whatever be the type of engine (sparkplug, compression, etc.).

Figure 22:
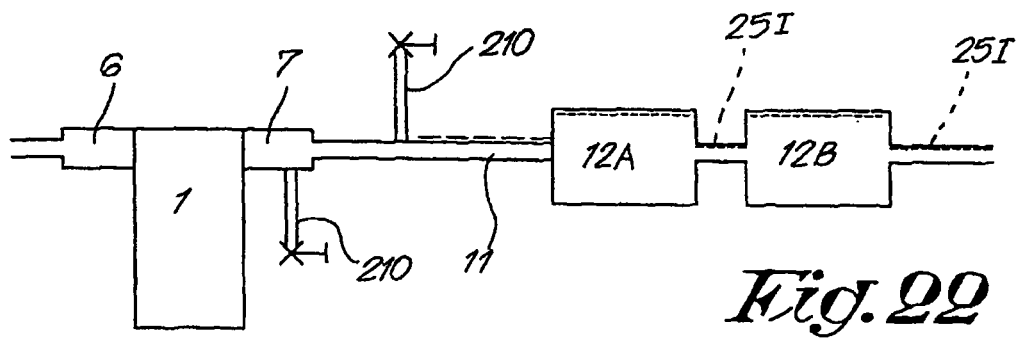
FIG. 22 to 26 re schematic view of processes of the invention.

Process Scheme 1 (FIG. 22)

In this process, the regeneration or rejuvenation of the catalyst of the combustion chamber 1 is carried out so as to not induce the regeneration or rejuvenation of the soot collector 12B and whereby the regeneration or rejuvenation of the soot collector 12B is carried out intermittently when required. For example the cerium concentration in the flue gases is low enough during the regeneration of the catalyst of the burning chamber, that said cerium concentration is not sufficient for reducing the ignition temperature of the soot present in the soot collector below the temperature of the flue gases in contact with the soot, and/or the treatment of the catalyst of the burning chamber is carried during a period sufficient for regenerating the catalyst of the burning chamber, but said time being not sufficient for conveying a sufficient amount of cerium to the soot collector for reducing the ignition temperature of the soot in contact with the flue gases in the soot collector.

Reference 25I designates in the FIGS. 22 to 26 a cerium/lanthanum/praeseodymium/neodymium/lanthanum containing coating of the invention.

Such a coating in the pipe 11 before the soot collector, preferably before the filter 12A, enables a further catalytic treatment of the flue gases Possibly, in order to avoid a possible ignition of the soot in the soot collector during the regeneration of the catalyst present in the burning chamber, it is possible to add air and/or water vapor (inlet 210) to the flue gases exhausting the burning chamber before their passage into the soot collector (for example in the pipe 11 and/or in the exhaust manifold 7), so as to reduce the temperature of the exhaust gases.

The regeneration of the soot collector is advantageously carried out just after a regeneration or rejuvenation step of the catalyst of the burning chamber, for example less than 10 minutes after the regeneration step of the catalyst (advantageously less than 5 minutes, preferably less than 3 minutes).

Figure 23:
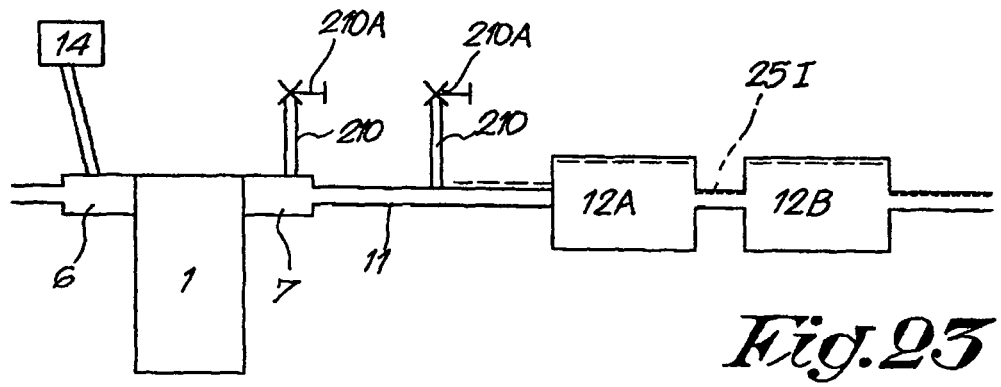

Process Scheme 2 (FIG. 23)

Water vapor with a minimum amount of cerium is admitted (for example by means of a device 14) in the inlet manifold (6) of the burning chamber (1), so as to ensure an intermittent regeneration of the catalyst present in the burning chamber. For example, the cerium added in the inlet manifold 6 (rate of admission controlled for example by the control unit of FIG. 12) is such that the flue gases comprise less than 2 ppm cerium, advantageously less than 1 ppm, such as 500 ppb, 200 ppb, 100 ppb or even lesser, for the regeneration.

When the regeneration or rejuvenation of the soot trap system is required, a further amount of cerium (increased rate of cerium admission) is admitted in the inlet manifold (6), so as to increase the cerium concentration in the flue gases to more than 2 ppm, advantageously more than 5 ppm, preferably more than 10 ppm, such as between 10 and 20 ppm. Said further amount of cerium (increased cerium admission rate) is added during a period sufficient for reducing the soot ignition temperature below the temperature of the flue gases temperature and for inducing the ignition of the soot in the soot collector.

Advantageously said higher amount of cerium is admitted in the burning chamber when the inlet valve and the exhaust valve are in open position so as to enable a direct air flow through the burning chamber from the inlet towards the exhaust.

As soon as the soot is ignited, only water vapor with a minimum amount of cerium is possibly admitted continuously in the inlet manifold (for example during the overlap period of the opening of the inlet and exhaust valves of a burning chamber), so as to ensure a sufficient regeneration of the filter or trap or converter. For example, the cerium added in the inlet manifold after soot ignition is such that the flue gases comprise less than 2 ppm cerium, advantageously less than 1 ppm, such as 500 ppb, 200 ppb, 100 ppb or even lesser.

Possibly during the higher rate of admission of cerium in the inlet manifold, water vapor and/or air is admitted in the pipe 11 or outlet manifold 7 via the pipe 210 with valve 210A, so as to lower the temperature of the flue gases. When a sufficient amount of cerium is admitted in the soot collector (for example after an admission at a higher rate for a period of 30 seconds up to 10 minutes, advantageously less than 5 minutes, preferably less than 3 minutes) the admission of water vapor and air via the pipe 210 is controlled (for example stopped possibly only briefly) so that the flue gases contacting the soot collector have a temperature sufficient for igniting the soot and have a temperature sufficient so that the combustion of the soot can be continued for a proper regeneration.

Figure 24:
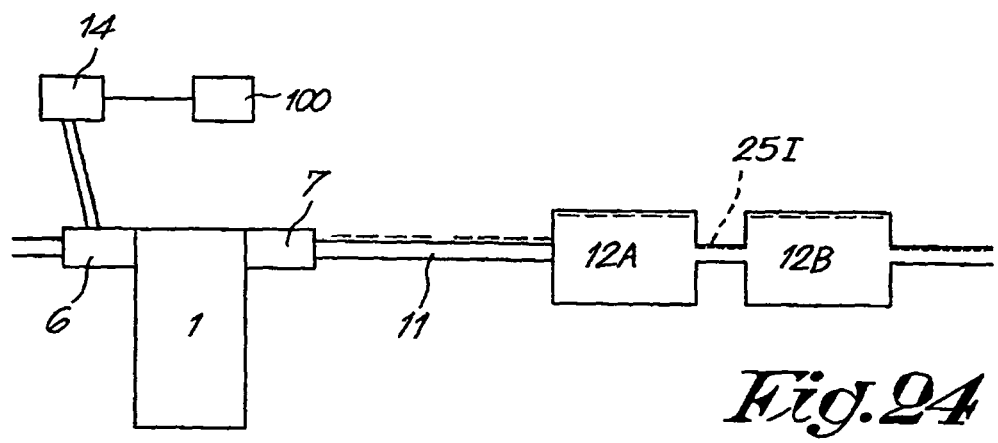

Process Scheme 3 (FIG. 24)

In this process, the admission of water vapor and cerium in the inlet manifold (6) (device 14 controlled with the central computing system 100) is controlled according to various parameters, among which the temperature of the motor.

As long as the motor has not reached a minimum temperature or that the cooling medium has not reached a minimum temperature, no cerium is admitted in the inlet manifold for regeneration purposes.

As soon as the temperature is high enough, a low admission rate of cerium is ensured when the regeneration of the catalyst of the burning chamber is required, while said admission rate is increased during a short period when the soot collector has to be regenerated.

According to an advantageous embodiment, the regeneration of the soot collector is furthermore carried out when the car is moving at a speed of at least 70 km/h, preferably at least 80 km/h. Such a speed seems to be adequate for ensuring a good dispersion of the exhaust gases during the regeneration step.

Figure 25:
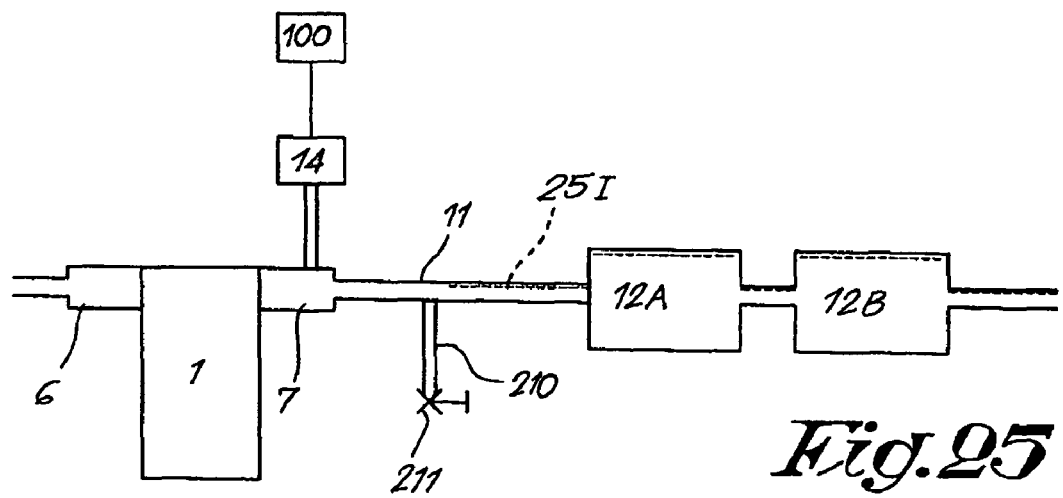

Process Scheme 4 (FIG. 25)

In this process, the burning chamber is not submitted to a treatment with cerium and/or water vapor, so as to control the fuel combustion.

The soot collector 12B is regenerated intermittently by admitting in the exhaust manifold 7 cerium and water vapor at a controlled rate (for example by a system like the system 14, said system being controlled by the central unit 100), so that the flue combustion gases are enriched with water vapor and with cerium. The water concentration of the flue gases is advantageously increased of at least 3% by volume (such as at least 5%, for example from 5% by volume up to 10% by volume). The cerium concentration in the flue gases is controlled so as to have a cerium content in the flue gases of 5 to 20 ppm. Advantageously the intermittent injection or admission of cerium and water in the pipe 11 is carried out during the overlap time of the opening of the inlet and exhaust valves of one burning chamber.

The cerium admission is carried out during a time (in one operation or in successive operations) sufficient for lowering the soot ignition temperature of at least 100° C., such as from 100° C. to 250° C.

When a sufficient lowering of the soot ignition temperature is reached and/or when the soot is self ignited, the cerium admission is stopped. The water vapor admission is advantageously continued so as to control the temperature of the soot combustion. The invention relates thus also to a burning process with soot trapping, in which the burning step of the soot is controlled or prevented by admission of water or water vapor before/in/after the burning chamber, and/or in which the maximum peak temperature is lowered or maintained below a predetermined value, by admitting water and/or water vapor before and/or in the burning chamber.

Advantageously, the regeneration is carried out after admission of a sufficient amount of cerium in the soot collector (for example after an admission at a higher rate for a period of 30 seconds up to 10 minutes, advantageously less than 5 minutes, preferably less than 3 minutes). In order to prevent a possible regeneration during the cerium admission, the admission of water vapor and air via the pipe 210 is controlled so as to maintain the temperature of the flue gases below the ignition temperature of the soot. As soon as a sufficient amount of cerium is present in the soot collector, the admission of cerium is stopped, while the admission of water vapor and/or air is controlled (for example stopped possibly only briefly) so that the flue gases contacting the soot collector have a temperature sufficient for igniting the soot and have a temperature sufficient so that the combustion of the soot can be continued for a proper regeneration.

Figure 26:
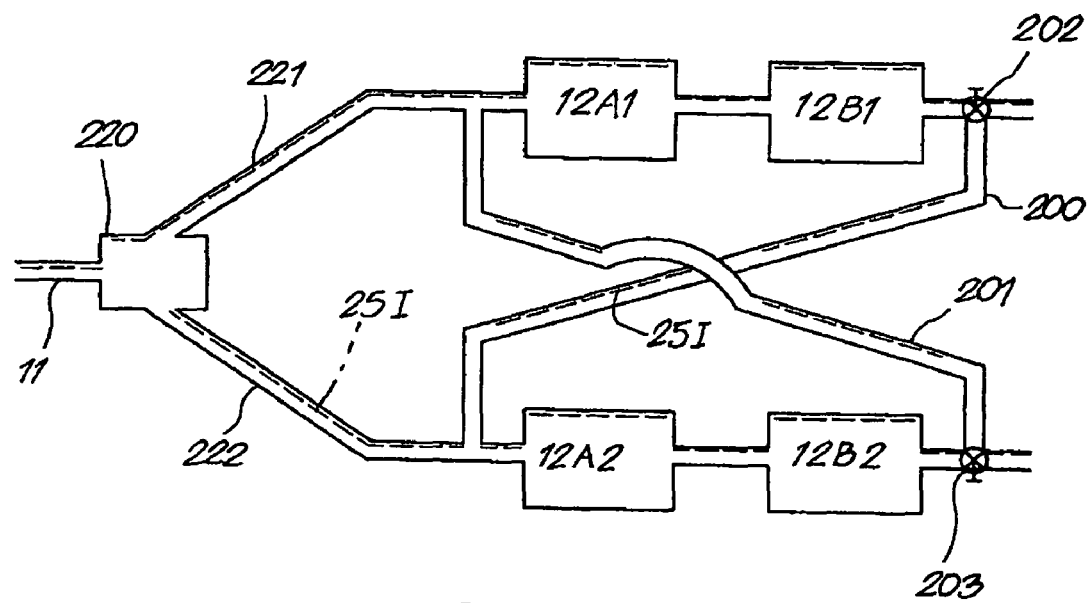

Process Scheme 5 (FIG. 26 Showing Only the Exhaust Treatment System)

The processes 1 to 4 has been repeated, except that the burning chamber 1 is associated to two soot collectors 12B1, 12B2 and two filters 12A1,12A2, said collectors being adapted for receiving flue combustion gases (from pipe 11, via a controllable distributor 220 and pipes 221,222; the distributor 220 controlling the rate of flue gases exhausted towards the filter 12A1 and towards the filter 12A2) and being provided with pipes 200,201 and valves 202,203, so as to connect the exhaust of one soot collector 12B1 to the inlet of the other soot collector 12B2 (possibly of the filter 12A2 of said other soot collector), and vice versa. For directing at least partly the flue gases of the soot collector 12B1 towards the inlet of the soot collector 12B2, the valve 202 is closed (at least partly, preferably substantially completely).

This embodiment is advantageous, so as to filter and collecting possible soot particles escaping during the regeneration of one soot collector. Furthermore, it enables a better use of the cerium added.

When the soot collector 12B1 is regenerated, the other soot collector 12B2 is not regenerated. Possibly, water vapor and/or air is admitted in the flue combustion gases (for example issuing from the soot combustion) so as to lower the flue gases temperature below the temperature of soot ignition in the soot collector 12B2.

The processes disclosed in FIGS. 22 to 26 can also be operated with compound containing europium, ytterbium, praseodymium instead of cerium and/or in admixture with cerium.

It has also been observed that a preheating of the coating catalyst in the burning chamber was beneficial, as it achieved low HC, NOx, PM, PAH, $H_2$ and CO content in the flue gases in less than 30 seconds, advantageously less than 15 seconds. When the ignited motor has an average low temperature of less than 200° C., some time (such as for example less than about 1 minute can be required for achieving a steady reduction state for harmful product. Such a preheating step can be operated by heating and circulating the oil and/or by heating and circulating the cooling fluid.

Figure 27:
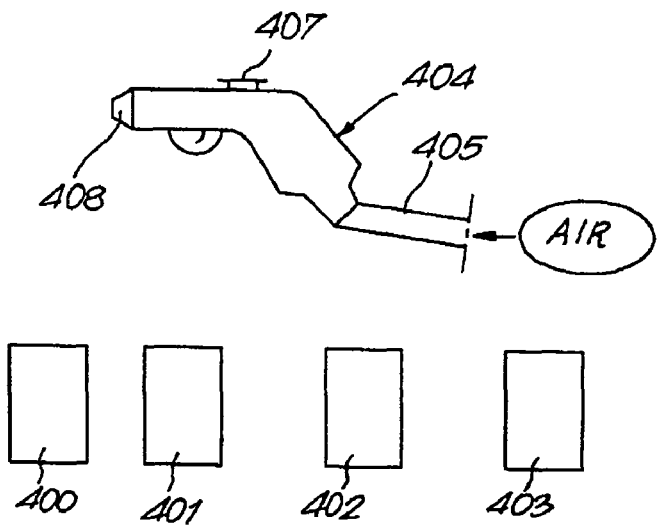
FIG. 27 is a schematic view of a kit for applying a catalyst of the invention in an Internal Combustion engine (ICE).

FIG. 27 is a schematic view of a kit suitable for the coating of a surface of the burning chamber, with precursors suitable for forming a catalyst system of the invention.

Said kit comprises a first vial 400 containing a decoking agent or solution;

a second vial 401 containing an adhesive agent or solution, such as a liquid wax or a liquid agent suitable to be vaporized at temperature below 250° C., in particular jojoba oil or wax possibly in mixture with one or more diluting agents and with one or more active agents;

a third vial 402 containing dry cerium/lanthanum/praseodynium/neodymium/lanthanum containing particles, in the form of flakes with a size of less than 10 µm, such as a size of less than 5 µm (advantageously said vial does not contain particles with a size greater than 3 µm, for example by using an appropriate filtering system, said particles having the form of monolamellar or bi lamellar structure);

a fourth vial 403 containing dry active carbon nanoparticles with a size of less than 100 nm, possibly said nanoparticles forming agglomerates with a size of less than 1 µm.

The vial are for example adapted for being mounted on an air spray-gun 404 provided with an air inlet 405 associated to a compressed air source or supply, 406, such as dry air at a pressure of 3 to 20 $10^5$ Pa. The air gun is also provided with a connecting means 407 adapted for an easy connection of the vials 400,401,402,403, as well as a spraying head 408, which can be adjusted between a narrow spraying and a large or broad spraying. For combustion motor, it could be advantageous to modify the spraying from a narrow spraying up to a large spraying and vice-versa.

The air gun will thus used for spraying successively the following solutions:

solution for the decoking of the combustion chamber, such a spraying being carried out if required. If such a spraying is carried out, it can be advantageous to blow the coke particles out of the chamber by blowing air (with the air gun) in the burning chamber. It is also possible to suck the coke particle out of the combustion chamber. When the combustion chamber is considered as enough clean, the further solution are applied.

Adhesive solution. This solution is applied so as to an adhesive coating on the inner wall of the combustion chamber, advantageously an intermittent adhesive coating, such as a coating which remains adhesive during 1 and 10 minutes, such as an adhesive (liquid) which can be evaporated or at least partly evaporated.

Dry cerium containing particles are conducted with an air flow on the adhesive layer present on the inner wall.

Dry active carbon particles (nanoparticles or agglomerates of nanoparticles) are conducted with an air flow on the adhesive layer already provided with cerium containing particles.

The so treated burning chamber is then provided with precursors for the preparation of a catalyst system of the invention. The so treated combustion chamber is then heat treated, for example at a temperature higher than 300° C., preferably under a high pressure. Possible treatment can be carried out at temperature from 500 up to 1200° C. The heat treatment can possibly be achieved when starting the working of the car motor.

The third vial can also comprise precursor for the formation of cerium deposit, such precursor are cerium acetate, cerium oxalate, cerium nitrate and mixtures thereof, as well as others salts of other rare earth.

According to another possible embodiment, the dry cerium containing particles are co-sprayed with the adhesive solution. This could also be done for the dry active carbon nanoparticles or agglomerates.

According to still a further embodiment, the dry cerium containing particles, the dry active carbon particles and the adhesive solution are co-sprayed in one operation, for example in a burning chamber just after its production.

According to a further embodiment, the kit comprises a further vial or system for applying an aluminum containing coating, for example after the decoking step if such a step is required, but prior to the step of providing cerium deposits on said aluminum layer. The aluminum coating can be applied by thermally spray coating, such as disclosed in US20030152698.

According to a further embodiment, the aluminum chamber is provided with an iron cast inner sleeve. Such a sleeve is advantageously made of iron cast with an aluminum content of 5 to 15% by weight. Thereafter the sleeve is provided with a catalyst coating, for example by using the vials 401, 402 and 403. It is then not necessary to decoke the sleeve, as the catalyst is applied on freshly made sleeve.

A possible substantially continuous method of treatment of motor newly made is disclosed here below. The motors are displaced continuously from one treatment station towards another treatment station, such as by means of a moving turn mechanism or table.

In a first step, the cylinders of the motor are provided with an iron cast sleeve containing 5 to 15% by weight aluminum. Said step is advantageously carried out after a washing or cleaning step.

In a second step the piston, cylinder heads and valves are placed on the block.

In a third step advantageously through the us of automate robotized head, pressurized gas (air) is introduced in all the combustion chamber, with the piston in their position corresponding to the maximum volume, so as to preclean the chambers.

In a fourth step, an adhesive layer (wax, liquid adhesive, etc.) is air sprayed so as to form a thin coating on the wall of the chambers and of the pistons.

In a fifth step, dry cerium powder with a size of less than 10 µm and with some La (about 5-10%) is pulverized with air on the surface of the chambers, whereby said powder adheres on the wall by means of the adhesive coating.

In a fifth step nanoparticles of active carbon (such as carbon black, etc.) are sprayed on the surface, so as to provided a coating made of cerium/lanthanum particles and nanoparticles of active carbon.

In a sixth step hot air is insufflated in the chambers, so as to dry the adhesive coating.

The motor is then further provided with sparkplugs, and the motor is run so as applied on the coating a high temperature and a high pressure. For example the motor is driven for 5 to 20 minutes, such as 10 minutes.

According to a possible way for providing surface of the burning chamber (such as the piston head) with a coating, the motor without sparkplugs is driven so as to ensure a movement of the piston. In a processing step, injection heads, possibly connected therebetween are mounted on the openings for the sparkplugs. The injection head system is suitable for injecting successively compressed air (for having a blowing effect in each cylinder), for spraying a binder or binding agent (for example heated jojoba oil or wax at a temperature between 50 and 150° C., said spaying being carried out with a gas, such as air, especially heated air, for example with a temperature of 30 to 100° C.), catalyst particles (simultaneously or successively or intermittently) such as cerium particles, lanthanum particles, praesodynium particles, neodymium particles and carbon nanoparticles.

After said coating, the motor is mechanically driven (for varying the position of the piston in the chamber) advantageously by a control system.

The air used for the coating or spraying operation can be humid air. Other gaseous medium suitable for the spraying operation are vapors, such as water vapors, overheated vapors, etc.

The cerium, lanthanide, etc. compound is advantageously in its hydroxide form Possibly a control of the coating is carried out. Such a control is for example operated by analysing gases flowing outside of the cylinder during the coating operation, but can also be done with a reference surface which is cocoated during a coating operation. In case said reference surface is not correctly coated or not coated according to a standard, the coating operation will be continued. The control of the coating operation can also be done by micro camera(s) or micro sensors providing several images. The images taken by the camera(s) can be compared with one or more pictures of a correct coating or a control picture or image.

The injector or sprayer which are advantageously completely automated has advantageously a moving head, such as a head in rotation and/or with a up and down movement.

The injection of compound in a cylinder is advantageously controlled in function of the position of the piston in the cylinder. For example the injection is carried out during a movement of the piston in a cylinder towards its bottom dead point or is carried out when the piston is near its top dead center.

After said coating done, the sparkplugs are mounted and thereafter the motor is driven first mechanically and then by supplying the motor fuel, advantageously deoxygenated fuel, so as to start the burning process in the cylinders.

Instead of admitting the compound through the opening of the spark plug, the compounds necessary for coating at least partly the burning chamber with a precursor coating, said compounds can be admitted into the burning chamber through the opening of the injector(s) or through the injector(s).

Figure 28:
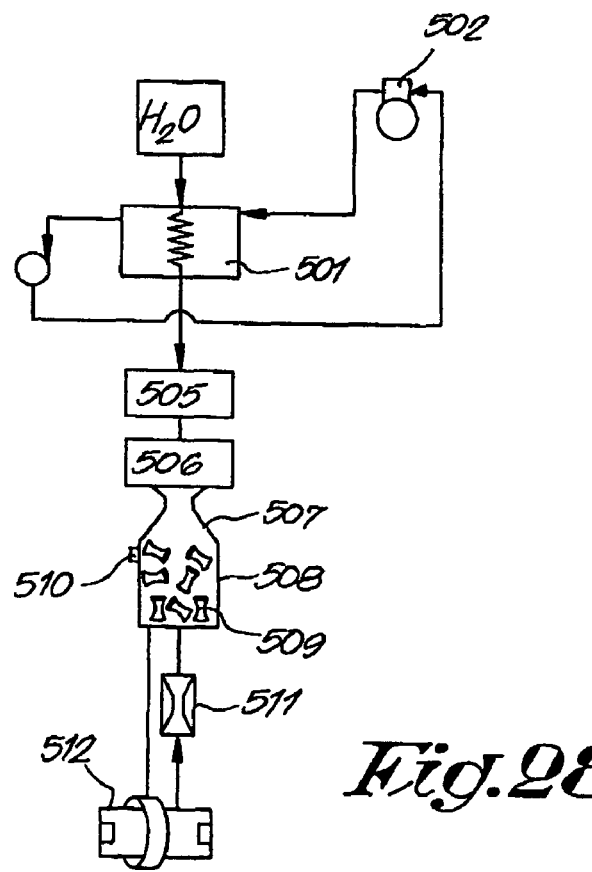
FIG. 28 is a schematic view of an embodiment of a device suitable for regenerating the catalyst or catalytic coating.

FIG. 28 is a schematic view of an embodiment suitable for the regeneration of a catalyst coating provided on surface of the burning chambers.

In this embodiment water of a reservoir 500 flows in a heat exchanger 501. By means of said heat exchanger 501, said water is heated by means of the calories of the heated cooling fluid of the motor 502. Said heated cooling fluid, after flowing in the heat exchanger, flows in a radiator 503 before flowing back possibly with a pump 504 to the motor 502. Possibly the heat exchanger 501 can be a portion of the exchanger for cooling directly the motor.

The heated water flowing out of the heat exchanger 501 has a temperature higher than 50° C., such as more than 75° C. The water is then pumped by the pump 505 and is sprayed on a heated element 506 so as to convert said heated water in water vapor. The so formed water vapor flows then through a valve system, a venturi or a control system (temperature, pressure, flow rate) 507 in a chambre 508 comprising metallic elements 509 (such as wires, rigs, helicoidal members, etc.).

The so formed vapor is then admitted in the air intake when required for example by means of an air restricted injection means 511. The chamber can be provided with an air valve 510 enabling only the air entry in the chamber 508. Such an entry is suitable when the admission of the vapor is made in the air intake or air line by suction.

The vapor comprising hydroxides of cerium, etc. can also directly be injected in the burning chamber. For example, the fuel injection line 512 can be used for injecting in one step the vapor with cerium hydroxide and in another step the fuel with or without additives.

Figure 29:
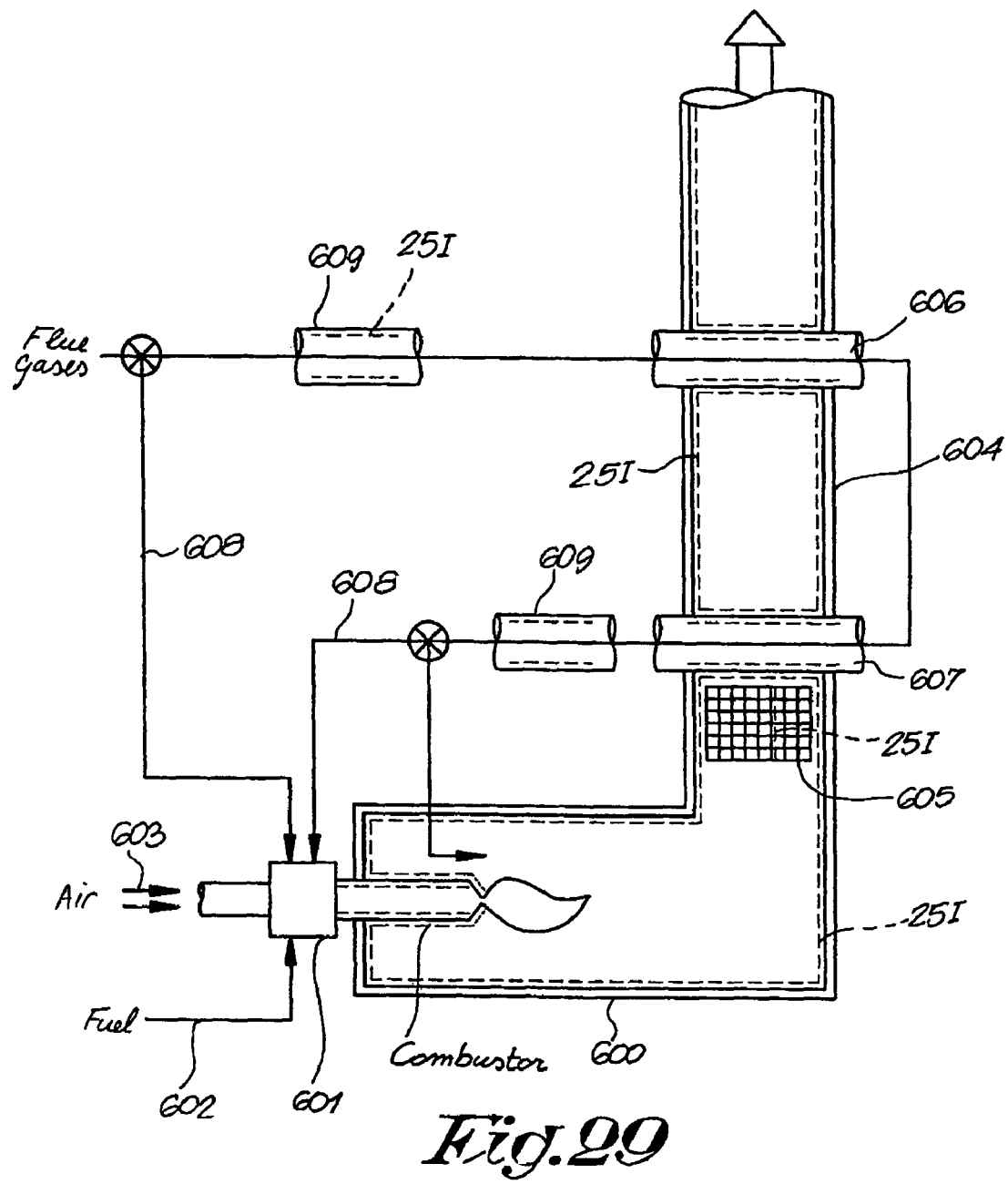
FIG. 29 is a schematic view of a modified burning system for flue gases.

The catalyst of the invention can also be used in after burning system, such as after burning system suitable for the treatment of flue gases as shown in FIG. 29. The burning chamber 600 is precoated with a catalyst coating of the invention. The combustor of the burning system 601, the heat exchanger 606,607, the exhaust channel 604, the flue gases piping 609 are coated with a catalyst of the invention.

The usual Pt,Pd catalyst system in the catalytic chamber 605 can be coated with or replaced partly or completely by a catalyst of the invention.

The burning chamber 600 is provided with a burning system 601 connected to a fuel supply 602 and an air and/or oxygen and/or comburant supply 603 and/o partial addition of flue gases 608. The combustion gases of the burning chamber flow in an exhaust channel 604 comprising a filter 605 and two heat exchangers 606, 607.

The flue gases to be treated (for example issuing from a incinerator, such as a garbage incineration unit) are flowing through the heat exchangers 606,607 whereby the temperature of said gases is comprised between 200 and 600° C., such as about 350° C.-450° C. The heated flue gases are then entering in the burning chamber 600 adjacent to the burner 601. The flue gases are then submitted to an after burning.

The catalyst system of the invention comprises preferably a wear and tear resistance at high temperature, such a support is for example a silicon-phosphate support or a support comprising silicon-phosphate binder.

For improving the working of said after burner, with or without catalytic coating of the invention, but preferably with a catalyst of the invention, it is possible to use one or more of the following means:

use of deoxygenated fuel for the burner, at least partly and/or intermittently for the regeneration of the catalyst of the invention.

Admission of water vapor (after contacting cerium containing support) for regeneration or rejuvenation purposes, in the air intake 603 and/or in the flue gases and/or in the combustion chamber and/or in the filter, said admission being done advantageously intermittently when the efficiency of the catalyst has to be improved.

Figure 31:
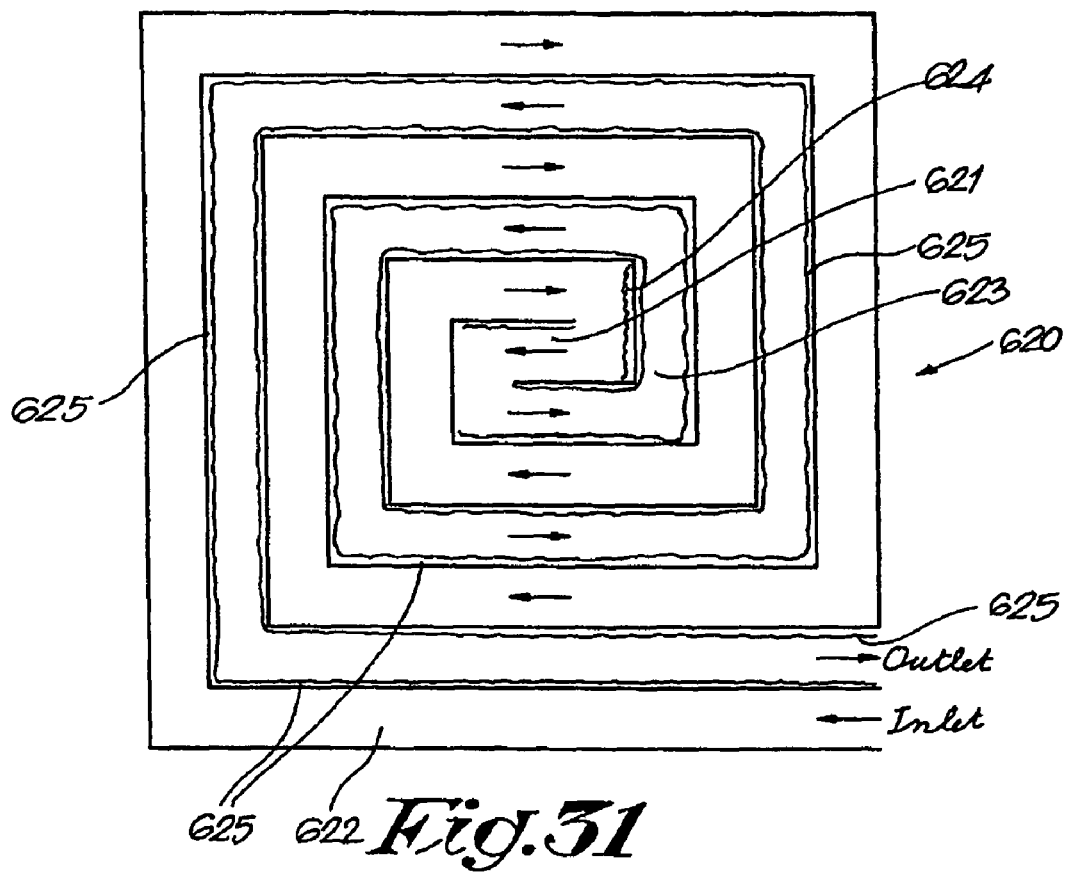
FIG. 31 is a schematic view in cross section of a microscale burner.

FIG. 31 is a schematic view of a microscale heat recirculating burner 620, said burner comprising a burning chamber 621 in which the ignition takes place, an inlet channel 622 for admitting air and fuel to the burning chamber 621, and an outlet channel 623 for exhausting the flue gases.

The inlet and outlet channels form a double spiral, whereby each portion of the exhaust channel is located between two portions of the inlet channel. This enables a good cooling effect for the exhaust channel as well as a good heating of the fuel and air admitted to the central burning chamber.

The total volume of the inlet channel, outlet channel and central burning chamber is advantageously less than 10 cm$^3$, preferably less than 5 cm$^3$, most preferably less than 100 mm$^3$, such as less than 10 mm$^3$.

The inner surface of the central chamber 621 is provided with a catalyst coating 624 of the invention (with a Carbon/cerium atom ratio comprised between 4 and 8), the inner face of the exhaust channel 623 is provided at least partly with a catalyst coating 625 of the invention (with a Carbon/Cerium atom ratio comprised between 1 and 3). The catalyst of the invention was found (through modeling) suitable for achieving a correct burning even if the volume of the central chamber is limited.

Figure 35:
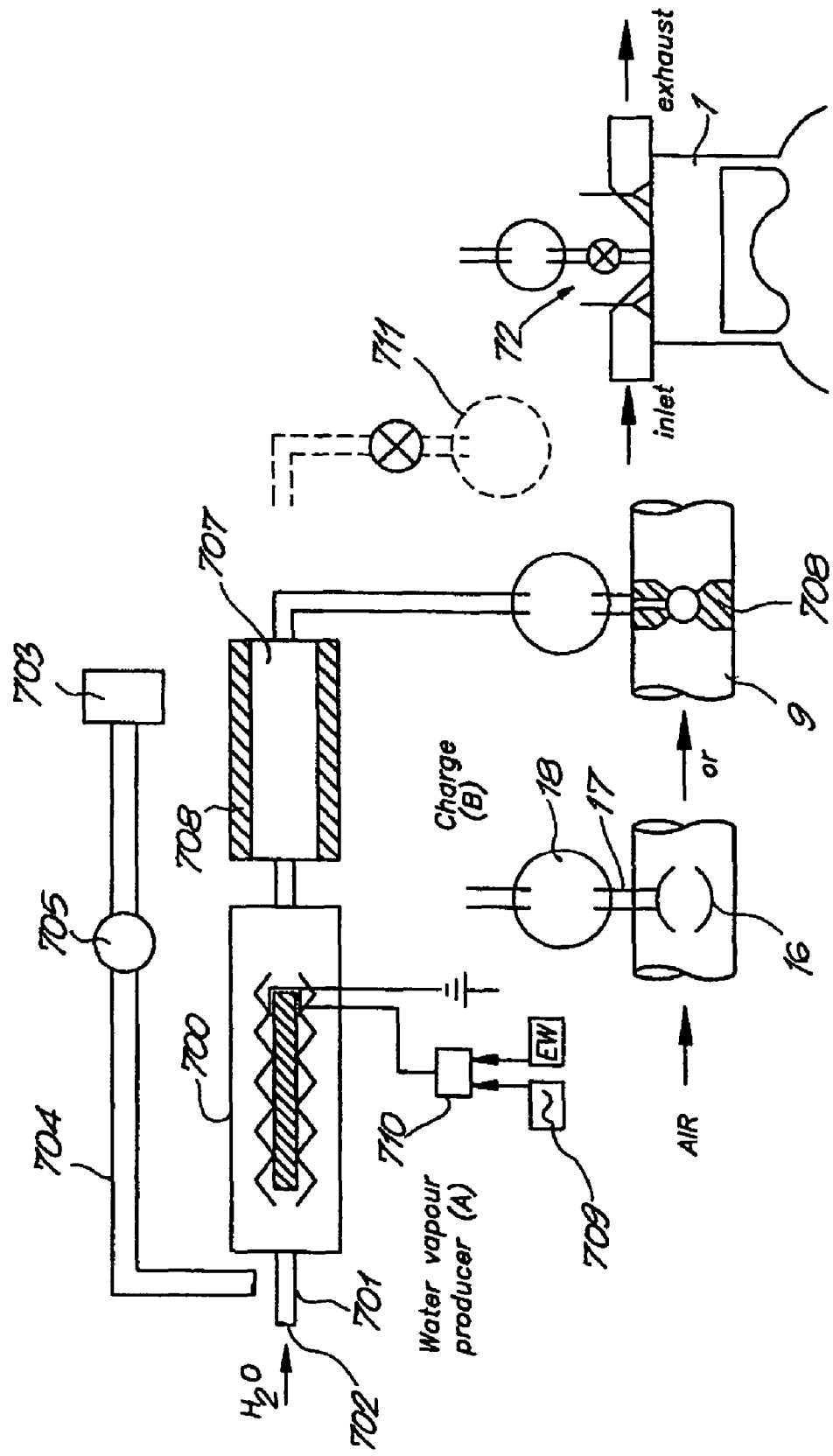
FIG. 35 is a schematic view of a regenerating system of the catalyst present in the burning chamber.

FIG. 35 shows a specific system suitable for regenerating the catalyst system present in a burning chamber or in an exhaust system or in a post treatment system.

The regenerating device comprises an electrically heated micro heat exchanger and evaporator 700 of the type as developed by IMVT (Institüt für Mikroverfahrenstechnik, Karlsruhe, www.fzk.de/imvt/english/micro_el.htm. Such a device when able to produce 5 l water vapor/hour has the size of about 95 mm×30 mm×35 mm. The evaporator comprises diffusion bonded metal foil stack with many grooves, the heating elements being placed between the foils. The device enable that in a small volume, up to 15 kW can be converted. As the amount of water to be injected is far below 5 l/hour, the size of the device can still be reduced. Water is admitted in the evaporator 700 by the pipe 701 and a pump 702. Possibly water can be admitted from the water collector 703 collecting at least partly the water present in the exhaust gases or from the gases submitted to the exhaust gas recirculation. Said water being then pumped (705) so as to admit it in the evaporator 700 through the pipe 704 and 701.

Said water vapor formed very quickly, substantially instantaneously, is then admitted in a chamber 707 containing a catalytic charge, such as a cerium containing charge 708. In the embodiment of FIG. 35, said chamber has the form of a pipe, the inner wall of which are coated with the catalytic charge. According to another embodiment the pipe is made of material consisting of the charge or comprising the charge. The charge is for example a cerium or lanthanides containing material.

The water vapor after contacting the catalytic charge can be admitted:
- directly in the burning chamber 1 through an injection means 72 as disclosed in the embodiment of FIG. 11, and/or
- in the air or air/fuel inlet system, such by means of an air restrictor or venturi 708 placed in the air inlet pipe 9, and/or
- in the inlet manifold, and/or
- in the exhaust system or EGR 711, as suggested in FIGS. 22 and 23.

The evaporator 700 is supplied with current from a power source 709. A control circuit 710 controls the amount of current supplied, and the time of supply, in function of data received from the ECU (Electronic Control Unit).

Water vapor can also if required be directly be injected from the evaporator 700 into the burning chamber 1 through the injection means 71 (as shown in FIG. 11), in the exhaust, such as in the exhaust manifold (as suggested in FIG. 23), in the inlet, such as in the inlet manifold (as suggested in FIG. 24) or in the ovoid 16 as disclosed in FIG. 5.

The heated micro heat exchanger 700 can be used for other purposes. For example after coating one or more face of the burning chamber with a catalyst coating, hot air or CO2 containing gas is admitted in the combustion chamber. By using such a device it is possible to quickly heat air or gas up to 850° C. According to an embodiment, the head (automated and robotized) used for admitting the precursor in the cylinder after the assembly of the motor is provided with such a heating system which enables thus a non engine running at high temperature or a fuel less engine running, which enables a pretreatment of the precursor and/or of the catalytic charge.

According to a specific embodiment, the head admit hot gases, advantageously hot $CO_2$ in the burning chamber when the exhaust valves(s) are in open position.

FIG. 36 shows schematically the difference between a detonation burning and a deflagration burning. The pure detonation burning an uncontrolled thermal process, whereby after the spark ignition SI, the increase of temperature is very rapid up to an average top temperature of 2200° C. or even more. At such a high temperature $N_2$ is converted into $NO_x$. The efficient work is generated for an angle variation of about 10°, period during which C is converted in CO and $CO_2$. Hydrogen H2 is expected to be in equilibrium with H and OH. At the end reaction, said equilibrium is directed to the formation of $H_2$.

The speed generated by the gases in the chamber is huge, about or greater than 1 km/s.

The deflagration principle with the catalyst of the invention is quite different, as after the ignition, the burning is at least partly an autoregulated kinetic process, in which C is converted in $CO_2$, while $H_2$ is converted in OH+H which at the end is converted in $H_2O$. The maximum temperature or average temperature is of less than 1700° C. The speed of the gases is subsonic (such as greater than 10 m/s, but advantageously of less than 100 m/s).

Figure 37:
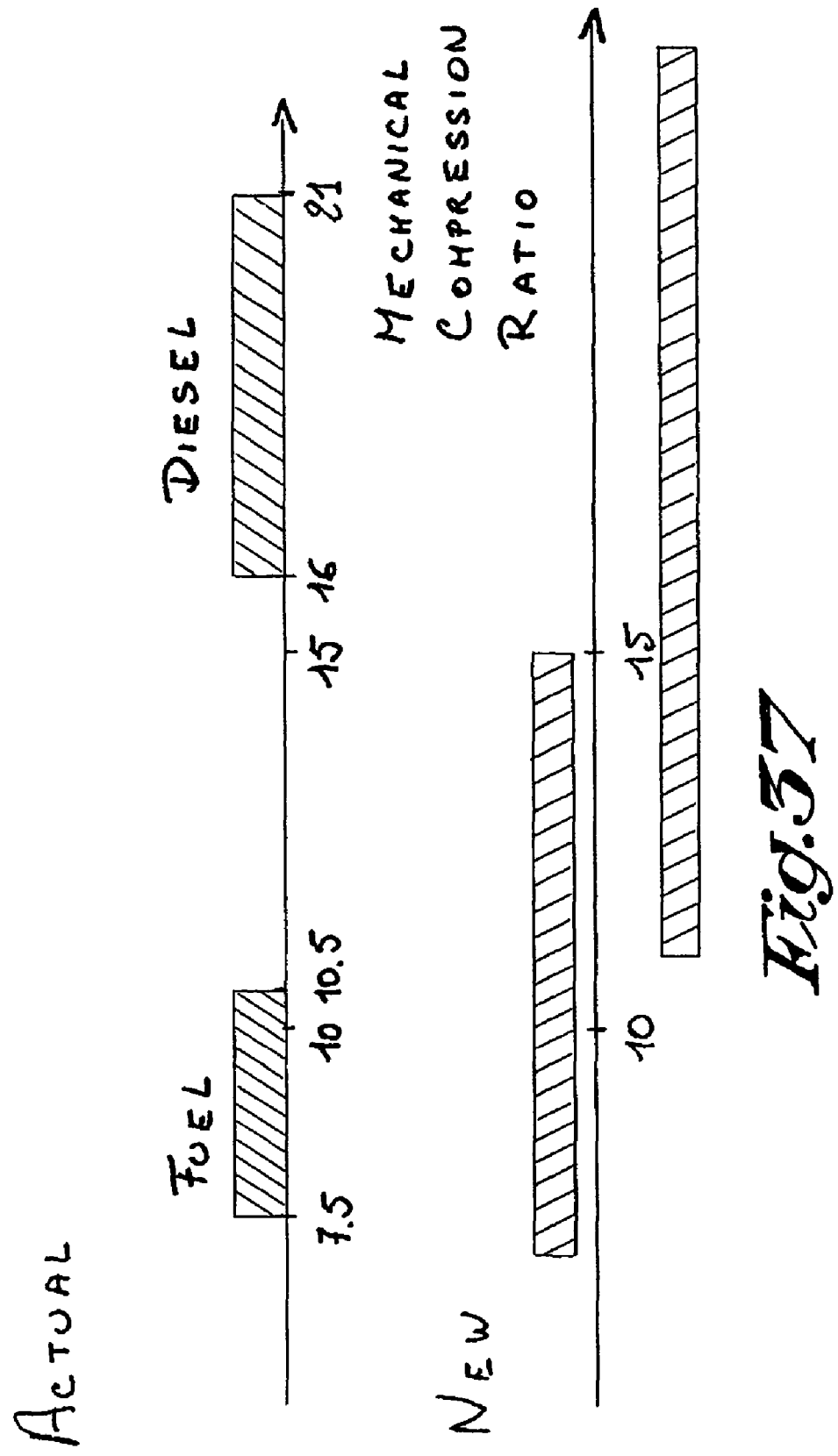
FIG. 37 is a graph showing the mechanical compression zone without detonation.

FIG. 37 is a schematic view for the actual mechanical compression ratio in use for car, namely compression ratio from about 7.5 to 10.5 for fuel and from about 16 to 21 for diesel.

With the catalyst of the efficient (in efficient status), the admissible fuel compression ratio for fuel is extended. Said compression ratio is now from about 7.5 up to about 15. In said larger compression ratio range a good flaming and burning can be operated.

For the diesel, the compression ratio range is also extended from about 11 up to about 21, and even more in specific condition, such as up to 25. In said larger range, a good flaming and burning can be controlled by means of the catalyst of the invention.

Such larger compression ranges enable to have a better control of the working of the engine in function of its need or in function of the power output. This can be quite advantageous for motor with variable compression ratio, as enabling a good flaming for different compression ratios.

Other processes of the invention will now briefly be described.

Cracking of Hydrocarbons

Catalyst beads have been prepared by coating aluminum containing beads with a composition comprising Ce, Pr, Nd and La. Said compound were attached to said beads by vapour deposition. Nano/mesostructures (such as nano/mesoparticles with a size of 100 to 500 nm) were sprayed on the coated beads. The so obtained beads were dried at 300° C. in a nitrogen atmosphere.

The so obtained catalyst beads was mixed with heavy hydrocarbons. The temperature of the mixture was slowly increased to about 300° C. to 500° C. under a hydrogen containing atmosphere. Vapors were condensed in a flask.

The condensed vapors were liquid at room temperature.

Coated Valves

Valves of combustion engine made in an aluminium containing alloy were only partly coated with a thin Vanadium, cerium, Lanthanum, Pr, Nd containing film as disclosed in U.S. Pat. No. 6,886,548. Thereafter, the so coated valve was coated with a composition comprising carbon nano/meso particles. The coated valve was then submitted to a pyrolysis.

Valves were also prepared with the same composition, except that no vanadium was used or that a reduced amount of vanadium was used.

The coating had advantageously a low content in Vanadium and is preferably substantially free of vanadium. The coating was preferably enriched with some La, Pr and Nd. For example the vanadium content of the catalytic coating is such that the atomic ratio Vanadium/the sum of the atoms selected from the group consisting of La, Ce, Pr, Nd, is less than 1, preferably less than 0.5, most preferably less than 0.1, such as less than 0.05, less than 0.01, etc. According to a specific embodiment, the atomic ratio Vanadium/cerium is less than 1, preferably less than 0.5, most preferably less than 0.1, such as less than 0.05, less than 0.01, etc.

What I claim is:

1. A process of burning of at least one fuel in a chamber of an engine, comprising at least the step of admission of fuel and oxygen containing gas into said chamber, the step of compression of the fuel-oxygen containing gas in said chamber, the step of burning at least partly the fuel in said chamber, and the step of ejecting burning gases out of said chamber,
   whereby the compression step is carried out in said chamber in presence of a catalyst system comprising:
   a support containing at least one atom selected from the group consisting of aluminium and iron,
   at least one deposit contacting said support, said deposit containing advantageously at least Ce, Pr, Nd and La, whereby said deposit comprising a series of adjacent grains with a size greater than 1 μm, whereby said grains of said series have a first face in direct contact with the support and a second face not contacting the support, whereby said deposit covers a first portion of the support, while not covering a second portion of the support so as to define zones extending between adjacent grains,
   a first group of carbon nano/meso film contacting only a portion of the second face of one deposit, whereby leaving at least partly said second face of said deposit free of carbon deposit,
   a second group of carbon nano/meso film contacting only partly the second portion of the support, and
   a carbon containing structure extending between at least one carbon nano/meso film of the first group and at least one carbon nano/meso film of the second group,
   whereby the burning step is carried out in said chamber, at least partly at a temperature higher than 700° C. and at a pressure higher than 10 $10^5$ Pa, in presence of a catalyst system comprising:
   a support containing at least one atom selected from the group consisting of aluminium and iron,
   at least one deposit contacting said support, said deposit containing advantageously at least Ce, Pr, Nd and La, whereby said deposit comprising a series of adjacent grains with a size greater than 1 μm, whereby said grains of said series have a first face in direct contact with the support and a second face not contacting the support, whereby said deposit covers a first portion of the support, while not covering a second portion of the support so as to define zones extending between adjacent grains,
   a first group of carbon nano/meso film contacting only a portion of the second face of one deposit, whereby leaving at least partly said second face of said deposit free of carbon deposit,
   a second group of carbon nano/meso film contacting only partly the second portion of the support, and
   a carbon containing structure extending between at least one carbon nano/meso film of the first group and at least one carbon nano/meso film of the second group, and
   whereby the said burning step is carried out at least in presence of $OH^-$ radicals, and controlled so that at least 50% by weight of the fuel is burned in a deflagration mode.

2. The process of claim 1, in which the efficiency of the catalyst is controlled so that at least 75% by weight of the fuel is burned in a deflagration mode.

3. The process of claim 1, in which the catalytic efficiency of the catalyst is determined, whereby when said efficiency is below a minimum determined threshold value corresponding to a minimum deflagration status, the catalyst is submitted to a rejuvenation step.

4. The process of claim 1, in which the fuel is a hydrocarbon containing compound comprising oxygen and/or nitrogen.

5. The process of claim 1, in which the fuel is a hydrocarbon containing compound, whereby at least 90% by weight of the hydrocarbon containing compound consists of atoms selected from the group consisting of carbon, hydrogen and oxygen.

6. The process of claim 1, in which the fuel is a hydrocarbon which is reacted in a reaction chamber, at least one face of which is provided with the lanthanide catalyst, the precursor and the aluminium containing support.

7. The process of claim 3, in which the rejuvenation step is stopped when the catalytic efficiency is above an upper minimal threshold value corresponding to an admissible deflagration status.

* * * * *

UNITED STATES PATENT AND TRADEMARK OFFICE
CERTIFICATE OF CORRECTION

| | |
|---|---|
| PATENT NO. | : 7,723,257 B2 |
| APPLICATION NO. | : 11/648054 |
| DATED | : May 25, 2010 |
| INVENTOR(S) | : Dominique Bosteels |

It is certified that error appears in the above-identified patent and that said Letters Patent is hereby corrected as shown below:

Title Page, Item (54) Title:

Should read: PROCESS FOR THE CATALYTIC CONTROL OF RADICAL REACTION

Signed and Sealed this

Twentieth Day of July, 2010

David J. Kappos
*Director of the United States Patent and Trademark Office*

UNITED STATES PATENT AND TRADEMARK OFFICE
CERTIFICATE OF CORRECTION

| | | |
|---|---|---|
| PATENT NO. | : 7,723,257 B2 | Page 1 of 1 |
| APPLICATION NO. | : 11/648054 | |
| DATED | : May 25, 2010 | |
| INVENTOR(S) | : Dominique Bosteels | |

It is certified that error appears in the above-identified patent and that said Letters Patent is hereby corrected as shown below:

Title Page, Item (54) and at Column 1, lines 1 and 2, Title:

Should read: PROCESS FOR THE CATALYTIC CONTROL OF RADICAL REACTION

This certificate supersedes the Certificate of Correction issued July 20, 2010.

Signed and Sealed this

Seventeenth Day of August, 2010

David J. Kappos
*Director of the United States Patent and Trademark Office*